US012617142B2

(12) United States Patent
Wallace

(10) Patent No.: US 12,617,142 B2
(45) Date of Patent: May 5, 2026

(54) ROLLED EDGE TRAYS HAVING SMOOTH EDGES AND STACKING EXTENSIONS

(71) Applicant: Converter Manufacturing, LLC, Orwigsburg, PA (US)

(72) Inventor: Millard F Wallace, Orwigsburg, PA (US)

(73) Assignee: Converter Manufacturing, LLC, Orwigsburg, PA (US)

( * ) Notice: Subject to any disclaimer, the term of this patent is extended or adjusted under 35 U.S.C. 154(b) by 0 days.

(21) Appl. No.: 19/176,609

(22) Filed: Apr. 11, 2025

(65) Prior Publication Data

US 2025/0262812 A1 Aug. 21, 2025

Related U.S. Application Data

(63) Continuation of application No. 16/728,618, filed on Dec. 27, 2019, which is a continuation of application
(Continued)

(51) Int. Cl.
*B29C 51/30* (2006.01)
*B26F 1/40* (2006.01)
(Continued)

(52) U.S. Cl.
CPC .............. *B29C 51/306* (2013.01); *B26F 1/40* (2013.01); *B29C 48/0017* (2019.02);
(Continued)

(58) Field of Classification Search
None
See application file for complete search history.

(56) References Cited

U.S. PATENT DOCUMENTS

| | | | |
|---|---|---|---|
| 2,891,280 A | 6/1959 | Politis | |
| 2,960,134 A | 11/1960 | Fornas | |

(Continued)

FOREIGN PATENT DOCUMENTS

| | | | |
|---|---|---|---|
| AU | 199528747 B2 | 1/1996 | |
| AU | 2014902616 A | 1/2016 | |

(Continued)

OTHER PUBLICATIONS

Search Report for EPO application 16 842 900.9 of Wallace; Jul. 3, 2019.
(Continued)

*Primary Examiner* — Yan Lan
(74) *Attorney, Agent, or Firm* — Gary D. Colby

(57) ABSTRACT

The disclosure relates to forming shaped thermoplastic articles having smooth peripheries. Many thermoplastic articles have sharp edges formed upon molding or cutting the article from a feedstock sheet. Such sharp edges can damage thin plastic films or flesh which they contact, and smoothing the edges is desirable. Described herein are methods of forming a smooth periphery for such sharp-edged articles by rolling over the sharp edge. The smoothing operation is performed by forming a deflectable flange including a bend region separated from the potentially sharp peripheral edge by a spacer, deflecting a portion of the deflectable flange, and softening at least one bent portion of the deflectable flange to yield a smooth periphery upon cooling.

20 Claims, 29 Drawing Sheets

Related U.S. Application Data

No. 15/445,220, filed on Feb. 28, 2017, now Pat. No. 10,562,222, which is a continuation-in-part of application No. PCT/US2016/049692, filed on Aug. 31, 2016.

(60) Provisional application No. 62/212,367, filed on Aug. 31, 2015.

(51) Int. Cl.

| | |
|---|---|
| B29C 48/00 | (2019.01) |
| B29C 48/10 | (2019.01) |
| B29C 48/23 | (2019.01) |
| B29C 48/88 | (2019.01) |
| B29C 48/885 | (2019.01) |
| B29C 51/08 | (2006.01) |
| B29C 51/14 | (2006.01) |
| B29C 51/20 | (2006.01) |
| B29C 51/26 | (2006.01) |
| B29C 51/42 | (2006.01) |
| B29C 57/12 | (2006.01) |
| B29K 101/12 | (2006.01) |
| B29K 105/00 | (2006.01) |
| B29L 31/00 | (2006.01) |
| B29L 31/56 | (2006.01) |
| B32B 3/26 | (2006.01) |
| B32B 7/06 | (2019.01) |
| B32B 27/08 | (2006.01) |
| B65D 1/22 | (2006.01) |
| B65D 1/26 | (2006.01) |
| B65D 1/34 | (2006.01) |
| B65D 1/40 | (2006.01) |
| B65D 1/42 | (2006.01) |
| B65D 21/02 | (2006.01) |
| B65D 43/02 | (2006.01) |
| B65D 53/06 | (2006.01) |
| B65D 77/20 | (2006.01) |
| B29K 23/00 | (2006.01) |
| B65D 81/20 | (2006.01) |

(52) U.S. Cl.

CPC ............. *B29C 48/10* (2019.02); *B29C 48/23* (2019.02); *B29C 48/885* (2019.02); *B29C 48/912* (2019.02); *B29C 48/918* (2019.02); *B29C 51/082* (2013.01); *B29C 51/14* (2013.01); *B29C 51/20* (2013.01); *B29C 51/265* (2013.01); *B29C 51/42* (2013.01); *B29C 57/12* (2013.01); *B32B 3/266* (2013.01); *B32B 7/06* (2013.01); *B32B 27/08* (2013.01); *B65D 1/22* (2013.01); *B65D 1/265* (2013.01); *B65D 1/34* (2013.01); *B65D 1/40* (2013.01); *B65D 1/42* (2013.01); *B65D 21/0212* (2013.01); *B65D 43/0204* (2013.01); *B65D 53/06* (2013.01); *B65D 77/2024* (2013.01); *B29K 2023/086* (2013.01); *B29K 2101/12* (2013.01); *B29K 2105/256* (2013.01); *B29K 2995/0067* (2013.01); *B29L 2031/565* (2013.01); *B29L 2031/712* (2013.01); *B65D 21/0233* (2013.01); *B65D 81/20* (2013.01); *B65D 2543/00194* (2013.01); *B65D 2543/00296* (2013.01); *B65D 2543/00351* (2013.01)

(56) References Cited

U.S. PATENT DOCUMENTS

| | | | |
|---|---|---|---|
| 3,007,206 | A | 11/1961 | Griswold |
| 3,096,546 | A | 7/1963 | Edwards |
| 3,192,565 | A | 7/1965 | Rukavina |
| 3,291,361 | A | 12/1966 | Commeyras |
| 3,355,536 | A | 11/1967 | Midgley |
| 3,357,053 | A | 12/1967 | Lyon |
| 3,420,431 | A | 1/1969 | Donovan |
| 3,423,231 | A | 1/1969 | Lutzmann |
| 3,466,214 | A | 9/1969 | Polk |
| 3,496,143 | A | 2/1970 | Siggel |
| 3,497,917 | A | 3/1970 | Negoro |
| 3,522,877 | A | 8/1970 | Phillips |
| 3,568,254 | A | 3/1971 | Stolki |
| 3,580,413 | A | 5/1971 | Quackenbush |
| 3,695,806 | A | 10/1972 | Arfert |
| 3,739,052 | A | 6/1973 | Ayres |
| 3,746,497 | A | 7/1973 | Neil |
| 3,752,352 | A * | 8/1973 | Senecal ................ B65D 21/062 |
| | | | 206/509 |
| 3,767,507 | A | 10/1973 | Stahlecker |
| 3,834,606 | A | 9/1974 | Andersson |
| 3,947,205 | A | 3/1976 | Edwards |
| 4,182,462 | A | 1/1980 | Buff |
| 4,228,121 | A | 10/1980 | Meadors |
| 4,239,727 | A | 12/1980 | Myers |
| 4,281,979 | A | 8/1981 | Doherty |
| 4,349,124 | A | 9/1982 | Faller |
| 4,349,146 | A | 9/1982 | Holden |
| 4,358,492 | A | 11/1982 | Perkins |
| 4,419,320 | A | 12/1983 | Perkins |
| 4,533,585 | A | 8/1985 | Holden |
| 4,621,513 | A | 11/1986 | Bradford |
| 4,889,231 | A | 12/1989 | Foote |
| 4,972,963 | A | 11/1990 | Guarriello |
| 5,098,751 | A | 3/1992 | Tamura |
| 5,118,277 | A | 6/1992 | Padovani |
| 5,167,900 | A | 12/1992 | Odaka |
| 5,364,675 | A | 11/1994 | Guarriello |
| 5,375,701 | A | 12/1994 | Hustad |
| 5,758,773 | A * | 6/1998 | Clements ............... A47G 19/03 |
| | | | 220/675 |
| 5,919,496 | A | 7/1999 | Padovani |
| 5,972,447 | A | 10/1999 | Hata |
| 5,976,682 | A | 11/1999 | Eichbauer |
| 6,234,386 | B1 | 5/2001 | Drummond |
| 6,482,452 | B1 | 11/2002 | Weller |
| 6,598,740 | B1 | 7/2003 | Wiegers |
| 6,737,003 | B1 | 5/2004 | Golden |
| 6,960,316 | B2 | 11/2005 | Brown |
| 6,983,575 | B2 | 1/2006 | Longo |
| 7,395,923 | B2 | 7/2008 | Chou |
| 7,921,992 | B2 | 4/2011 | LaRue |
| 8,418,871 | B1* | 4/2013 | LaMasney ............... B65D 1/34 |
| | | | 220/802 |
| 8,474,610 | B1 | 7/2013 | Knight |
| 8,920,892 | B2 | 12/2014 | Hernandez |
| 9,302,842 | B2 | 4/2016 | Wallace |
| 9,908,281 | B1 | 3/2018 | Wallace |
| 10,076,865 | B2 | 9/2018 | Wallace |
| 10,118,332 | B2 | 11/2018 | Wallace |
| 10,189,624 | B2 | 1/2019 | Wallace |
| 10,399,268 | B2 | 9/2019 | Wallace |
| 10,562,222 | B2 | 2/2020 | Wallace |
| 10,562,680 | B2 | 2/2020 | Wallace |
| 10,800,090 | B2 | 10/2020 | Van Tilborgh |
| 10,889,049 | B2 | 1/2021 | Torlay |
| 2002/0007902 | A1 | 1/2002 | Nance |
| 2002/0119334 | A1 | 8/2002 | Shepard |
| 2002/0127295 | A1 | 9/2002 | Padovani |
| 2003/0041955 | A1 | 3/2003 | Spengler |
| 2004/0043165 | A1 | 3/2004 | Van Hulle |
| 2004/0144482 | A1 | 7/2004 | Cherpinsky |
| 2006/0172095 | A1 | 8/2006 | Elsaesser |
| 2007/0016806 | A1 | 1/2007 | Prosperi |
| 2009/0291174 | A1 | 11/2009 | Lewis |

(56) References Cited

U.S. PATENT DOCUMENTS

| 2011/0266168 A1 | 11/2011 | Longo |
| 2012/0085069 A1 | 4/2012 | Mader |
| 2012/0119404 A1 | 5/2012 | Wallace |
| 2012/0291712 A1 | 11/2012 | Wallace |
| 2013/0064998 A1 | 3/2013 | Wnek |
| 2013/0113137 A1 | 5/2013 | Bissoli |
| 2013/0142975 A1 | 6/2013 | Wallace |
| 2014/0041343 A1* | 2/2014 | Corbett ............... B65D 43/162 |
| | | 220/270 |
| 2014/0054292 A1 | 2/2014 | Wallace |
| 2015/0001127 A1 | 1/2015 | Nelson |
| 2017/0001786 A1 | 1/2017 | Wallace |

FOREIGN PATENT DOCUMENTS

| AU | 2018220971 B2 | 8/2018 |
| FR | 2424805 A1 | 11/1979 |
| GB | 1388710 | 3/1975 |
| JP | 56150606 A | 11/1983 |
| JP | 62082016 A | 4/1987 |
| JP | 62078663 S | 5/1987 |
| JP | 8108494 H | 4/1996 |
| JP | 09123268 H | 5/1997 |
| JP | 10086216 H | 4/1998 |
| JP | 11048332 H | 4/1999 |
| NL | 1041068 B1 | 8/2016 |
| NZ | 589111 | 11/2010 |
| NZ | 709798 A1 | 1/2016 |
| WO | 96/01179 A1 | 1/1996 |
| WO | 2012064203 A1 | 5/2012 |
| WO | 2013036731 A2 | 3/2013 |
| WO | 2017053937 A1 | 3/2017 |

OTHER PUBLICATIONS

Office Action for Canada patent application 2996864; Jun. 19, 2019.

Final Written Description for IPR2021-00916, U.S. Pat. No. 9,908,281; Oct. 20, 2022.

Final Written Description for IPR2021-00918, U.S. Pat. No. 10,189,624; Oct. 20, 2022.

Final Written Description for IPR2021-00919, U.S. Pat. No. 10,562,680; Oct. 20, 2022.

Petition for Inter Partes Review of U.S. Pat. No. 10,562,222; Sep. 13, 2024.

Throne, J.L., "Technology of Thermoforming," Carl Hanser Verlag, Munich, 1996.

* cited by examiner

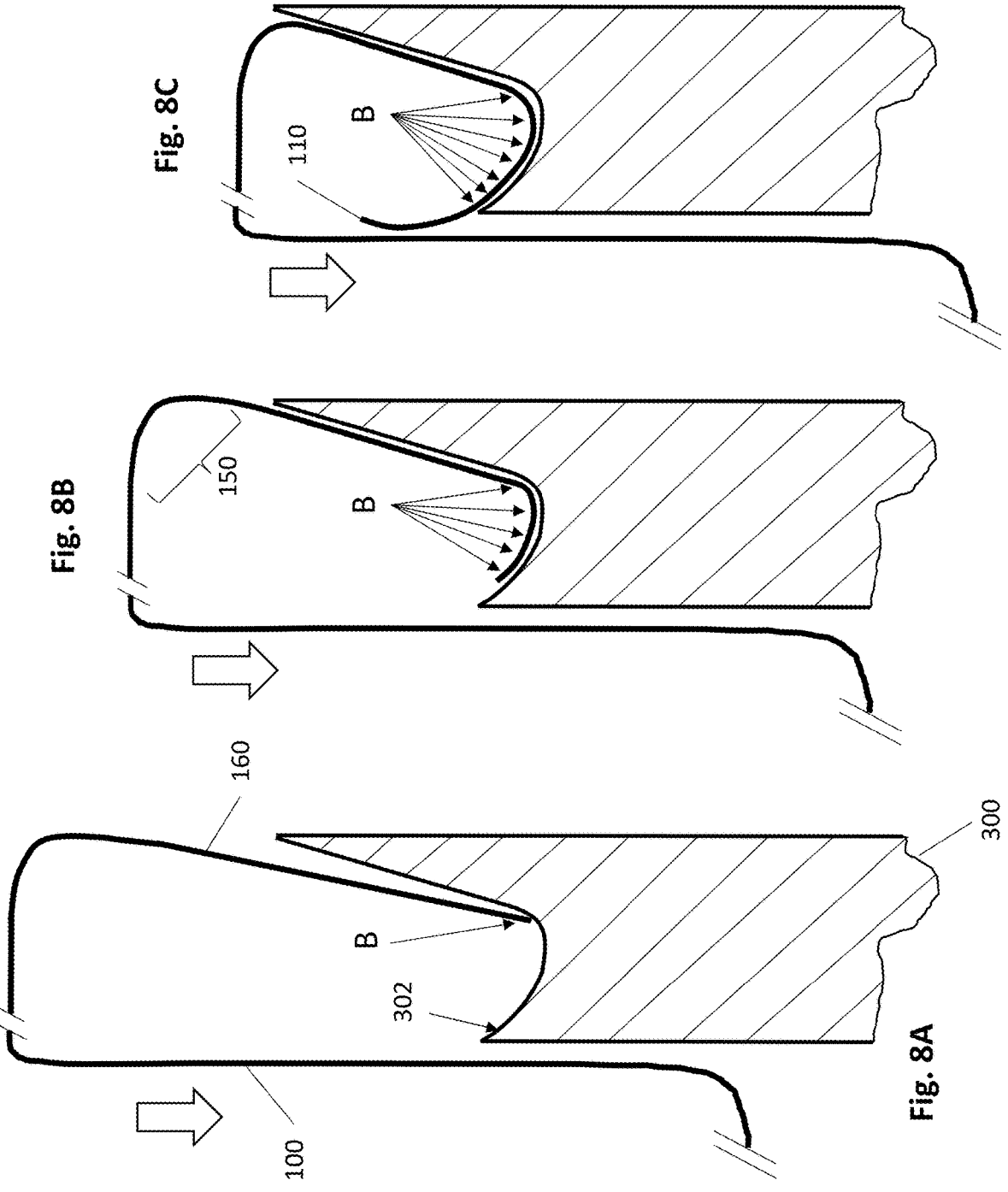

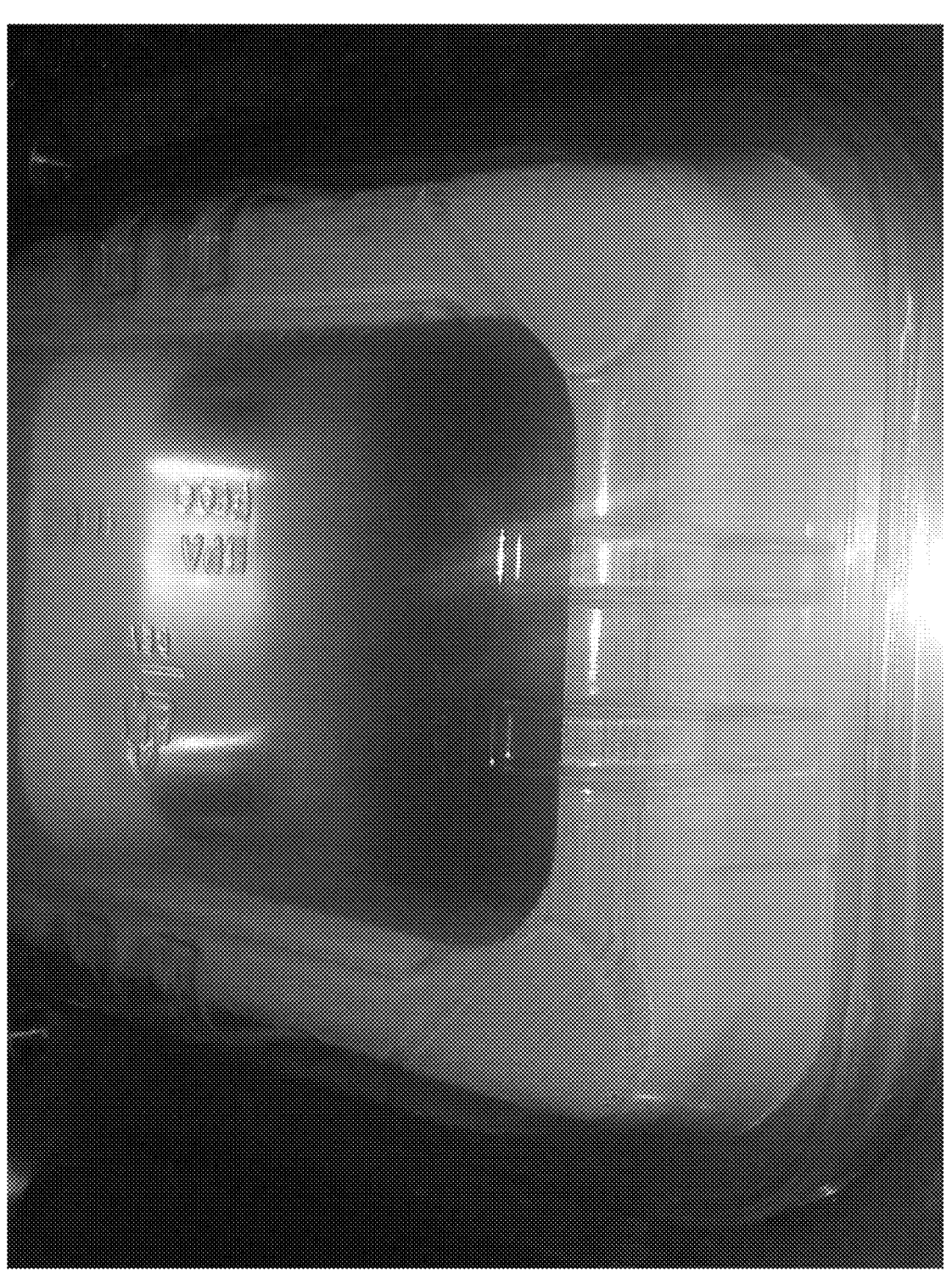
Fig. 8Dii

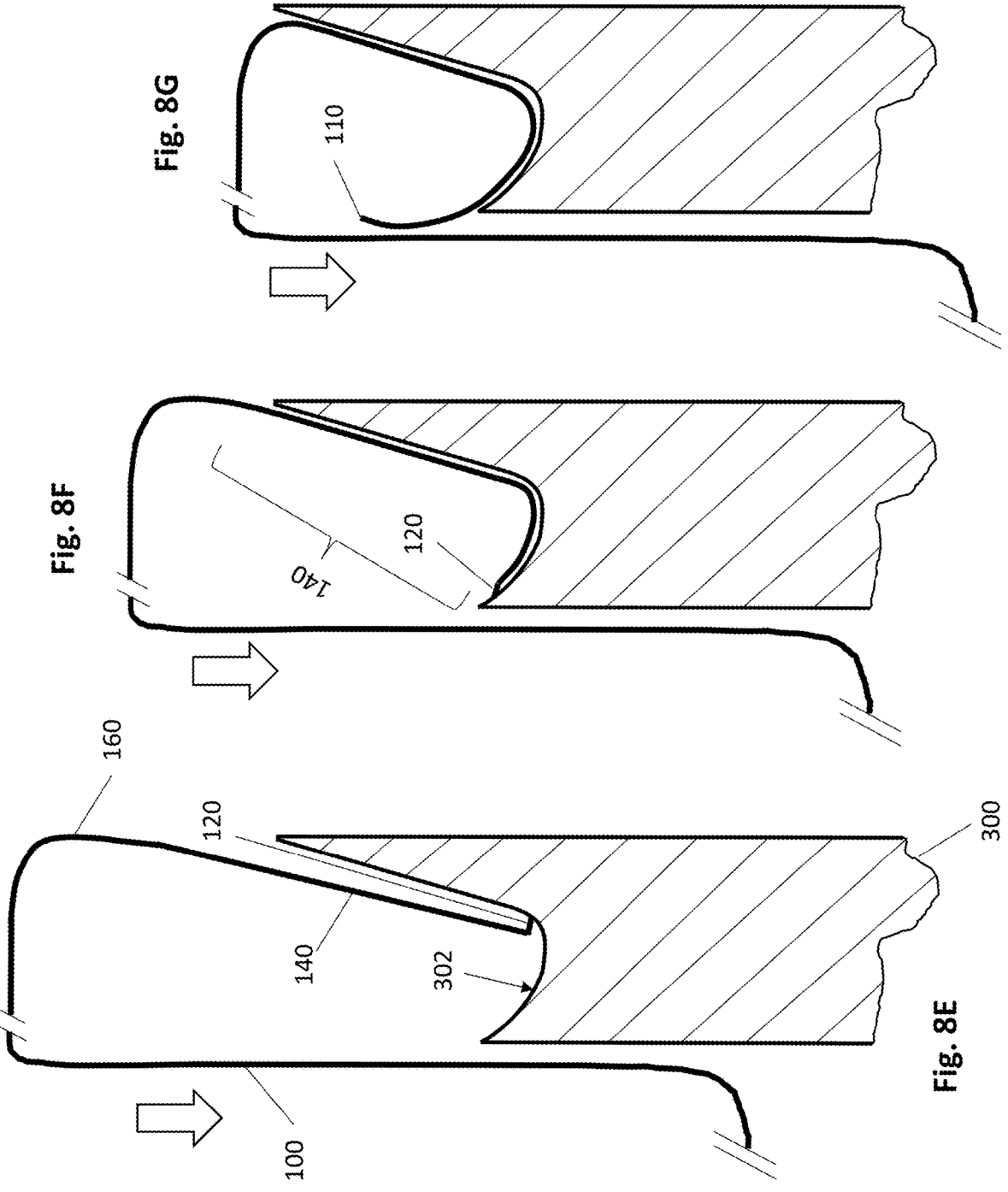

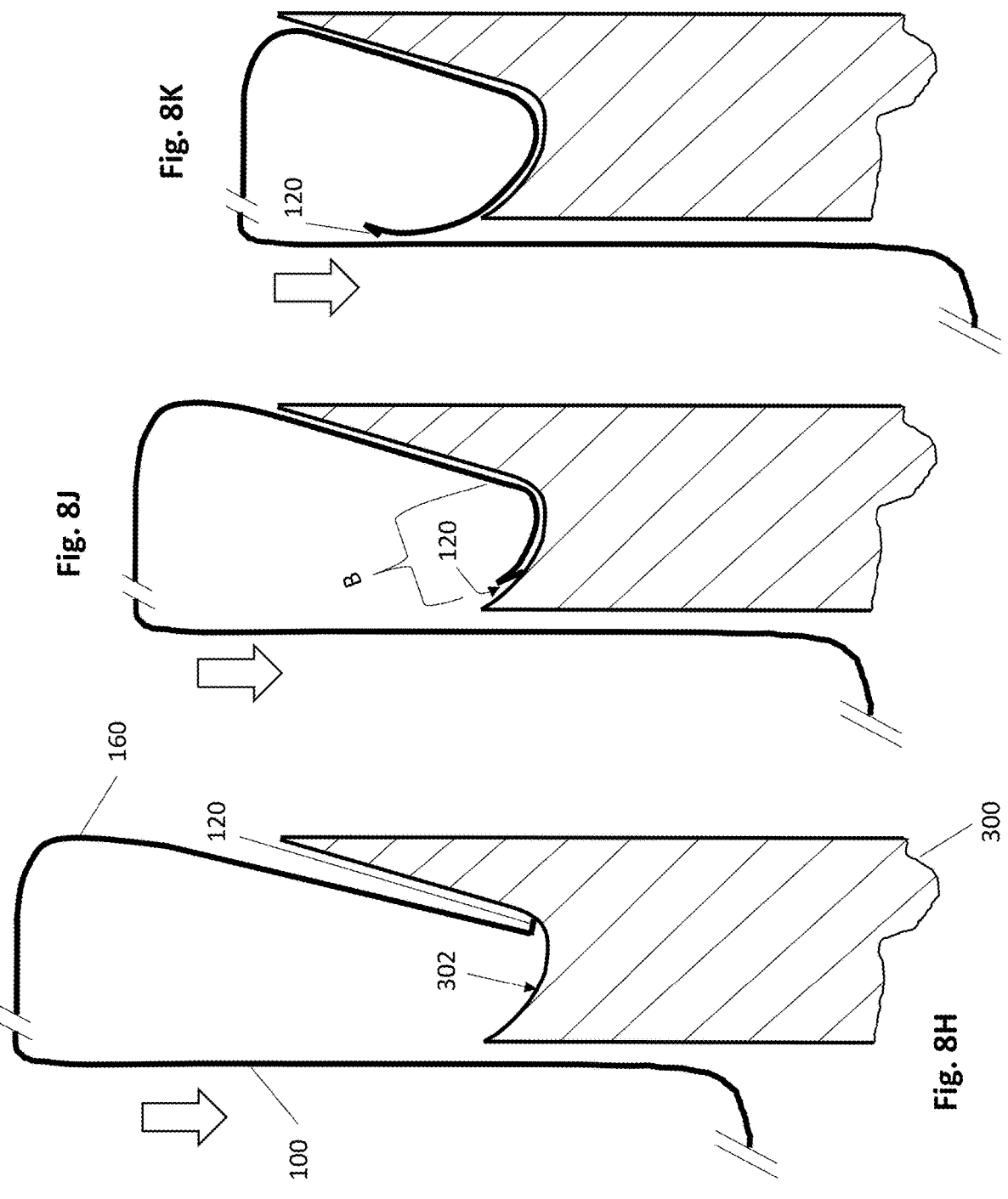

ROLLED EDGE TRAYS HAVING SMOOTH EDGES AND STACKING EXTENSIONS

CROSS-REFERENCES TO RELATED APPLICATIONS

This application is a continuation of co-pending U.S. application Ser. No. 16/728,618, filed 27 Dec. 2019, which is a continuation of U.S. application Ser. No. 15/445,220 filed 28 Feb. 2017, now U.S. Pat. No. 10,562,222, which is a continuation-in-part of international application PCT/US16/49692 (inactive), filed 31 Aug. 2016, which is entitled to priority to U.S. provisional patent application No. 62/212,367, filed 31 Aug. 2015, each of which applications is incorporated herein by reference in its entirety.

BACKGROUND OF THE DISCLOSURE

This disclosure relates generally to the field of forming shaped thermoplastic articles.

Formation of shaped articles from thermoplastic materials is well known. A wide variety of methods (e.g., thermoforming, casting, molding, and spinning) can be used to confer shape to a molten thermoplastic or to a preformed thermoplastic sheet that has been softened or melted.

Trimming of waste material from one or more edges of a shaped article is a common finishing technique, but leaves a sharp edge that can injure flesh or tear or cut materials which come into contact with the edge. One common use for shaped thermoplastics is to form containers that can be sealed with thin plastic films, such as trays, bowls, or bins intended to contain foodstuffs and intended to be sealed with transparent plastic film. Another common use is to contain items and to seal them from moisture or other materials which may come into contact with the container. Sealing of such containers typically involves extending or stretching the film across a compartment formed in the container and sealing the film around the periphery of the compartment, which periphery is often situated adjacent a trimmed edge of the article that includes the compartment. If that edge is sharp, it can cut or break the film, interfering with the sealing process.

Three well-known sealing technologies are commonly used in sealing foods and foodstuffs to form containers for commercial shipping, storage, display, and sale. These are referred to herein as OW, VSP, and MAP technologies. All of these technologies involve combining a container and a thin plastic film. Owing to the fragility of such films and the need, in many instances, to minimize or eliminate punctures and tears from film portions which serve to define (together with the container) sealed compartments, it is critical to minimize the opportunities for containers to tear, puncture, or abrade the film of the same or nearby containers. In addition to plastic films used for sealing such containers, plastic films are also employed for shipping the containers, such as the "mother bags" (i.e., typically thin plastic bags) used for containing multiple product-in-container-packages during shipping and the plastic grocery bags used by consumers to transport purchased goods from a retailer. This can be achieved by reducing or eliminating sharp or rough container edges, at least positions on the container at which such edges might reasonably contact the film during packaging, storage, shipment, or display.

Overwrap (OW) technology involves enveloping or wrapping a shaped article (e.g., a thermoformed tray, sheet, bowl, or multi-compartment container) with a thin (often transparent) plastic film after a foodstuff or other item has been placed on one or more faces of the article and thereafter sealing the film to itself (e.g., by heating overlapping portions of the film). In such OW technology, sharp or rough edges of the shaped article can cut, abrade, or puncture the film, potentially allowing materials to pass through the film and defeating one or more of its purposes. Heretofore, OW technology has been used primarily together with foamed trays or bins lacking sharp edges. Many municipal recycling schemes exclude or disfavor foamed plastics, and such materials are therefore increasingly disfavored by consumers. It would be desirable if a thermoformable plastic container suitable for use with multiple wrapping technologies, including OW technology, could be made, since thermoformable materials tend to be widely acceptable in recycling programs.

Vacuum-sealed package (VSP) technology involves adhering a thin (again, often transparent) plastic film against a face of a shaped article bearing a foodstuff (for example, or a moisture-sensitive object as an alternate example) on a face of the shaped article. When VSP technology is employed, that item(s) to be packaged are placed on a surface or within a cavity of the shaped article, the film is overlain such that the item(s) are interposed between the shaped article and the film, air (or whatever other gases may be present) is withdrawn from the space between the film and the shaped article (optionally in coordination of application of positive pressure to the exterior of one or both of the film and the shaped article) so that the film is closely opposed against the surface of the shaped article and/or the item(s), and the film is sealed (e.g., by way of an interposed adhesive, through heat-induced adhesion, or by static charge adhesion) to the surface of the shaped article across the desired area (usually completely encircling the item(s)), and any excess film can be trimmed from the desired area. The seal can be resistant to gas flow in order to maintain the gas-evacuated state on the interior of the sealed container. The resulting VSP-sealed package typically has a topology that mimics the shape of the surface of the shaped article having the item(s) thereon.

MAP is an abbreviation for modified atmosphere packaging and refers to a sealing technology in which a flexible (often transparent) film is sealed (e.g., using heat or an adhesive) about the perimeter of a substantially rigid shaped article. When the shaped article is otherwise closed (i.e., when it has no other openings than that sealed by the film), the gases present within the container can be controlled at the time the film is sealed to the article. Thus, if the article and film are sealed in the presence of a selected atmosphere (e.g., a gas, such as one selected to exclude oxygen or to promote fruit ripening), the selected atmosphere can be maintained within the sealed MAP package during subsequent storage, shipping, and display of the package.

As is known in the art, the shaped articles used in OW, VSP, and MAP sealing processes tend to have a variety of industry-accepted geometric shapes and properties which differ among the three types, such that a shaped article useful in one type of sealing process is often poorly suited for use in one or both of the others.

Containers used for OW-sealing, for example, tend to be rectangular and tray- or sheet-shaped, with smooth, blunt edges and rounded corners. The lack of sharp, rough, or pointed edges or corners serves to reduce the likelihood that the film used for overwrapping the container will be torn or punctured upon wrapping. OW-containers often have a flat portion (e.g., on the "bottom" of the container, relative to its intended display configuration) at which the overwrapped film can be urged against itself for the purpose of sealing the film to itself (e.g., upon application of heat to the overlapping film portions sufficient to cause such sealing), thus enclosing the container and any items on or in it.

Containers used for VSP-sealing tend to have a face or surface (sometimes within a concavity) adapted to carry an item to be sealed between the film and the container and adapted to receive the sealing film by virtue of the absence of sharp points, protrusions, or edges. The absence of such features reduces the likelihood of punctures or tears in the film as it is drawn against the surface. Unlike OW-containers, VSP-containers can have sharp edges, corners, or protrusions, at least at portions other than the film-receiving surface, because those portions need not contact the film during sealing. However, such sharp portions can still damage sealing films, especially when multiple VSP-sealed packages are stored, shipped, or displayed near one another, because a sharp portion of one container can damage the film of another container (or a film or tissue in the vicinity of the container).

Containers used for MAP-sealing tend to have a planar surface (e.g., a broad, flat rim) surrounding an opening to be sealed by applying a sheet of film against it, sealing the film to the surface (often substantially irreversibly), and then trimming the film about the perimeter of the seal. Such containers must be configured such that the film can be applied to the surface without substantial risk of tears or punctures before and during sealing and to facilitate trimming of the film from the sealed container. However, because the film typically contacts only limited portions of MAP-containers during the sealing process, MAP-containers can, and often do, include sharp, pointed, or abrasive features at positions not involved in the sealing process.

It would be beneficial if the sharp edges of shaped thermoplastic articles could be displaced in such a way that the risk of injury or damage to sealing films could be reduced. It would be further beneficial if such individual shaped articles could be used with multiple known sealing technologies, such as two or more of OW, VSP, and MAP technologies. Reducing the sharpness and tendency of thermoformed articles to induce damage and injuries would be advantageous even in the absence of sealing. The subject matter disclosed herein addresses this shortcoming of prior shaped thermoplastic articles.

Others have recognized the desirability of reducing the occurrence of sharp edges at the edges of trays to be overwrapped. For example, Nelson et al. (U.S. patent application publication number 2015/0001127) disclosed a packaging tray that is formed by thermoforming a film sheet to yield a precursor tray having a generally U-shaped flange about its periphery, the open end of the U facing the sealing surface and the peripheral edge of the tray jutting peripherally. Nelson's tray is made by cutting the precursor tray from a sheet of thermoformable material to yield an end in which the peripherally-extending peripheral edge is positioned at the terminus of the outer (relative to the tray body) arm of the U. Nelson then compresses that outer arm inwardly toward the tray body, leaving a smoother crimped portion of the U-shaped flange at the periphery of the tray, with the still-potentially-sharp peripheral edge extending toward the sealing surface. In this way, Nelson et al., generates a tray said to be suitable for overwrapping, an overwrapping film being intended to urge the outer arm of the U-shaped flange toward or against the inner arm. However, because the tray retains a sharp peripheral edge in a position in which it can cut films (the peripheral edge of Nelson's trays can be seen to contact both the film overwrap and the film overwrapping an adjacent tray in Nelson's FIG. 13A, for example), Nelson's tray remains unsuitable for all OW applications and generally unsuitable for use with VSP and MAP technologies. A tray lacking a film-accessible sharp peripheral edge or a sharp crimps (which Nelson's trays also possess-see item 124 in Nelson's FIG. 12A) would be preferable for use with each of these sealing technologies.

The subject matter disclosed herein includes shaped thermoformed articles which are suitable for sealing with multiple technologies.

Thermoformed drinking cups having smooth, rolled edges are also known. Such cups are made by thermoforming cups having a flange about the perimeter of the cup opening, the flange including a potentially sharp peripheral edge at the flange end distal to the interior of the cup. The flanged cups are stacked in a nested fashion, heated at their flange portions, and then passed through helical rim-rolling threads to create the rolled edge. Such technology is useful only for rolling the edge surrounding a circular orifice, and is therefore of no practical use in making shaped articles having rolled edges surrounding non-circular openings. Rolled-edge drinking cups are also not designed to facilitate wrapping or sealing with thin plastic films.

BRIEF SUMMARY OF THE DISCLOSURE

The disclosure relates to methods of displacing a sharp edge away from the periphery of an article made from a thermoplastic material, where the sharp edge might otherwise damage surfaces that contact the periphery of the article. The disclosure also relates to articles processed according to those methods and to equipment for performing such processing.

The disclosure relates to a method of forming a smooth edge (i.e., a smooth periphery) on an article made of a thermoplastic material. The method includes a step of forming a deflectable flange at an edge of the body of the article. The deflectable flange includes a peripheral edge of the thermoplastic material at the peripheral end of the deflectable flange, optionally on a peripheral flange that extends peripherally from the deflectable flange. In one embodiment, the peripheral flange is connected by an elbow to a spacer and extends peripherally beyond the spacer by a peripheral flange distance. The peripheral flange distance can be selected to yield a desired degree of deflection when it is impinged against a surface. In one embodiment, the peripheral flange distance is selected to be zero (i.e., the peripheral edge exists where the elbow would otherwise be. The spacer is connected by a bend region to the body, the bend region defining an angle (which can be acute or obtuse, and is preferably approximately a right angle) between the spacer and the body. The deflectable flange is urged within the interior of a cavity defined by an upper body, for example, the distance between the elbow and the interior being smaller than the peripheral flange distance, so that the deflectable flange is deflected at the bend region upon impingement of a portion of the interior of the cavity on the peripheral flange. Sufficient heat is applied to the bent portion (here, the bend region) of the deflectable flange to soften the thermoplastic material at the bend region. The upper body and the article are separated, whereby the bend region remains deflected upon cooling, yielding a smooth edge (i.e., periphery) on the article.

This method can be used to form a smooth edge about the entire periphery of the article. To do so, the deflectable flange is formed about all edges of the article and the interior of the cavity is configured to simultaneously impinge upon the deflectable flange about all edges of the article when the deflectable flange is urged within the interior. In the resulting article, the peripheral edge is effectively 'hidden' (e.g., it is behind the deflected peripheral flange or deflected away from the periphery of the article) so that materials (e.g., thin plastic films or animal tissue) which contact the periphery of the article will be less likely to contact the peripheral edge of the thermoplastic material from which the article is made.

The disclosure also relates to a method of forming a sealed compartment. This method includes steps thermoforming a thermoplastic sheet to form an article having a concave compartment surrounded by substantially planar sealing surface, cutting the article from the sheet peripherally to the sealing surface, forming a smooth edge about the entire periphery of the article as described herein, and thereafter sealing a top sheet to the sealing surface to form the sealed compartment. In one embodiment of this method, the top sheet is trimmed peripherally about the sealing surface after it is sealed to the sealing surface. In another embodiment, the top sheet is heat-sealed to the sealing surface.

The disclosure further relates to a method of forming a sealed compartment. This method includes steps of thermoforming a thermoplastic sheet to form an article having a concave compartment surrounded by substantially planar sealing surface, cutting the article from the sheet peripherally to the sealing surface, forming a smooth edge about the entire periphery of the article as described above, and thereafter wrapping and sealing a flexible plastic film about the article to form the sealed compartment.

In some embodiments of the methods described herein, after urging the deflectable flange within the interior of the cavity and before separating the upper body and the article, a ram can be urged into the interior, closely opposed against the interior, behind the deflectable flange to an extent that a face of the ram impinges upon and further deflects the deflectable flange, for example, at the bend region. The face can be substantially planar, for example. The face can also be substantially perpendicular to the portion of the interior that impinges upon the peripheral flange. The face can define an obtuse angle with the portion of the interior that impinges upon the peripheral flange. The face can have a concave profile, relative to the interior. If the ram is heated, urging the ram against the deflectable flange can cause bending of the portions of the deflectable flange which contact the ram, further deflecting the peripheral edge of the thermoplastic sheet away from the periphery of the shaped article.

In a non-heat-based embodiment, the disclosure relates to a method of forming a smooth edge on an article made of a plastic material (e.g., a thin plastic material backed by a deformable metal layer). This method includes forming a deflectable flange at an edge of the body, the deflectable flange including a peripheral edge of the thermoplastic material at the peripheral end of a peripheral flange. In one embodiment, the peripheral flange is connected by an elbow to a spacer and extends peripherally beyond the spacer by a peripheral flange distance (which is effectively zero if there is no peripheral flange). The spacer is connected by the bend region to the body or an extension therefrom. The bend region defines an angle (which can be acute or obtuse, and is preferably approximately a right or slightly obtuse angle) between the spacer and the body. The deflectable flange can urged within the interior of a cavity defined by an upper body, the distance between the spacer and the interior being smaller than the peripheral flange distance or impinged upon a shaped ram surface that deflects the deflectable flange inwardly. The deflectable flange is thereby deflected, such as at the bend region, upon impingement. Sufficient pressure is applied to irreversibly bend the plastic material. The upper body and the article are separated, whereby the deflectable flange remains deflected upon removal of pressure, yielding a smooth edge on the article.

BRIEF SUMMARY OF THE SEVERAL VIEWS OF THE DRAWINGS

FIG. 1 consists of FIGS. 1A, 1B, and 1C and illustrates the basic operation of the structures and methods described herein. Parallel straight lines "//" indicate positions at which structures, dimensions, and proportions which can optionally be present are omitted for clarity.

FIG. 2 consists of FIGS. 2A, 2B, 2C, and 2D and illustrates a matched upper body 200 and ram 300 for deflecting one or more deflectable flanges 160 formed on the periphery of a shaped thermoplastic article having the conformation of a rectangular tray with rounded corners. In FIG. 2D, the sloping conformation of the upper face 302 of the ram 300 is apparent.

FIG. 3 consists of FIGS. 3A, 3B, and 3C, which are images of a smoothed periphery and corner of a clear, shaped thermoplastic article having the conformation of a rectangular tray with rounded corners. The article was smoothed using an upper body 200 and ram 300 similar to those illustrated in FIG. 2.

FIG. 5 consists of FIGS. 5A, 5B, and 5C, each of which illustrates a section taken through a storage container article 100 being formed using the methods described herein (parallel straight lines "//" indicate positions at which structures, dimensions, and proportions which can optionally be present are omitted for clarity). In the figure, the article 100 has a deflectable flange 160 formed on each of the sides of the container visible in the figure. The deflectable flanges 160 have been deflected inwardly by infringement thereupon by the upper face 302 of a single ram 300 (only two portions shown in the figure) at each deflectable flange 160. The peripheral edge 110 of the thermoplastic sheet from which article 100 is formed, infringes upon the upper face 302 of the ram 300 at each deflectable flange 160, causing the deflectable flange 160 to deflect inwardly toward the body of the article 100 by flexing at one or more portions B of the bend region 150 of each deflectable flange 160. Application of heat at B in an amount sufficient to soften the thermoplastic sheet causes the deflectable flanges 160 to retain approximately the conformation shown in this figure, with the peripheral edges 110 of the thermoplastic sheet positioned anti-peripherally (i.e., within the periphery of the article 100, which occurs at the positions indicated by B in this figure), yielding smooth peripheries to the formed container upon cooling of the softened portions. In this embodiment, the two parts of the ram 300 are shown with different profiles (one flat and one curved), to illustrate differences in deflection that can be induced by the different profiles.

FIG. 6D is a view from the underside of a rounded rectangular tray which has a "rolled over" edge about its entire periphery. The absence of sharp edges at or near the periphery of this tray is visible. FIG. 6E is an oblique view of three initially-identical trays, each having a "rolled over" edge as described herein, the degree to which the edge has been "rolled over" differing among the three. The tray labeled "1" has a peripheral edge that has only barely been "rolled over" (i.e., the portion of the deflectable flange including the peripheral edge 110 has been deflected not more than about 45 degrees inwardly from the plane of the remainder of the spacer 140, most which remains substantially flat in this tray. The tray labeled "2" has a peripheral edge that has been more fully "rolled over"—so much so that the peripheral edge 110 can nearly not be seen (it has been 'tucked' behind the remaining visible portion of the spacer 140). On the tray labeled "3," the deflectable flange has been rolled over further still and the peripheral edge 110 cannot be seen. That the deflectable flange of tray "3" has been rolled over to a greater degree than that of tray "2" is detectable by virtue of the shorter portion of spacer 140 that remains visible on tray "3" than on tray "2" (and the visible portion of spacer 140 of each of trays "2" and "3" is shorter than the visible portion of spacer 140 of tray "1.") The three trays shown in FIG. 6E can thus be thought to illustrate discrete degrees of "rolling over" of the deflectable flange.

FIG. 7 consists of FIGS. 7A, 7B, and 7C and illustrate an embodiment in which an article 100 formed of a thermoplastic sheet (parallel straight lines "//" indicate positions at which structures, dimensions, and proportions which can optionally be present are omitted for clarity) resting on a horizontal surface (solid horizontal line) has its peripheral edges smoothed as described herein. In this embodiment, an upper body 200 (two portions shown in this cross section) is lowered over the article 100 in the direction indicated by the open arrow, causing each of the article's two deflectable flanges 160 to deflect inwardly.

FIG. 8 consists of FIGS. 8A, 8B, 8C, 8D, 8Di, 8Dii, 8E, 8F, 8G, 8H, 8J, and 8K and illustrates deflection and rolling over of the deflectable flange 160, including the sharp peripheral edge 110 thereof using a ram 300 as described herein. Each of FIGS. 8A-8C, 8E-8G, and 8H-8K is a cross-sectional view including only one edge of the article; the same deflection and rolling over of the edge can be performed on multiple edges (e.g., all edges) of the article simply by using multiple rams or a ram that contacts all edges to be so treated.

FIGS. 8A, 8B, and 8C sequentially depict the effect of urging the shaped article 100 farther against the ram 300 in the direction indicated by the open arrow in each figure, as can be seen by comparing the portion of the article appearing in the left portion of each figure. In the embodiment shown in FIGS. 8A-8C, the deflectable flange 160 lacks an elbow and a peripheral flange. The initial (pre-ram-impingement) conformation of the shaped article is that shown in FIG. 9A.

In FIG. 8A, the article has been urged against the ram such that its deflectable flange 160 contacts the upper face 302 of the ram at its peripheral edge. The deflectable flange 160 deflects from its pre-contact position by virtue of resistance to movement encountered by the deflectable flange as it contacts the inclined portion of the upper face 302. In the figure, the peripheral edge 110 of the deflectable flange rests against the upper face at a position where the inclined portion of the upper face transitions to a curved contour and a portion of the spacer is in close proximity to the ram, which is heated and transfers heat thereto.

FIG. 8B shows the effect of urging the article 100 depicted in FIG. 8A further against the ram 300. Because the ram 300 shown in FIG. 8B is heated, it softens the material from which the deflectable flange 160 is made at portions where the deflectable flange is in close proximity to or contacts the upper face 302 of the heated ram 300. Because of the shape of the upper face 302, the deflectable flange 160 reaches a position at which it can no longer advance by merely sliding along the upper face surface. Because the article 100 (including the deflectable flange 160) is being urged in the direction indicated by the open arrow, and because the material of which the deflectable flange is constructed has been softened by the heated ram 300, the deflectable flange deforms (at positions B) to follow the contour of the upper face 302 of the ram as the deflectable flange is advanced against the ram.

FIG. 8C shows the effect of continuing to urge the article 100 depicted in FIG. 8B against the heated ram 300. As the article (including the deflectable flange 160) is urged in the direction indicated by the open arrow, the deflectable flange continues to bend where softened by contact with the heated ram (i.e., at positions B). As movement of the deflectable flange against the ram continues, the peripheral edge 110 of the deflectable flange eventually reaches an edge of the upper face 302 of the ram. The portion of the deflectable flange including the peripheral edge remains softened for a period of time (the period being dependent on the operating conditions in predictable ways). If the peripheral end contacts a portion of the article 100 while softened, it can be deflected thereby (e.g., upwardly, as suggested in the embodiment shown in FIG. 8C). Deflection of the portion of the peripheral flange leaving contact with the upper face can also be influenced by the contour of the upper face 302, for example inducing a "curled" or "spiraling" conformation as shown in FIG. 8C.

FIG. 8Di depicts a shaped article in the form of a rounded rectangular tray T having an interior and a plug P that is shaped and dimensioned to fit within that interior, so as to act as object 401 in FIG. 8D and to reduce or prevent inward deflection of the side walls of the tray T during the rolling over of the deflectable flange of the tray T. FIG. 8Dii shows the plug inserted within the interior of the tray.

FIGS. 8E, 8F, and 8G (analogously to FIGS. 8A, 8B, and 8C) sequentially depict the effect of urging the shaped article 100 farther against the ram 300 in the direction indicated by the open arrow in each figure. In the embodiment shown in FIGS. 8E-8G, the deflectable flange 160 includes a peripheral flange 120 at the peripheral end of the spacer 140. In this figure, it can be seen the peripheral flange 120 deflects during bending of the deflectable flange 160 to the extent that it becomes indistinguishable from the spacer 140.

FIGS. 8H, 8J, and 8K (analogously to FIGS. 8A, 8B, and 8C; FIG. 8I is deliberately omitted) sequentially depict the effect of urging the shaped article 100 farther against the ram 300 in the direction indicated by the open arrow in each figure. In the embodiment shown in FIGS. 8H-8K, the deflectable flange 160 includes a peripheral flange 120 at the peripheral end of the spacer 140. In these figures, it can be seen the peripheral flange 120 deflects during bending of the deflectable flange 160 to the extent that it becomes completely bent over the spacer 140, forming a 'hook'-like structure. B in FIG. 8J indicates that bending is occurring in the portion of the deflectable flange 160 spanning the indicated portion of the upper face 302 of the ram 300.

FIG. 9 consists of FIGS. 9A, 9B, 9C, 9D, 9E, and 9F and illustrates a beneficial feature of one embodiment of the shaped articles disclosed herein.

FIG. 9C illustrates three thus-stacked nested trays, with open arrows indicating positions at which standard de-nesting equipment can be employed to separate the nested trays. Fingers or threads, for example, can engage the inter-tray regions at these positions, the fingers or threads being operable (per ordinary de-nesting procedures) to separate the trays from one another for individual use.

FIG. 10 consists of FIGS. 10A, 10B, and 10C.

10B and 10C.

DETAILED DESCRIPTION

Figures 1A, 1B:
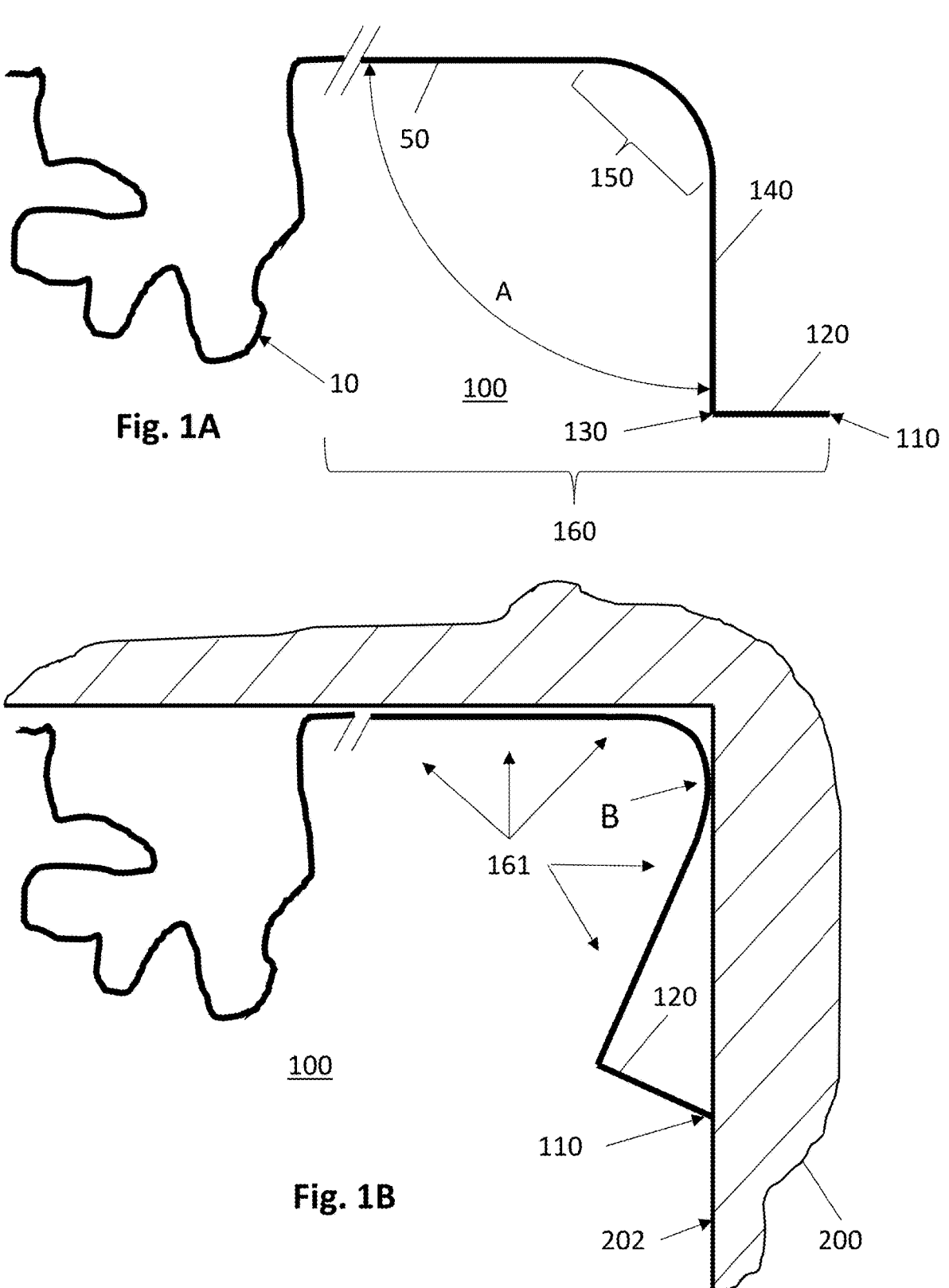
FIG. 1A illustrates a sectional view of a thermoplastic article 100 having a deflectable flange 160 formed at an edge thereof. The deflectable flange 160 in this embodiment includes an extension 50, a bend region 150, a spacer 140, and a peripheral flange 120. The extension 50 connects the shaped body 10 of the article 100 to the bend region 150 of the deflectable flange 160. A spacer 140 can be (and preferably is) interposed between the bend region 150 and the peripheral flange 120. The peripheral flange 120 is connected to the spacer 140 by way of an elbow 130, which is shown as a right-angle bend in this embodiment. The bend region 150 connects the extension 50 and the spacer 140 at an approximately right angle (the angle designated A). The peripheral flange 120 terminates at the peripheral edge 110 of the thermoplastic material (represented by a thick solid line in this figure) of which the article 100 is formed.
FIG. 1B illustrates the thermoplastic article 100 inserted within the interior of an upper body 200, which is shown as a broken-away portion (indicated by the rough line). In this embodiment, impingement of the peripheral edge 110 of peripheral flange 120 upon the inner surface 202 of the upper body 200 causes the deflectable flange 160 to defect, owing to bending of the deflectable flange 160 at one or more points B within the bend region 150.

The subject matter disclosed herein relates to formation of shaped thermoplastic articles, and more specifically to articles which are formed such that one or more of the edges of the article has a conformation wherein the peripheral edge of a thermoplastic sheet from which the article is formed is turned away from a face of the article, and preferably away from the periphery of the article, so that a fragile material (e.g., flesh or a thin, flexible plastic sheet) that is applied against the face or periphery does not contact the edge of the sheet. Because such sheet edges can be sharp, especially when the edge has been cut or broken, directing the edge away from a face and/or periphery of the article can prevent damage to fragile materials which contact the face or periphery. The subject matter disclosed herein is of particular use in forming containers which will be sealed with fragile plastic films applied against a face of the container or in which the container is wrapped. In a preferred embodiment disclosed herein, the peripheral edge of the thermoplastic sheet from which the article is formed is turned away from the article's periphery so far that the resulting article is suitable for use in any or all of OW, VSP, and MAP sealing technologies. Desirably, thermoformable and moldable plastics tend to be widely acceptable in recycling programs, and articles made therefrom can be more readily recycled than, for example, foamed plastic articles.

Briefly summarized, the basic method described herein for forming a shaped thermoplastic article having a smooth edge involves forming a deflectable flange at the periphery of the article. The deflectable flange includes the potentially-sharp or -rough peripheral edge of the thermoplastic material from which the article is formed. The deflectable flange is softened (i.e., raised to a temperature at or above the glass transition temperature of the material of which the flange is formed, and preferably a temperature less than the melting point of the material) at one or more portions thereof so that the peripheral edge is directed away from the periphery of the article when the deflectable flange is deflected toward the body of the article (preferably 'hiding' the peripheral edge between the deflected portion of the deflectable flange and the extension, the body, or both. Cooling (i.e., stiffening) the softened and deflected deflectable flange below its glass transition temperature "locks" the peripheral edge in that position, lessening the likelihood that material (e.g. flesh or film) that contacts the periphery of the article will be damaged by the sharpness or roughness of the peripheral edge.

It is the presence of the deflectable flange formed at the periphery that permits peripheral edges (and, particularly, curved edges and corners of peripheral edges) to be "rolled over" to yield a smooth periphery. In previous trays which included an exterior flange (e.g., a tray having a periphery like that shown in FIG. 1A, lacking the bend region 150, the spacer 140, the elbow 130, and the peripheral flange 120, and having the peripheral edge 110 at the periphery of the extension 50), bending or rolling of the exterior flange might have been possible along straight edges, but bending or rolling curved edges and corners of such exterior flanges could not be performed without buckling or wrinkling of the material in the flange, yielding an undesirable non-smooth edge. It is the presence of the smooth bend region 150 and the spacer 140 of the deflectable flange described herein that permits the peripheral edge 110 to be deflected away from the periphery of the article without such buckling or wrinkling, yielding a smooth periphery. It can be seen from FIGS. 1, 4, 5, 7, and 8 that the bending, flexing, and curling that the deflectable flange undergoes can be effected in any one or more of the extension 50, the bend region 150, the spacer 140, the elbow 130, the peripheral flange 120, and even at the peripheral edge 110. Whichever one or ones of these elements are caused to bend or deflect in order to achieve the effect, the resulting disposition of the potentially sharp peripheral edge 110 away from the periphery of the article, and preferably not reasonably accessible from the exterior of the article at its periphery yields an article having a smooth periphery which is suitable for contacting with fragile films, tissues, or other surfaces.

In one embodiment, the deflectable flange includes a peripheral flange that juts outs in a peripheral direction from the article and is attached to a spacer portion by way of an elbow (e.g., a 90-degree turn or a turn through some other offset angle, such as one of 60-120 degrees) in the thermoplastic material that forms the article. The body of the article is attached to the spacer by way of a bend region, which defines an angle (angle A in FIG. 1A; preferably an approximately right angle) between the spacer and the portion of the body adjacent the bend region (i.e., this portion will usually be the extension which serves to connect the body to the bend region). The deflectable flange is inserted into the interior of a cavity in a body (e.g., an upper body 200 or a ram 300) such that the peripheral flange is impinged by a wall of cavity, thereby deflecting the deflectable flange in the direction of the body of the article. Upon such deflection, heat is applied to the bend region that is sufficient to soften or melt the thermoplastic material at the bend region, so that the deflectable flange remains deflected toward the body when the bend region cools. Optionally, a ram can be inserted into the cavity after the deflectable flange, and a face of the ram which contacts the deflected peripheral flange can induce further deflection of the deflectable flange, further displacing the peripheral edge of the article away from the periphery of the article upon cooling. In this way, a smooth, "rolled" edge of the thermoplastic material forms the outermost periphery of the article, while the peripheral edge of the thermoplastic material remains within the outermost periphery of the article, where the sharpness of that edge is less likely to damage fragile materials which contact the outermost periphery of the article.

In another embodiment, the deflectable flange is contacted with a ram that deflects the deflectable flange in a direction that deflects the sharp edge of the thermoplastic sheet away from the periphery of the article. Before, during, or after such deflection, one or more portions of the deflectable flange (e.g., the bend region, the spacer, the elbow, the peripheral flange, any portion(s) that contact the ram, or a combination of these) are heated sufficiently to soften the thermoplastic material, and the deflectable flange is thereafter cooled to "lock in" the deflection. Depending on the degree of deflection, the peripheral edge of the thermoplastic material can be simply turned away from the periphery of the article, turned in a direction approximately opposite the periphery, or even "rolled up" by deflecting the deflectable flange at a sufficiently tight radius while it is softened that a J-shaped, U-shaped, or even spiral-shaped conformation is achieved (i.e., any shape yielding a substantially smooth peripheral edge), with the peripheral edge being thereby rendered virtually incapable of damaging flesh or film present at the periphery of the article.

Individual elements and aspects of the shaped articles and methods for making them are now described in greater detail.

The Shaped Article

The methods described herein are believed to be applicable to articles having a wide range of shapes and sizes, especially articles which normally have a sharp peripheral edge when made by common methods. Motivation for making shaped thermoplastic articles with smooth edges stemmed in part from a desire to make common storage trays (e.g., plastic trays used for storing foodstuffs such as fresh or frozen meats, fruits, or vegetables) having edges that are sufficiently dull (non-sharp) that the trays can be wrapped in or contacted with thin plastic films such as polyvinylidene chloride and polyethylene films without the film being cut or punctured by the tray edge under normal usage conditions. However, once the methods described herein were developed, it was recognized that the smooth, rounded edges are desirable in a variety of other situations, such as preventing injury to the flesh of humans handling trays and other shaped articles and preventing damage to films sealing one tray by sharp edges of a second sealed tray (e.g., as in a shipping container containing multiple sealed trays).

By way of example, a common method of making shaped articles such as meat trays is by thermoforming a sheet of a thermoplastic. In thermoforming processes, a portion of a long sheet of a thermoplastic is raised to a temperature at which the thermoplastic softens and can be molded. The softened thermoplastic is applied against the surface of one or more molds (often with the aid of negative air pressure to ensure a tight opposition of the softened thermoplastic film against the mold surface). As the film cools (e.g., upon contact with the mold surface), the thermoplastic hardens and becomes less easily deformable, resulting in the thermoplastic film attaining and retaining the shape imposed upon it by the molding process. Multiple casts are often made of the same article in a single sheet of film in thermoforming processes, and the individual articles are freed from the film by cutting (e.g., die cutting) the film about the periphery of the article. This process tends to yield a sharp edge at the cut portions of the film, including a sharp edge that surrounds all or a portion of the periphery of the article (i.e., where the article was cut from the film).

Further by way of example, a thermoplastic material can be melted in an extruder and injected into a mold cavity which defines the shape of the molded article. After cooling, the mold can be opened to release the molded article. In molding processes, it is common for thermoplastic material to appear at parts of the finished articles where it is not desired, such as "flashing" that occurs when molten thermoplastic flows between mold plates or at the ports through which the molten thermoplastic was fed into the closed mold. These non-desired parts can be sharp in their own right, and sharp edges can be left when these non-desired parts are cut from the molded article.

The size and shape of the articles described herein are not critical. In general, the shaped articles will be ones for which handling of the articles or contact between peripheral edges of the article and one or more fragile materials is anticipated. The edge-smoothing process described herein can remove one or more sharp edges from thermoplastic articles which normally have such sharp edges, regardless of the method(s) by which the articles are produced.

The Smoothing Method

The periphery of a thermoplastic article-particularly one formed from a bent or shaped sheet of a thermoplastic material—can be smoothed by a process that includes forming a deflectable flange near the periphery of the edge to be smoothed, deflecting a bent portion of the flange to displace the edge from the periphery of the article, softening the bent portion at least while the flange is in the deflected position, and re-hardening the bent portion while the flange is in the deflected position. This process is illustrated in FIG. 1. The portion of the deflectable flange 160 that can be softened and bent can be the bend region 150 or, preferably, a portion of the deflectable flange distal to the bend region 150, but proximal to the peripheral edge 110. By way of example, softening the spacer 140 permits its peripheral portion, including the elbow 130, peripheral flange 120 (if these two elements are present), and peripheral edge 110 to be bent inwardly (i.e., toward the body 10 of the article 100) sufficiently to displace the peripheral edge 110 away from the periphery of the article.

Preferably, at least a portion of the spacer 140 is softened and bent sufficiently that the peripheral edge 110 is "rolled over," such that the peripheral edge 110 is positioned such that a film that overwraps the article or that is draped across the article does not contact the peripheral edge 110, even if pulled taut. Still more preferably, the deflectable flange 160 is rolled over sufficiently that the peripheral edge 110 is visually obscured by the spacer 140 or the bend region 150 such that the peripheral edge 110 cannot be seen when the article 100 is viewed horizontally from it periphery (i.e., from its peripheral side). Also preferably, the deflectable flange 160 is rolled over sufficiently that the peripheral edge 110 "points" toward the body 10 or toward the underside of a portion of the deflectable flange 160, meaning that the plane of the deflectable flange at the portion including its peripheral edge 110 intersects the body 10, including the underside 161 of the peripheral edge. When the plane of the deflectable flange at its edge including the peripheral edge 110 does not point at the body 10 or the underside 161, then that peripheral edge should at least be displaced far enough from the periphery of the article 100 or rolled over sufficiently to obscure the peripheral edge 110 by one or more portions of the deflectable flange 160.

FIG. 1A illustrates a thermoplastic article 100 having a body 10 (with, in this figure, an irregular shape) and a deflectable flange connected with the body 10. The deflectable flange includes a peripheral flange 120 which includes a peripheral edge 110 of the thermoplastic sheet from which the article 100 is formed. The deflectable flange also includes a bend region 150 interposed between the body 10 of the article 100 and the peripheral flange 120. The bend region 150 is separated from the body 10 by an extension 50, which is simply a flat portion of the thermoplastic sheet in this embodiment. The peripheral flange 120 is similarly separated from the bend region by a flat portion of the thermoplastic sheet designated the spacer 140 in this embodiment. The peripheral flange 120 is connected to the remainder of the deflectable flange by an elbow 130 which, in this embodiment, is a portion of the thermoplastic sheet formed into a right angle.

FIG. 1A is a cross-section of such an article 100, in which the solid black line represents the cross-section of the thermoplastic sheet from which it is formed. The peripheral edge 110 forms the periphery of the article 100 because no other portion of the article 100 extends farther to the right (in this figure), the spacer 140 and the other portions of the peripheral flange 120 being nearer to the body 10 than the peripheral edge 110 of the sheet. Thus, if an object were urged against the right side (in FIG. 1A) of article 100, the object would tend to contact peripheral edge 110 and the sharpness of that peripheral edge 110 could affect the object, such as by cutting, damaging, or injuring the object.

In FIG. 1B, the thermoplastic article 100 is inserted within an interior cavity of an upper body 200. The inner surface 202 of the upper body impinges upon the peripheral flange 120, deflecting it inwardly (i.e., anti-peripherally) toward the body 10 of the article 100. In this embodiment, both the peripheral edge 110 of the thermoplastic sheet from which the article 100 is formed and the peripheral-most portion of the bend region 150 are positioned about equally peripherally from the body 10. Preferably, the deflectable flange 160 is deflected inwardly sufficiently far that the peripheral edge 110 of the thermoplastic sheet is contained within the interior cavity of the upper body 200. In this embodiment, the spacer 140 is essentially rigid and substantially all bending occurs within the bend region 150. If heat sufficient to soften the thermoplastic sheet is applied to the bend region 150 (at approximately the location identified as "B" in FIG. 1B) and the sheet is subsequently cooled (preferably below its glass transition temperature), then the deflectable flange 160 will retain the configuration shown in FIG. 1B (i.e., deflected relative to its initial conformation shown in FIG. 1A on account of impingement of the peripheral edge 110 against the inner surface 202 of the upper body 200) even after upper body 200 is separated from the article 100. In this deflected conformation, the peripheral edge 110 does not extend peripherally beyond the rounded bend region 150, and the resulting article will be more suitable for sealing with a thin plastic film applied to extension 50 and bend region 150 than was the original, pre-deformation article shown in FIG. 1A (i.e., on account of the protuberance of potentially sharp peripheral edge 110 beyond the periphery of bend region 150, at which position the peripheral edge 110 might readily snag, abrade, or cut the film).

Figure 1C:
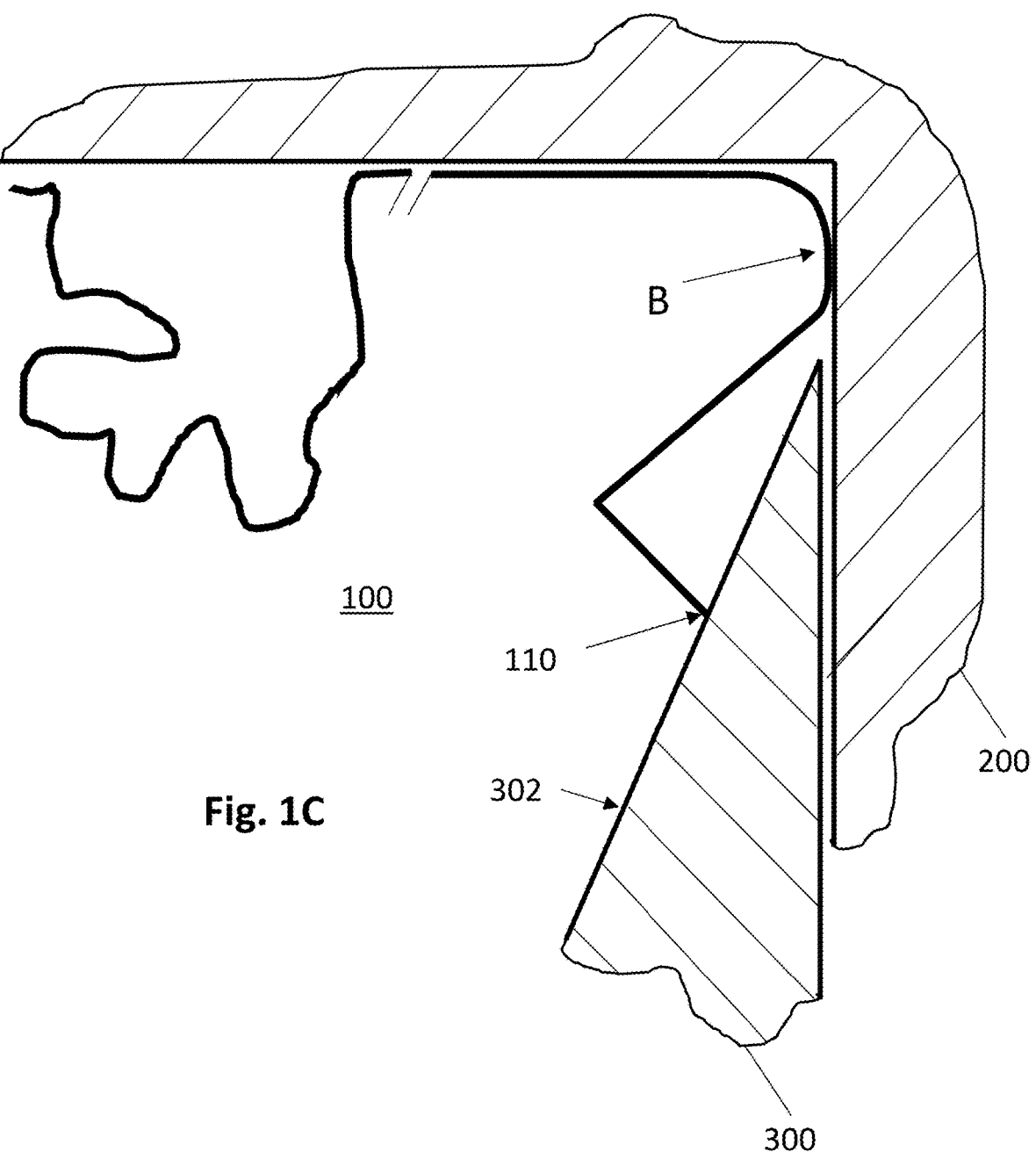
FIG. 1C illustrates the outcome of inserting ram 300 (only a broken-away portion shown, as indicated by the rough line) into the interior of the upper body 200 behind the thermoplastic article 100 (i.e., when the ram 300 is inserted into the structures illustrated in FIG. 1B). The ram 300 is closely opposed against the inner surface 202 of the upper body 200 and the the peripheral edge 110 of peripheral flange 120 impinges upon the upper face 302 of the ram 300, causing even greater deflection of the deflectable flange 160 and yielding a rounded periphery to article 100 at the point(s) B at which bending is induced within the bend region 150.

FIG. 1C illustrates an optional, but preferable step in which a ram 300 is inserted within the cavity in the upper body 200 behind the article 100 (i.e., sandwiching at least the deflectable flange 160 between the upper body 200 and the ram 300). This step further deflects (relative to the embodiment show in FIG. 1B) the deflectable flange 160 towards the body 10 of the article 100, thereby displacing the (potentially sharp) peripheral edge 110 of the thermoplastic sheet further from the periphery of the article (i.e., farther from inner surface 202 of the upper body 200). Heating the bend region 150 of the deflectable flange 160 sufficiently to at least soften it while it is in the conformation shown in FIG. 1C and subsequently cooling it below its glass transition temperature will 'freeze' the deflectable flange in the conformation shown. In this conformation, the sharp peripheral edge 110 of the sheet from which the article is formed is 'tucked' under other portions (e.g., the bend region 150 and the extension 50, if present) of the deflectable flange 160, and is consequently less accessible to objects contacting the periphery of the article (and less liable to tear, cut, or injure materials which contact the periphery of the article). For example, if a thin plastic film is applied to extension 50 and bend region 150, then the film is even less likely to be snagged, abraded, or cut by the potentially sharp peripheral edge 110 in this embodiment than it was in the embodiment shown in FIG. 1B. From this progression (i.e., greater deflection in FIG. 1C than in FIG. 1B and FIG. 1A), it can be seen that the more the peripheral edge 110 is deflected away from the periphery of portions of the article to which a sealing film is applied, the less likely damage to the film from the edge becomes.

The ram 300 and the upper body 200 each serve the purpose of deflecting the deflectable flange by impacting upon or against it. These two items are therefore essentially interchangeable and can each be used alone or in combinations two or more ram(s) and upper body (ies). In this disclosure, the term "ram" is used to refer to a body that impinges upon the deflectable flange by being applied thereto or thereagainst in a direction from the portion of the deflectable flange most distal from the body of the shaped article. Similarly, the term "upper body" is used to refer to a body that impinges upon the deflectable flange by being applied thereto or thereagainst in about the opposite direction (see, e.g., FIGS. 1C and 4).

In the example shown in FIG. 1C, the portions of the ram 300 which impinge upon the peripheral flange 120 of the deflectable flange 160 while the article is lodged within the cavity in the upper body 200 has a wedge-shaped cross section. Such a ram can be useful for directing the peripheral flange 120 and peripheral edge 110 anti-peripherally, in that the farther the ram is advanced within the interior in the direction from the peripheral edge 110 toward the bend region 150, the farther the peripheral flange 120 and peripheral edge 110 will be deflected in an anti-peripherally direction. However, these portions of the ram 300 need not be wedge-shaped. Substantially any shape of ram 300 that will deflect the peripheral flange 120 and peripheral edge 110 anti-peripherally when the ram 300 is inserted behind the article 100 in the upper body 200 can be used, such as blunt or rounded (convex or concave at its upper face 302), or a combination of any of these, can be used, for example as shown in FIG. 5.

Figure 8D:
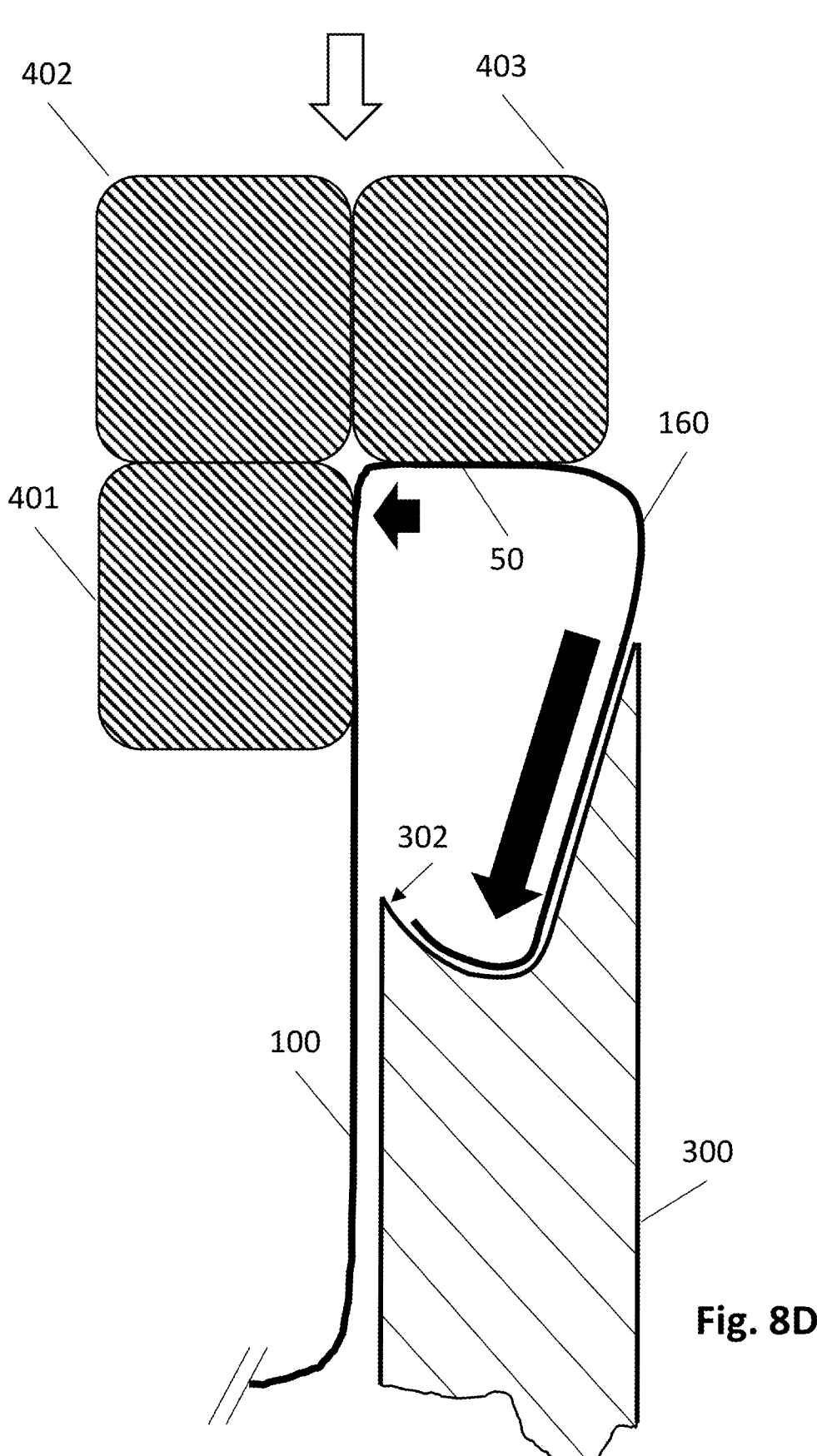
FIG. 8D illustrates using one or more objects to assist with deflection and rolling over of the deflectable flange as describe herein. Object 401 (referred to elsewhere herein as a plug) is disposed within an interior compartment of the shaped article 100 and abuts against an inner surface of the shaped article 100 during impingement of the deflectable flange 160 against the ram 300, in order to reduce or prevent inward deflection of the inner surface during the operation. Object 403 applies downward pressure (open arrow) against, in this embodiment, the extension 50 portion of the deflectable flange 160, in order to impinge the deflectable flange 160 against the upper surface 302 of the ram 300. In this embodiment, object 402 rigidly connects objects 401 and 403. Filled arrows depict forces imposed upon the article 100 upon application of the downward pressure.
Figure 8D:
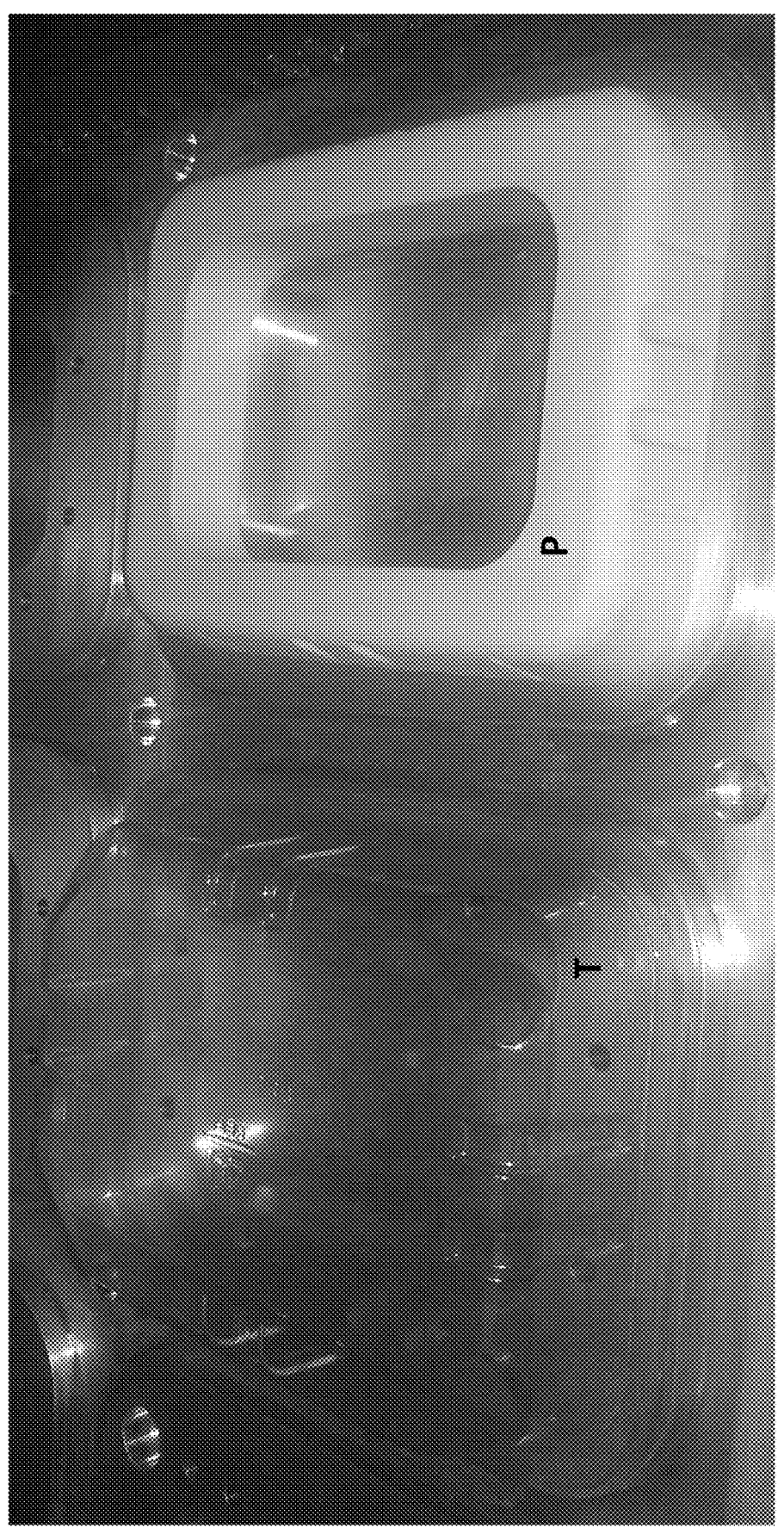

FIG. 8 illustrates an alternate method of rolling or otherwise shaping the edge of an article. As can be seen in FIG. 8A, the deflectable flange 160 in this embodiment lacks an elbow or peripheral flange, and instead includes only a spacer portion that terminates at the peripheral edge 110 of the thermoplastic sheet. This deflectable flange is urged (in the direction indicated by the open arrows in FIG. 8, regardless of how such urging is achieved, such as by moving either or both of the article 100 or the ram 300) against the upper surface 302 of a heated ram. When the direction of travel of the deflectable flange closely parallels the conformation of the upper surface (i.e., as in FIG. 8A), relatively little of the deflectable flange may contact the upper surface and relatively little heat may be transferred from the ram to the deflectable flange. However, as shown in FIG. 8B, when relative movement of the article and the ram cause greater surface contact or greater proximity between the upper surface of the ram and the deflectable flange, the interfacial area of contact/proximity can be greater, resulting in greater heat flow from the ram to the deflectable flange. Sufficient heat flow will result in softening of the thermoformable material, causing the deflectable flange to assume the conformation of the upper surface. When, as shown in FIG. 8C, still further relative movement of the article and the ram is made, a greater portion of the deflectable flange will be softened and deflected. As with the embodiment shown in FIG. 1B, it can be seen in this embodiment that heat suitable for bending the deflectable flange is being applied (at multiple locations B in FIGS. 8B and 8C); however, in order to "roll over" the portion of the deflectable flange that includes the peripheral edge, little or no flexion, and no heat application, is occurring at the bend region 150 (other than perhaps to a small degree as the peripheral-most portions of the bend region 150 approach the heated ram 300, as in FIG. 8C). For the purposes of the processes described herein, it is substantially immaterial which portions of the deflectable flange are softened and bent, so long as the desired result is obtained: the potentially sharp peripheral edge 110 is deflected away from the periphery of the article and, preferably, sequestered (as in FIG. 8C) where it is very unlikely to contact any easily-damaged film or tissue which contacts the periphery of the shaped article. The deflectable flange can be contacted with, or brought into close proximity with, the ram in a single smooth motion, in a plurality of discrete, incremental advances, or a combination of these, in order to permit portions of the deflectable flange to soften sequentially.

Figures 9A, 9B, 9C:
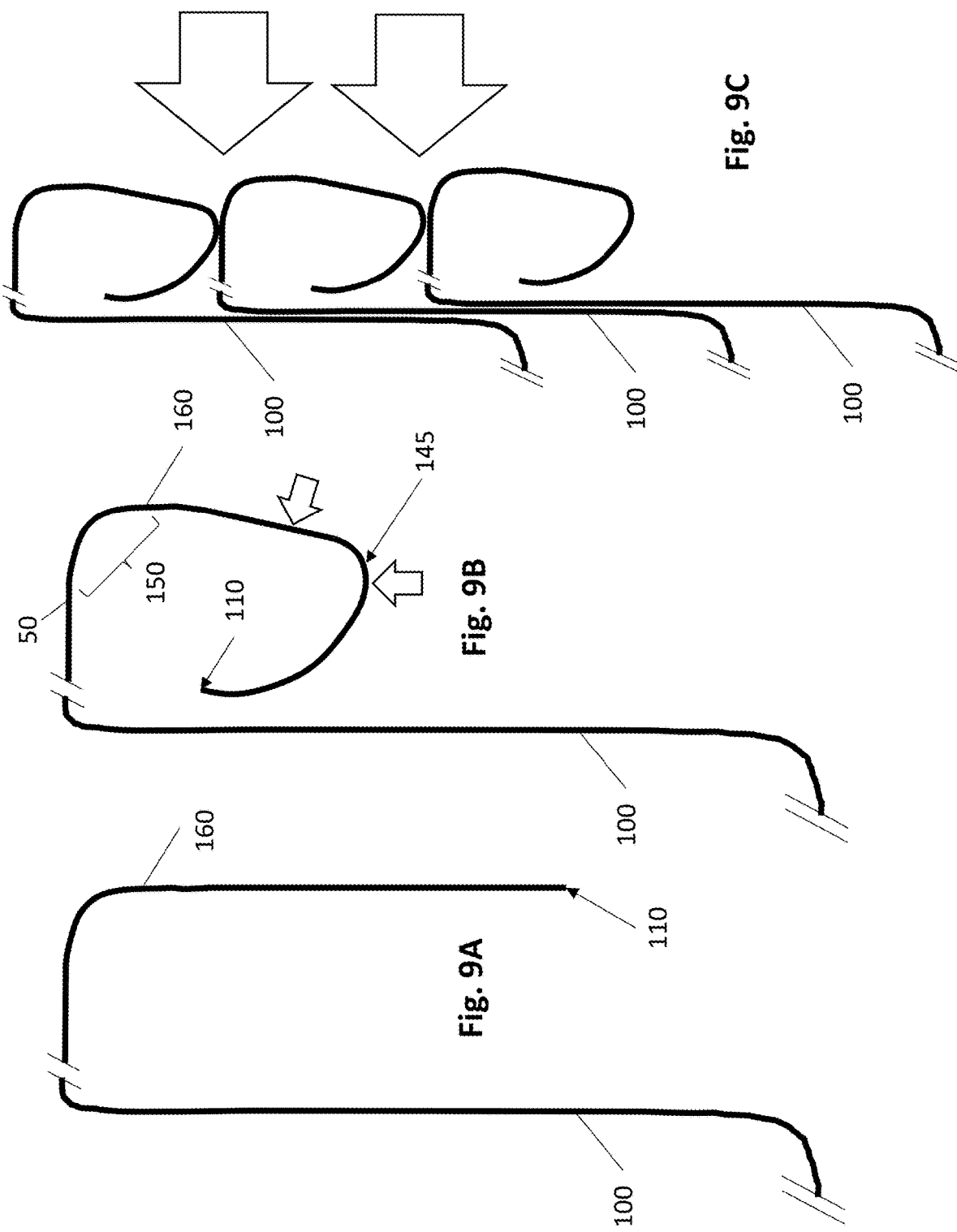
FIG. 9A is a cross-sectional view of one edge of an article 100 showing the conformation of its deflectable flange 160 prior to the rolling-over operation described herein, including the property that the potentially sharp or rough peripheral edge 110 is accessible to contact a film used to seal the article or another nearby film or object.
FIG. 9B is a cross-sectional view of one edge of an article 100 have a peripheral edge 110 rolled over by the technique illustrated in FIGS. 8A-8C. Relative to the article engaged with the ram illustrated in FIG. 8C, the deflectable flange 160 of the article has 'rebounded' in a peripheral direction following disengagement from the ram. Because the plastic material of which the article is constructed is flexible, the rolled-over edge shown in FIG. 9B exhibits 'springiness' when urged in directions normal to the plane of the figure, such as in the directions indicated by the open arrows.
FIG. 9C is a cross sectional view of the edges of three of the articles 100 shown in FIG. 9B, the articles being stacked in a nested configuration. Because each of the article has the same shapes (e.g., a tray like the one shown in the lower portion of FIG. 6C), each article can nest and be urged together until with others its rolled-over edge contacts the tray above and/or below it.

As the thermoformable material moves out of contact with the ram (either by disengaging the two or, as shown in FIG. 8C as a portion of the deflectable flange moves beyond the upper surface of the ram), the thermoformable material can cool and the deflection induced therein will be retained upon cooling. As shown in FIG. 9A, disengagement of the article and the ram results in a rolled-over edge of the article, the rolled-over edge having a smooth periphery and being suitable for handling and/or contact with fragile plastic films.

In FIG. 8A-8C, the deflectable flange was depicted lacking the elbow 130 and peripheral flange 120 illustrated in FIG. 1A for the sake of simplicity of illustration. Although production of deflectable flanges lacking the elbow and peripheral flange is possible (e.g., by mechanically or laser-cutting the deflectable flange at the spacer 140 shown in FIG. 1), such production can be difficult and costly and is therefore of limited practicality in large-scale production operations. For this reason, shaped articles 100, such as those intended for use as packaging trays for food, that are processed described herein will often have both the elbow and peripheral flange illustrated in FIG. 1A. As illustrated in FIGS. 8E-8K, shaped articles bearing the elbow and peripheral flange can nonetheless be processed using the methods and equipment described herein.

FIGS. 8E-8G depict processing of a shaped article 100 that has a deflectable flange 160 that includes both the peripheral flange 120 and the elbow 130 described herein, and the processing depicted in these figures is roughly analogous to that depicted in FIGS. 8A-8C. In FIG. 8E, the peripheral edge of the deflectable flange 120 directly contacts the upper surface 302 of the ram 300. Because the ram is heated, heat is conducted directly to the peripheral edge where it contacts the ram and by radiation from closely-opposed portions of the spacer 140. By controlling heat flowing from the ram and the residence time of the article 100 in the position shown in FIG. 8E, an operator can induce softening of portions of the deflectable flange, particularly including at its peripheral edge and at portions of the spacer near that peripheral edge. Softening of these portions facilitates bending of the deflectable flange at the softened portions, such as by urging the article further against the ram, such that a curved portion of the upper surface will induce bending as the more-peripheral portions of the deflectable flange are driven against the curved portion of the upper surface by the less-peripheral portions (which transmit force applied to the article), as shown in FIG. 8F. Further urging of the article against the ram, as shown in FIG. 8G, causes the portions of the deflectable flange that are in contact with the upper surface of the ram to slide across that upper surface. As material is driven beyond positions in which it is in contact with the upper surface, it may remain softened (and susceptible to further bending) for a short period of time, or it may cool and become only deflectable (rather than bendable or moldable). Whether cooled by movement past the heated portion(s) of the ram or by removing the article from contact with the ram (or even by applied cooling, such as by directing cool air at shaped portions, by using a cooled plug element within the body of the article, or otherwise), cooling of the deflectable flange below its glass transition temperature "sets" or "locks in" the conformation of the material at the time of that transition. Thus, by shaping the deflectable flange so that it has the conformation shown in FIG. 8G and cooling it below its glass transition temperature, the edge of the article can be rendered smooth (both because its bend region 150 is smooth and because its spacer 140, including its peripheral edge 110 have been changed to have a conformation in which no rough or sharp edges are present at the periphery of the article.

As shown in FIG. 8F, the peripheral flange 120 can be partially deflected during shaping of the deflectable flange; in the finished article, the peripheral edge preferably "points" toward the body or the underside of the deflectable flange. As shown in FIG. 8G, shaping of the deflectable flange will sometimes result in disappearance of the peripheral flange and the elbow interposed between it and the remainder of the spacer. This can occur because the material in the peripheral flange "melts" into the spacer or simply because the offset angle of the elbow becomes approximately 180 degrees. As can be seen in FIG. 8J, for example, though, the peripheral flange 120 can deflect in a direction that it remains distinct from the remainder of the spacer, potentially forming a hook-like structure. Because such a structure could position the potentially-sharp or -rough peripheral edge at or near the periphery of the article, it is preferable that the deflectable flange be deflected sufficiently that any such hook-like structure is contained within (relative to the periphery of the article) the rolled-over edge, as illustrated in FIG. 8K.

In the methods illustrated in FIGS. 1 and 8, impingement of the upper body 200, the ram 300, or both upon the deflectable flange 160 can induce inward flexing of the walls of the shaped article. By way of example, the compression induced in the deflectable flange upon impingement upon the flange of the sidewalls of the upper body (compare the positions of spacer 140 in FIGS. 1A and 1B) will induce inward (i.e., away from the sidewalls of the upper body and toward the shaped body 10 of the article 100) force on extension 50, which force will be transmitted to the shaped body, potentially causing a portion of the body to buckle or deflect. Similarly, impingement of the ram upon the peripheral flange portion 120 of the deflectable flange will also induce inward force on the extension and thereby upon the shaped body. Further by way of example, inward force exerted upon deflectable flanges in embodiments shown in FIGS. 7 and 8 can also be transmitted to the shaped body of the article. Transmission of force from the deflectable flange to the shaped body can be undesirable for at least two reasons. First, deflection of the shaped body can alter the orientation of the deflectable flange and the portions that are bent as described herein, making control of the final shape of the article (and its edge) difficult. Second, force that is transferred from the deflectable flange to the body will generally not drive the deflectable flange against the ram and/or upper body, meaning that the force will not cause the bending and deflection of the deflectable flange described herein, at least to the intended degree. It is therefore desirable to limit transmission of force from the deflectable flange, deflection of the shaped body by such forces, or both, so as to direct the force into deflection of the deflectable flange.

Substantially any equipment or method for preventing or reducing transmission of force from the deflectable flange to the body, reducing or preventing deflection of the shaped body, or both can be employed. Shown in FIG. 8D is an example of such equipment and how it is used. FIG. 8D illustrates shaping of the deflectable flange 160 in a shaped article 100 by application of downward force (open arrow), as shown in FIG. 8B. In contrast with FIG. 8B, the shaped article shown in FIG. 8D is coupled with three objects, 401, 402, and 403. Shown here in cross-section, each of the three objects is a solid having a rounded square profile (e.g., rounded metal bars). Object 401 is abutted against a portion of the shaped article 100 upon which inward force (smaller, horizontal solid arrow) is applied when the downward force causes the deflectable flange 160 to impinge upon the upper surface 302 of the ram 300. Object 403 abuts the extension 50 of the deflectable flange and transmits the downward force to the deflectable flange. Object 402 connects (rigidly, in this example, but not necessarily) objects 401 and 402. One or more of the three objects can be cooled, to prevent heat (e.g., from heated ram 300) from softening the plastic at its body or extension.

In FIG. 8D, when downward force (open arrow) is applied to the object 403, the force is transmitted to the deflectable flange. Impingement of the deflectable flange upon the ram 300 opposes the downward force. This force could, in the absence of object 401 be transmitted through the deflectable flange (i.e., through extension 50) to the shaped body of the article 100. However, because object 401 is present and held in place sufficiently to prevent deflection of the portion of the article it abuts, downward force applied to the deflectable flange cannot be dissipated by deflection of the shaped body (i.e., in the direction indicated by the small horizontal black arrow in FIG. 8D, because object 401 prevents such deflection), and the downward force is instead imposed along the deflectable flange in the direction shown by the large black arrow in FIG. 8D. This force drives the deflectable flange (particularly its peripheral edge, the peripheral flange if present, and the portion of the spacer nearest the peripheral edge) against the ram 300 and induces deflection of the deflectable flange, conformation of portions of the deflectable flange against the upper surface 302 of the ram (especially when the amount of heat provided by the ram is sufficient to soften those portions), and displacement of the deflectable flange across the surface of the ram. As shown in the figure, the contour of the upper surface of the ram is thereby imparted to the peripheral-most portions of the deflectable flange, resulting in smooth bending of those portions (assuming a smooth contour to the upper face of the ram) and displacement of the peripheral edge of the deflectable flange toward the body of the article (or even 'curled' back beyond the body, for example as shown in FIG. 8C).

The shape, size, arrangement, attachments (if any) of objects 401, 402, and 403 are not critical. Likewise, not all three objects need necessarily be used together; one, two, or all three can be employed. In one embodiment, the three objects are fixed together to form a "lid" or "plug" for a container like that shown in FIG. 6, so that the portion of the lid/plug that corresponds to object 401 can substantially fill the interior of the container (i.e., pressing against all walls, and especially including the four long, straight walls of the container), the portion of the lid/plug that corresponds to object 403 forms a ring that can be applied against the entire rim of the container surrounding its interior, and the portion of the lid/plug that corresponds to object 402 can be any material or mechanism that connect them. For example, such a lid/plug could be formed from a single piece of material (e.g., a 'plug' that fills the entirety of the interior and overlaps the rim surrounding the interior). One or more of the objects can be cooled to reduce heating of the shaped article (other than where desired, at portions of the deflectable flange) and to thereby prevent undesired deformation of the shaped articles during processing.

Generalized, object 401 is simply a mass for preventing flexing of the sides of the shaped article during deflection of the deflectable flange. Such an object may fill substantially all portions of the interior of the shaped article (e.g., the entire interior of the container shown in FIG. 6D). Alternatively, one or more objects 401 may be used to buttress portions of the shaped article that are more easily deflected than others (e.g., the long straight sides of the container shown in FIG. 6D).

Object 403 can be any object that can urge the deflectable flange against the ram. Multiple objects can be used to urge the deflectable flange against one or more rams at various locations on the article, or a single object 403 that contacts the article at or near all portions of the deflectable flange can be used. In one embodiment, object 403 is the upper body 200 described herein, such as in the form that completely surrounds the rim of a container such as that shown in FIG. 6D. Object 403 can be a frame designed to fit snugly against the entire rim of a container surrounding an internal concave compartment of the chamber, so as to simultaneously urge a deflectable flange that completely surrounds that rim against a ram in the manner described herein. In one embodiment, object 403 can be deliberately cooled (e.g., by directing a cooling fluid such as chilled water, chilled oil, or ambient air against or through the object, particularly where the object is made of a good conductor of heat, such as a metal) so as to reduce, inhibit, or prevent heating of the body of the shaped article during processing (e.g., as shown in FIG. 8D). Object 403 can be linked, rigidly or movably, with object 401 so that the flex-resisting object 401 can be applied to the interior of a shaped article simultaneously with application of force to the deflectable flange of the shaped article by object 403.

Object 402, when present, can be an object that connects object 403 to a source of force, an object that holds object 401 in place within a concave portion of shaped article 100 during deflection of deflectable flange 160, or a combination of these.

Figure 9D:
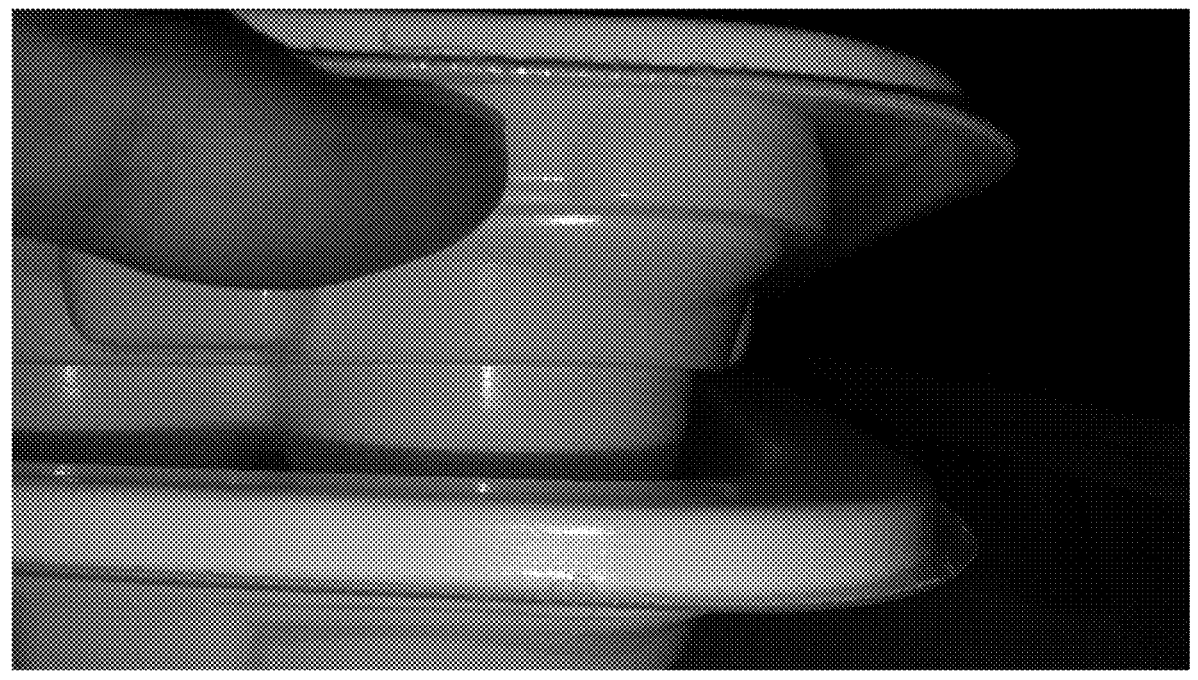
FIG. 9D is an image of a prior art thermoformed plastic tray having a stacking lug (the corner extension beneath the rim, toward which the finger in the image is pointing). The stacking lug serves to maintain a controlled separation distance between stacked trays, as shown in the left portion of FIG. 9E (which is an image of two of these prior art trays stacked against one another, with the inter-tray distance being limited by the stacking lug). The right portion of FIG. 9E shows two stacked, nested trays having rolled-over edges (as illustrated diagrammatically in FIG. 9C with three trays). An inter-tray division is visible between the rims of the two stacked trays.
Figure 9E:
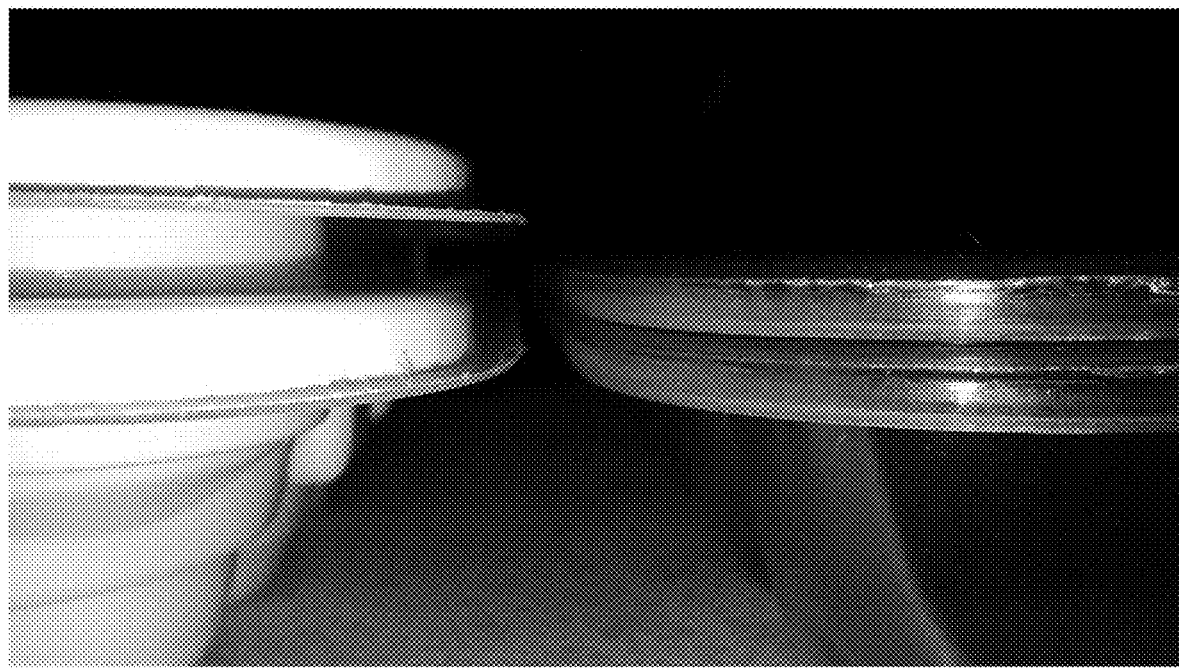
FIG. 9E illustrates that two trays having rolled-over edges as described herein can be stacked in a separable way in a smaller volume than can prior art trays having stacking lugs.

As illustrated in FIGS. 9C and 9E, an additional advantage of the rolled-over edge formed by this process is that the rolled edge can be used instead of conventional stacking lugs (i.e., thermoform-shaped portions of articles contoured to limit how closely an article can nest within another otherwise-identically shaped article). Such known stacking lugs, in order to perform their desired anti-nesting function, must furthermore be narrower at their upper end than their lower end (referring to FIG. 9D as an example) in order to prevent nesting of the stacking lugs of adjacent trays. This 'narrower-at-the-top' conformation presents known difficulties with de-molding the trays during thermoforming, since the narrower 'top' portion of the lug must be stretched or deformed over the larger 'bottom' portion of the lug mold in order to remove the thermoformed tray from the mold. The rolled edge depicted in FIGS. 8 and 9 (i.e., made as described herein) avoids this difficulty, while still preventing inappropriately close nesting of adjacent trays. Trays having the rolled edge described herein can be separated using conventional de-nesting equipment (e.g., screw- and finger-based machines for separating adjacent nested/stacked trays) and, as shown in FIG. 9E, permit denser packing of trays than is possible using trays having formed stacking lugs.

Figure 9F:
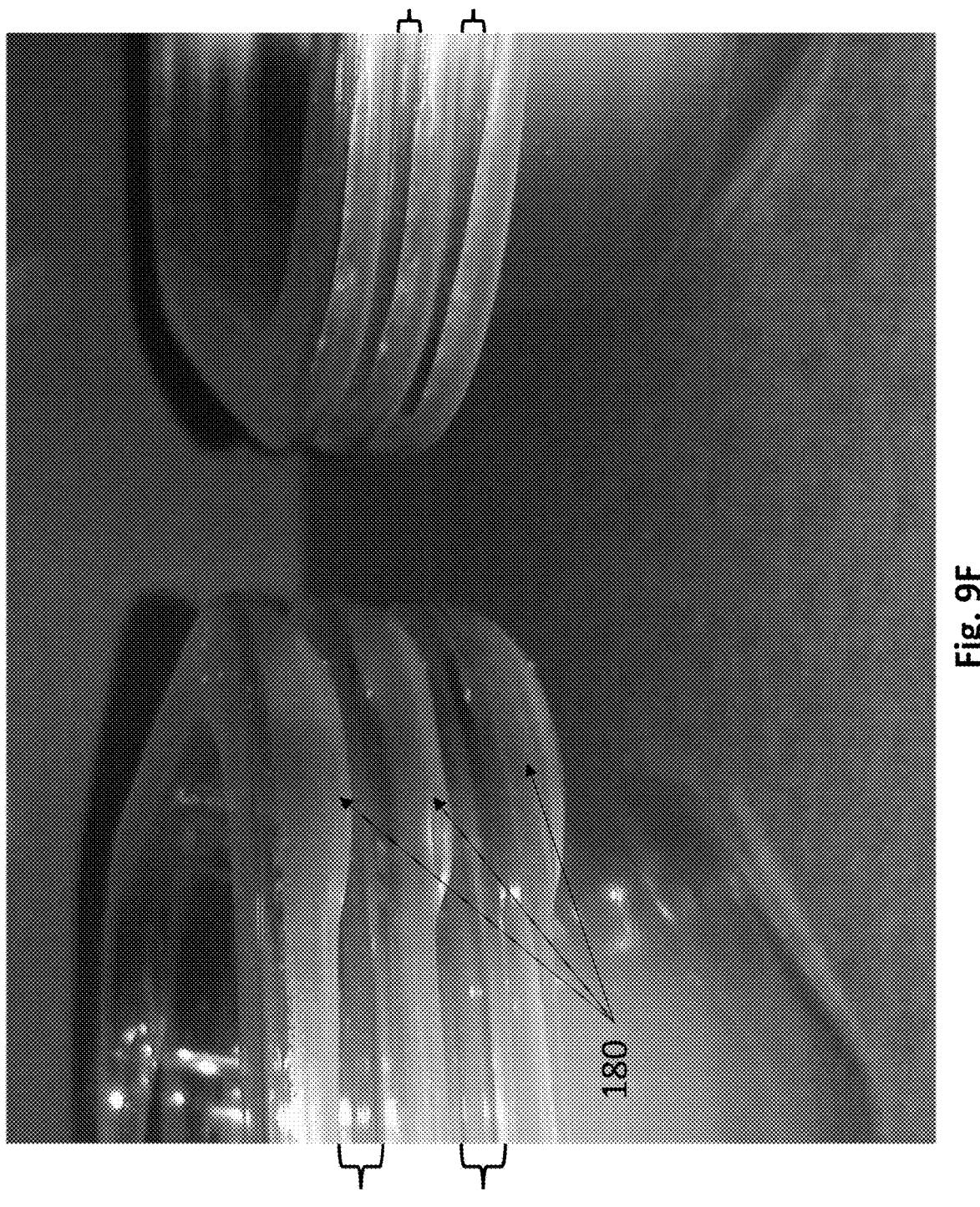
FIG. 9F shows, on its left side, three nested and stacked trays having rolled-over edges and having stacking extensions 180 formed into the corners thereof to increase separation between the straight edges of the stacked trays. The three stacked trays having stacking extensions 180 can be seen to have greater separation (large brackets on left side of figure) than the separation (small brackets on right side of figure) of three otherwise-identical stacked trays lacking stacking extensions.

FIG. 9F illustrates an optional embodiment of the rolled edge described herein that also affects the stacking characteristics of shaped articles having the rolled edge. On the right side of FIG. 9F are shown three stacked trays having the rolled edge described herein, the rolled edge being substantially identical (including in height) about the entire periphery of the tray. On the left side of FIG. 9F are shown three other stacked trays, these trays also bearing a rolled over edge as described herein about their entire periphery. However, in contrast to the trays on the right of the figure, the rolled edge of those on the left are not uniform about their entire periphery. As shown in the figure at one corner, a smaller portion of the deflectable flange has been rolled over at the corners of these trays than the portion of the deflectable flange that is rolled over along other portions of their edge. As a result, the trays bear rounded stacking extensions 180 at their corners. Like that stacked trays shown on the right of FIG. 9F, those on the left of the figure are nested within one another and settle until the lower surface of the rolled edge of a tray contacts and rests upon the upper surface of the rolled edge of a second tray within which it is nested. However, because the stacking extensions 180 of the trays on the left of the figure have a greater height than much of the rest of the rolled edge of those trays, the trays on the left will nest such that the lower surface of a stacking extension 180 rests on the upper surface of the rolled edge of a tray beneath it, leaving the lower surface of much of the rolled edge of the upper tray out-of-contact with the tray beneath it, yielding a gap between the nested trays (compare the gap indicated by the large brackets in the left of FIG. 9F with the indentation indicated by the small brackets in the right of FIG. 9F). When a shaped article 100 is given a rolled over edge including a stacking extension 180 as described herein, the degree to and way in which the deflectable flange is deflected should nonetheless be selected to position the peripheral edge 110 at the stacking extension 180 such that it is unlikely to contact films or other materials at the periphery of the article 100, as described herein.

Yet another advantage of the 'rolled edge' depicted in FIGS. 8 and 9 is the mechanical strength imparted to a shaped article by such an edge conformation. Thin plastic films tend to be highly flexible, and articles formed from such films can have 'flimsy' edges that are easily deformed upon handling or manipulation (e.g., during sealing or wrapping with film). For the same reasons that hollow tubes or rounds of material tend to be stronger and more rigid than planar sheets of material of the same type and thickness, the curved or rolled edge described herein confer greater edge strength and rigidity to the shaped articles described herein than corresponding articles lacking such an edge. This edge strength and rigidity permits formation of lids upon, or engagement of separately-made lids with shaped articles described herein. Thus, in addition to the shaped articles being sealable with film using OW, VSP, or MAP technologies, the enhanced edge strength of the shaped articles described herein permits them to be sealed with snap-on/snap-off type lids or other conventional sealing technologies. The edge strength and rigidity conferred to the shaped article also prevents deflection induced by tension in a film used to overwrap or seal the article (e.g., so-called "bow-tying" as the phenomenon of a concave article closing upon its concavity when wrapped or sealed) and to withstand stresses imposed by (or necessary to the operation of) container-handling equipment, such as de-nesting equipment used for segregating individual containers from a stack of nested containers.

What is important in these methods is that the potentially sharp peripheral edge 110 of the thermoplastic sheet(s) from which the article 100 is formed should be deflected away from the periphery of the article and 'frozen' in that position by heat-softening and cooling a portion of the sheet that is bent (which will normally include substantially only portions of the deflectable flange) while the sheet is so deflected. The heated, bent, and cooled region preferably includes at least the bend region 150 of the deflectable flange 160, because that region is designed for smooth flexing and yields a smooth periphery to the container. Softening, flexing, and hardening of other portions of the deflectable flange (e.g., the extension 50, spacer 140, elbow 130, and/or peripheral flange 120) can also (or alternatively) be done, and can contribute to smoothness of the article's periphery.

Alternatively, any of these portions of deflectable flange 160 can simply be bent without heating, so long as sufficient bending force is applied that the thermoplastic material irreversibly bends (rather than merely reversibly deflecting upon removal of pressure) at the bent location. However, non-heating-and-softening-based bending methods will tend to leave relative sharp (or, at least, less smooth) edges where bends are imposed, and so such methods are not favored unless care is taken (e.g., by bending materials about a rounded 'mold' member) to ensure that such bends are smooth. The deflectable flange 160 disclosed herein provides a convenient structure for practicing this method.

The Deflectable Flange 160

The deflectable flange includes a bend region 150, a peripheral edge 110, and a spacer 140 interposed between the two. The bend region forms an angle of less than 180 degrees between the body 10 and the spacer 140 and functions as a flexible 'hinge' at which the spacer region can be displaced relative to the body. The angle formed by the bend region (i.e., the angle designated A in FIG. 1A) is preferably about ninety degrees (i.e., approximately a right angle, meaning not less than 75 nor more than 105 degrees, more preferably not less than 85 nor more than 100 degrees, still more preferably not less than 87 nor more than 93 degrees, and most preferably about 92 degrees). When this angle is less than 90 degrees, it can be difficult to remove the thermoformed article from the thermoforming mold (i.e., because the portion of the mold nearest the extension between the spacer and the body can be broader than the width between the body and the spacer nearer to the peripheral edge, meaning that the thermoformed article will 'grip' the mold and must be pulled or expanded to displace it from the mold). Thus, it is preferable that the angle formed by the bend region is 90 degrees or greater (e.g., 91, 92, 93, 94, or 95 degrees) to ease separation of the thermoformed article and the mold, but the angle can be smaller if the body of the article recedes away from the periphery, for example. Less preferably, an angle of 110, 115, 120, 125, 130, or 135 degrees can be employed, but such articles may require application of both an upper body 200 to reduce the angle near to 90 degrees prior to impacting the deflectable flange against the ram 300. As this angle increases, the amount of thermoplastic that is present at exterior corners (e.g., the four corners of the tray shown in FIGS. 6A and 6B) of the thermoformed precursor article increases and can interfere with bending (i.e., "rolling-over"). This thermoplastic material can be accommodated, for example, by permitting the spacer to 'bow out' above the ram (or into a space built into the upper surface of the ram) at sections where the material occurs.

Upon sufficient displacement of the spacer, the bend region forms the periphery of the article (i.e., when the spacer is bent "under" the connected portion of the body, regardless of orientation relative to gravity). Thus, the bend region will normally form the smooth periphery of the article that is desired in one embodiment. The spacer none-theless forms a part of the periphery of the article in this embodiment (normally the "underside" of the periphery, relative to the article 100, with the underside 161 of the deflectable flange 160 being contained within the curvature of the rolled-over edge). For this reason, portions of the spacer (potentially including the elbow 130 and the peripheral flange 120) that are reasonably accessible to a film or other material pressed against the exterior of the article (e.g., against the underside of its periphery) should preferably be smooth as well.

In formation of the shaped articles with a smooth periphery described herein, deflection of the spacer (and/or other portions) of the deflectable flange induces bending within the bend region, within the spacer, or both. The angular shape of the bend region both controls the location of that bending and the smoothness of the resulting edge. As illustrated in FIGS. 1 and 8, it can be beneficial if the angular portion of the bend region is not formed as a sharp (i.e., bi-linear) angle, but is instead formed as flat portions (e.g., an extension 50 and a spacer 140) arranged at an angle to one another, with a curved portion (e.g., defined by a radius of curvature, such as a radius of 1, 2, or 3 or more millimeters) connecting the flat portions. Flexing of a curved angular portion will tend to yield a smoother, less film-damaging edge that flexing of a sharply angled portion. As illustrated in FIGS. 1, 4, 5, 7, and 8, the boundary between the bend region 150 and the spacer 140 may be substantially indistinguishable in practice, and flexion of the spacer 140, at least at its extent nearest the bend region 150 is expected in the embodiments shown. As illustrated in FIG. 8 especially, bending of multiple portions, including the peripheral-most portion(s), of the spacer 140 can desirably impart a smooth periphery to the articles prepared as described herein.

In one embodiment (shown in FIG. 1), the deflectable flange 160 includes at least three portions, including the bend region 150, a peripheral flange 120, and an elbow 130 positioned therebetween. The bend region 150 is connected to the remainder of the article 100, optionally by way of an extension 50. The peripheral flange 120 is connected to the bend region 150 by way of the elbow 130, optionally with a spacer 140 interposed between the bend region 150 and the elbow 130. A prototypical deflectable flange 160 having each of these portions is illustrated (attached to the body 10 of an article 100) in FIG. 1A.

In this embodiment, the bend region 150 is situated anti-peripherally (nearer the body 10) than at least the peripheral-most portion of the peripheral flange 120. The function of the bend region 150 is to deflect when the peripheral flange 120 is deflected inwardly (i.e., anti-peripherally, such as by pressing the periphery of the article against a solid object). Deflection of the bend region provides a smooth surface because the peripheral edge 110 of the thermoplastic sheet is not located within the bend region; it is located on the peripheral flange 120. The angle formed by the bend region (for example, approximately 90 degrees over the bend region 150 shown in FIG. 1A) is not critical, and can be selected for ease of manufacture. It can, for example, be an obtuse angle, a right angle, or even an acute angle. When this angle is an acute angle, it can be difficult to remove the thermoformed (pre-roll-over) article from its thermoforming mold (because the peripheral portion of the spacer must be deflected to remove the article from the mold), and acute angles are disfavored for that reason (even though such articles can still be made). The radius of curvature of the bend region 150 is also not critical, although it is preferably substantially greater than the radius of curvature of the elbow 130.

The bend region 150 preferably has the conformation of a smooth curve, as shown in FIG. 1A, with a substantial radius of curvature (e.g., 0.5 millimeters to several millimeters or more), so that inward deflection of the deflectable flange 160 yields a smooth periphery to the article. However, it is critical that the bend region 150 simply not be sharp or pointed; a non-sharp crease can suffice, for example. Fragile materials, such as thin plastic films or animal skin, which contact that smooth periphery are much less likely to be damaged than when the same fragile materials contact the peripheral edge 110 of the thermoplastic sheet.

The bend region 150 can be connected with the remainder of the article 100 by way of an extension 50. The extension 50 can be discretely discernible from the bend region 150 (e.g., a flat region distinct from a curved bend region 150) or substantially indistinguishable (e.g., a slightly curved region not readily distinguished from the curvature of the bend region 150). The dimensions of the extension region are not critical; it can range from non-existent (i.e., the bend region 150 commences at the edge of a body 10 of the article 100), to a fraction of a millimeter, to several millimeters or longer. One function of the extension 50 is to separate the bend region 150 (at which sheet-softening heat is applied in some embodiments) from other portions of the article 100 at which potential heat-induced deformation is undesirable. Another function of the extension 50 can be to provide a functional surface to the article 100, such as a surface adjacent the bend region 150 at which a thin plastic film (which can be pressed against the bend region 150 with little danger of damage to the film) can be adhered to or fused with the article 100 (e.g., to cover a cavity formed in the article that is bordered by the deflectable flange 160 of which the extension 50 is part). The extension 50 can also serve a structural function, such as providing support or rigidity to a section of the article (e.g., by forming a relatively rigid "rim" about a cavity in a container to inhibit flexing of the container while lidding is applied). Yet another function of the extension 50 can be to provide a space which the deflectable flange 160 can occupy when it is deflected anti-peripherally. Because the extension 50 and the peripheral flange 120 are situated on opposite sides of the bend region 150, sufficient flexing of the bend region 150 (e.g., upon insertion of the article 100 within the upper body 200 and insertion of the ram 300 behind the article), the spacer 140, or both, can cause the peripheral flange 120 (and the spacer 140) to approach, or even contact, the extension 50, or to curl or deflect beneath the extension 50 between the periphery of the article and a sidewall of the body of the article (see, e.g., FIG. 6E).

In FIG. 1A, the peripheral flange 120 includes the (potentially sharp) peripheral edge 110 of the thermoplastic sheet (s) from which the article is formed. It extends peripherally beyond the bend region 150, so that it will impinge upon the inner surface 202 of the upper body 200 when the article is inserted into the cavity of the upper body 200, as shown in FIG. 1B. It extends from the elbow 130 to that peripheral edge 110 and extends in a direction from the bend region 150 or the spacer 140, if present, by an offset angle defined by the elbow 130. The function of the peripheral flange 120 is to engage with (i.e., impinge upon or be impinged upon by) the inner surface 202 of the upper body 200 when the article is inserted into the cavity of the upper body 200, thereby causing the deflectable flange 160 to deflect inwardly (anti-peripherally). In addition to displacing the peripheral edge 110 of the sheet anti-peripherally and causing flexing or bending of the deflectable flange 160 in the bend region 150 thereof, this deflection also positions the peripheral flange

120 to be further anti-peripherally deflected when the ram 300 is inserted into the cavity behind the article 100. When the ram 300 is so inserted, it impinges upon the peripheral flange 120 and, upon further advancement of the ram into the cavity, causes both additional flexing or bending of the deflectable flange 160 in the bend region 150 thereof, and additional anti-peripheral deflection of the peripheral edge 110.

The length (elbow-to-peripheral-edge) of the peripheral flange 120 is not critical, but should be selected to facilitate engagement of the ram 300 by the peripheral flange 120 and displacement of the peripheral flange 120 by the ram 300 as the ram advances within the interior of the upper body 200. Frequently, the length of the peripheral flange 120 is influenced, at least in part, by the ability to cut articles from a material in which the article is formed. The elbow 130 can function, in part, to position the thermoplastic sheet at a location at which it can be conveniently cut to free the shaped article from a precursor sheet. Because the peripheral edge 110 formed by such cutting is a source of sharpness or roughness at the periphery of the article prior to 'rolling over' the deflectable flange 160, it can be beneficial to cut the sheet as near to the elbow 130 as possible (i.e., to make peripheral flange 120 as small as possible) so as to reduce the bulk of thermoplastic material that must be displaced in order to displace the sharp or rough peripheral edge 110 from the periphery of the article. As illustrated, for example, in FIG. 8H, a larger peripheral flange also reduces contact (and increases spacing) between the upper surface of a ram which impinges the deflectable flange, and therefore reduces heat transfer from the ram to peripheral portions of the deflectable flange. Because the methods described herein depend upon heating those portions above their glass transition temperature, deflecting them to a desired conformation, and then cooling the portions below that temperature, larger peripheral flanges increase the heat input and/or time required for such processing and are disfavored for that reason as well.

The elbow 130 is interposed between the bend region 150 and the peripheral flange 120, and its function is to connect and transfer forces between them. That is, compressive forces applied to the peripheral flange 120 by impingement thereupon by the upper body 200 or the ram 300 are translated through the elbow 130 (and the spacer 140, if present) to torsional force applied to the bend region 150. This translation of compressive force to torsional force ensures that the bend region 150, the spacer 140, or both flex when force is applied to the peripheral flange 120. Thus, application of force to the peripheral flange 120 by the upper body 200 and/or ram 300 both deflects the peripheral edge 110 anti-peripherally (i.e., displacing the potentially sharp edge away from the periphery of the article) and induces bending of the bend region 150, the spacer 140, or both (i.e., yielding a smooth periphery formed by flexed thermoplastic sheet at the periphery of the article), yielding an article which has a smooth periphery, even if the article was formed by a process that yields a sharp peripheral edge at an intermediate step. In effect, the elbow causes forces applied to the peripheral flange 120 to induce the deflectable flange 160 to "roll over" the periphery of the article, effectively "hiding" the sharp edge of the thermoplastic sheet from materials at the periphery of the article.

A spacer 140 can be interposed between the bend region 150 and the elbow 130. The spacer 140 can be discretely discernible from the bend region 150 (e.g., a flat region distinct from a curved bend region 150) or substantially indistinguishable (e.g., a slightly curved region not readily distinguished from the curvature of the bend region 150). The dimensions of the extension region are not critical; it can range from non-existent (i.e., the bend region 150 commences at the elbow 130), to a fraction of a millimeter, to a few millimeters or longer. One function of the spacer 140, if present, is to act as a 'lever' by which force applied at the elbow 130 (e.g., by impingement between the peripheral flange 120 and one or both of the upper body 200 and the ram 300) is transmitted to the bend region 150. Another function of the spacer 140, if present, can be to position the peripheral flange 120 suitably to engage one or both of the upper body 200 and the ram 300. Yet another function of the spacer 140, if present, is to increase the distance by which the potentially sharp peripheral edge 110 of the thermoplastic sheet can be displaced anti-peripherally from the periphery of the article upon flexing of the bend region 150. All else being equal, the longer the spacer 140 is, the farther from the article's periphery that potentially sharp edge will be when the article is made as described herein. A deflectable flange including the spacer 140, but lacking the elbow 130 and peripheral flange 120 can be used, as shown for example in FIGS. 8A-8D.

A longer spacer 140 facilitates formation of one or more portions of the "rolled edge" that is taller than other "rolled" portions of the edge, yielding a structure useful as a stacking lug (e.g., to facilitate selectable spacing between the rolled edges of adjacent nested, stacked articles). In one embodiment, the size of the spacer and the compressive force applied to the spacer (i.e., the force transmitted to the spacer from the extension region, balanced by resistive force applied to the spacer on account of its impingement upon the ram) can cause the spacer to flex outwardly (i.e., peripherally away from the body of the article), forming a smooth bulge that, upon cooling, forms the outer periphery of the article.

Regardless of whether the bend region 150, the spacer 140, or both are bent in the operations described herein, and further regardless of whether material that was originally part of the bend region 150, the spacer 140, or both ultimately form the outer periphery of the articles described herein, what is important is that that outer periphery be free (or, less favorably, substantially free) of sharp, pointed, rough, or abrasive edges that might damage thin plastic films, human tissues, or other fragile materials which might contact that outer periphery.

Thermoplastics

The methods and articles described herein can be performed and made with substantially any thermoplastic material. What is important is that the material be capable of being softened by heating and re-stiffened upon cooling, at least in the deflectable flange 160 described herein. Substantially all thermoplastics exhibit a characteristic temperature above which they soften and become flexible or workable and below which they become more rigid and retain their shape. Desirable thermoplastics for the articles and methods described herein retain their shape under normal conditions of the anticipated end use of the container. It is also desirable to use thermoplastics which can be softened under conditions that are readily attainable in a manufacturing environments. Examples of suitable thermoplastics include polyethylene (PE), polypropylene (PP), polyethylene terephthalate (PET), and polyvinyl chloride (PVC). Other suitable thermoplastics are apparent to skilled workers in this field, and substantially any of these can be used. Also potentially useful are flexible plastics having deformable materials such as metal foils bound to their surface.

The thermoplastic article includes a thermoplastic material, including at at least the portions of the article at which the deflectable flange 160 described herein is formed or present. The identity of the thermoplastic material is not critical, nor is the presence or absence of non-thermoplastic materials. Where non-thermoplastic materials are present (e.g., in a thermoplastic sheet to which a metal foil or a paperboard layer is laminated), the rigidity imparted to the article by the thermoplastic material in its non-softened, non-molten state is preferably sufficient to define the conformation of the article, even when the non-thermoplastic material is bent. The article can include one or more peelable layers, for example as described in co-pending U.S. patent application Ser. No. 13/415,781. When one or more peelable layers is present, it is substantially unimportant whether those layers are "rolled over" at the peripheral edge of the shaped article (rather than the edges of the peelable layers peeling from the underlying substrate). Both for aesthetic reasons and to promote sealing, it can be preferable that any peelable layers remain adhered. When peelable layers are present and adherence is to be promoted, the working temperature should be selected both to be suitable for deflection of the deflectable flange as described herein and for working the substrate and peelable layers of the shaped article without causing delamination of the peelable layers.

The Upper Body 200

The upper body 200 performs a number of functions. Overall, its function is to contain the deflectable flange 160 described herein within a cavity in the upper body 200 while heat is applied to one or more portions of the bend region 150 thereof. This containment function can prevent non-desired deformation (or guide desired deformation) of the deflectable flange 160 or portions of it during the periphery-smoothing operations described herein. The shape of the interior cavity of the upper body 200 can also affect the shape of the deflectable flange as it bends, particularly as it is softened. By way of example, in FIG. 1B, the upper body 200 includes a cavity with an internal right angle into which a portion of the bend region 150 is forced; the right-angle shape of this portion of the cavity will tend to cause the bend region 150 to conform to a right-angle shape, especially as the bend region 150 softens. The heat source can be a part of the upper body 200, applied to the upper body 200 for conduction of heat therethrough, for example. The upper body 200 also impinges upon and is impinged upon the peripheral flange 120 of the deflectable flange 160 when it is inserted into that cavity. When a ram 300 is used, the upper body 200 also serves to prevent the deflectable flange 160 from being forced out of the cavity, and it can also limit deflection of the bend region 150 when the deflectable flange 160 is being compressed by the ram 300.

The materials from which the upper body is constructed are not critical, other than that they should be suitable to withstand the manufacturing conditions described herein. That is, they should not melt or degrade at the temperatures used in the processing. A wide variety of metal, ceramic, stone, and polymeric materials can be used.

Figures 2A, 2B, 2C, 2D:
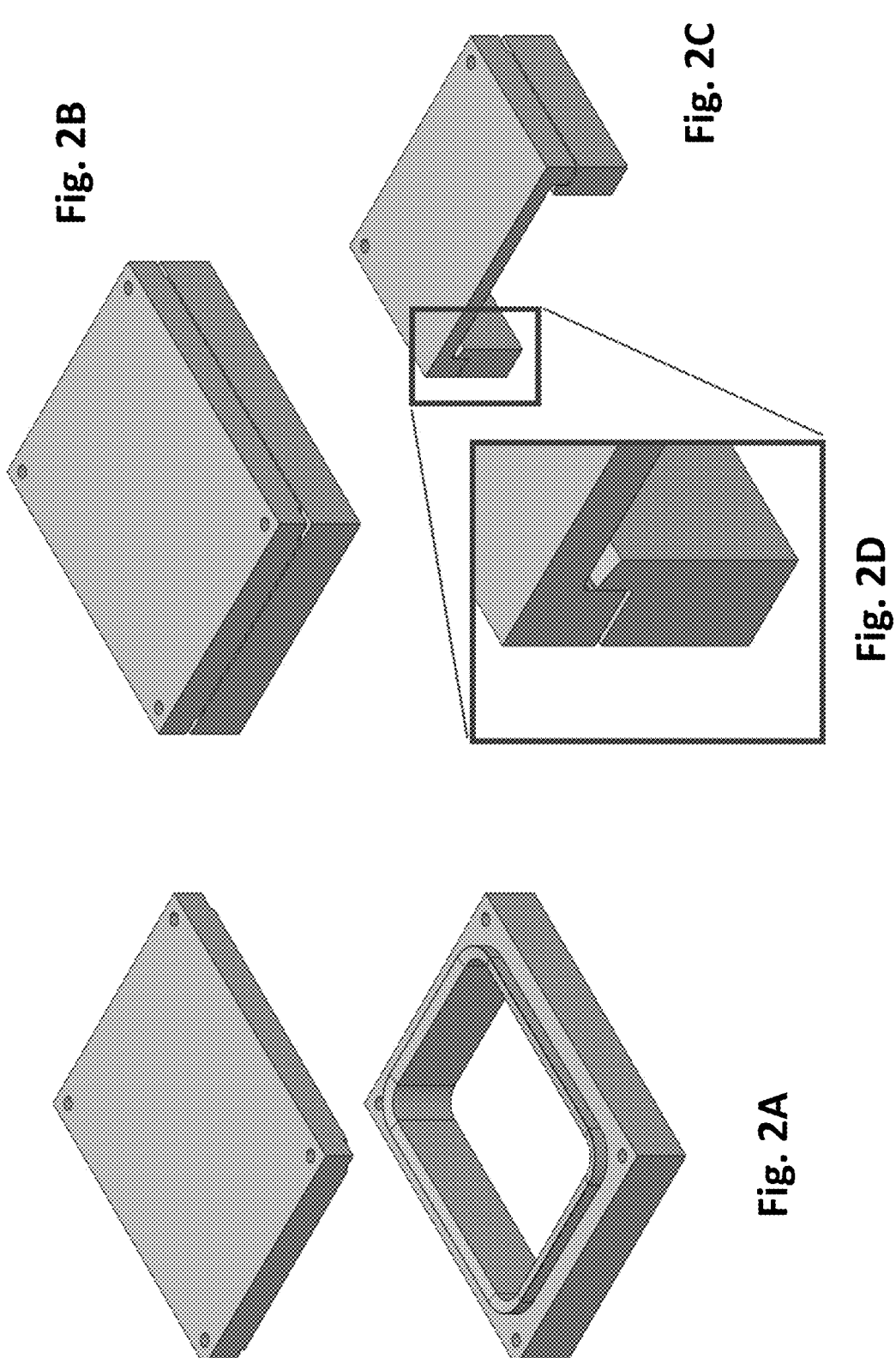
FIG. 2A illustrates the upper body 200 disposed above the ram 300.
FIG. 2B illustrates the upper body 200 engaged with the ram 300.
FIG. 2C is a cutaway view of the engaged upper body 200 and ram 300 shown in FIG. 2B and illustrates that a portion of the ram 300 fits within and closely opposed to the interior surface of a recess in the upper body 200.
FIG. 2D is a detail of the section indicated in FIG. 2C and illustrates the close opposition between the ram 300 and the interior of the upper body 200.

It is important that the shape of the upper body 200 be selected so that impingement between the interior of the cavity in the upper body 200 and the peripheral flange 120 will occur when the article 100 described herein is inserted into the cavity in the upper body. The upper body can have a shape sufficient to simultaneously impinge multiple peripheral flanges 120 on an article, or to impinge upon most or all of a single peripheral flange 120 that occurs upon an article (e.g., one which occurs about the entire peripheral edge of an article). As illustrated in FIG. 2, the upper body 200 can be formed of a solid block of material that covers an entire face of an article while impinging peripheral flange(s) 120 that occur on one or more portions of the article. The upper body 200 depicted in FIG. 2, for example, is designed to impinge upon the single peripheral flange 120 that extends completely around the periphery of an article having the shape of a rectangular tray-type container having rounded corners.

The bend region 150 of the articles described herein will typically be within the cavity of the upper body 200 when heat is applied to that bend region 150. For that reason, the upper body should be constructed in a way that facilitates application of such heat. The upper body 200 can, for example, include a heat source (e.g., electrically operated heating plates or rods) within it, applied to it, or fluidly connected with it. Alternatively, the upper body 200 can include one or more ports through which a heated fluid (e.g., a heated gas or liquid) can pass from a source into the interior of the cavity therein. The method selected to deliver heat to the bend region 150 (and/or other portions of the peripheral flange, such as the spacer 140, the elbow 130, and the peripheral flange 120) is not critical, and any of a variety of well-known heat delivery methods and equipment can be used. If the upper body 200 is able to conduct heat and is cooled, then heat that is present in the deflectable flange 160 during its shaping can flow to the upper body 200, and this heat flow can serve to cool and thereby stiffen the deflectable flange 160 in its deflected position upon its compression between the upper body 200 and the ram 300, for example.

As shown, for example in FIGS. 5 and 8, the deflectable flange can be deflected using a ram 300 alone, with or without use of an upper body 200. The upper body can be used both to partially deflect the deflectable flange and to apply force to the article so as to impinge the deflectable flange thereof against the ram. When the upper body 200 is not used, some alternate means of applying force to the article to cause impingement between the ram and the deflectable flange must be used. In FIG. 8D, for example, this alternate means is depicted simply as object 403 (optionally coordinated with object 402). The orientation of the parts relative to gravity is not important, the "downward" force (open arrow in FIG. 8D) need only be directed so as to urge the deflectable flange 160 against the ram 300 to cause impingement between the two. It is also immaterial to which of the article and the ram (or both) force is applied in order to cause such impingement. What is important is that impingement of the deflectable flange 160 against the ram 300 (and/o the upper body 200, if used) induces deflection of the peripheral edge 110 of the deflectable flange to a position where it is not readily accessible at the periphery of the article. Thus, in one embodiment, the upper body 200 can be a simple flat plate which can be applied against a flat portion (e.g., the extension 50 of the deflectable flange 160 depicted in FIG. 8D) of the article to drive the deflectable flange in the direction of, and ultimately against, the ram.

The Ram 300

Figure 4:
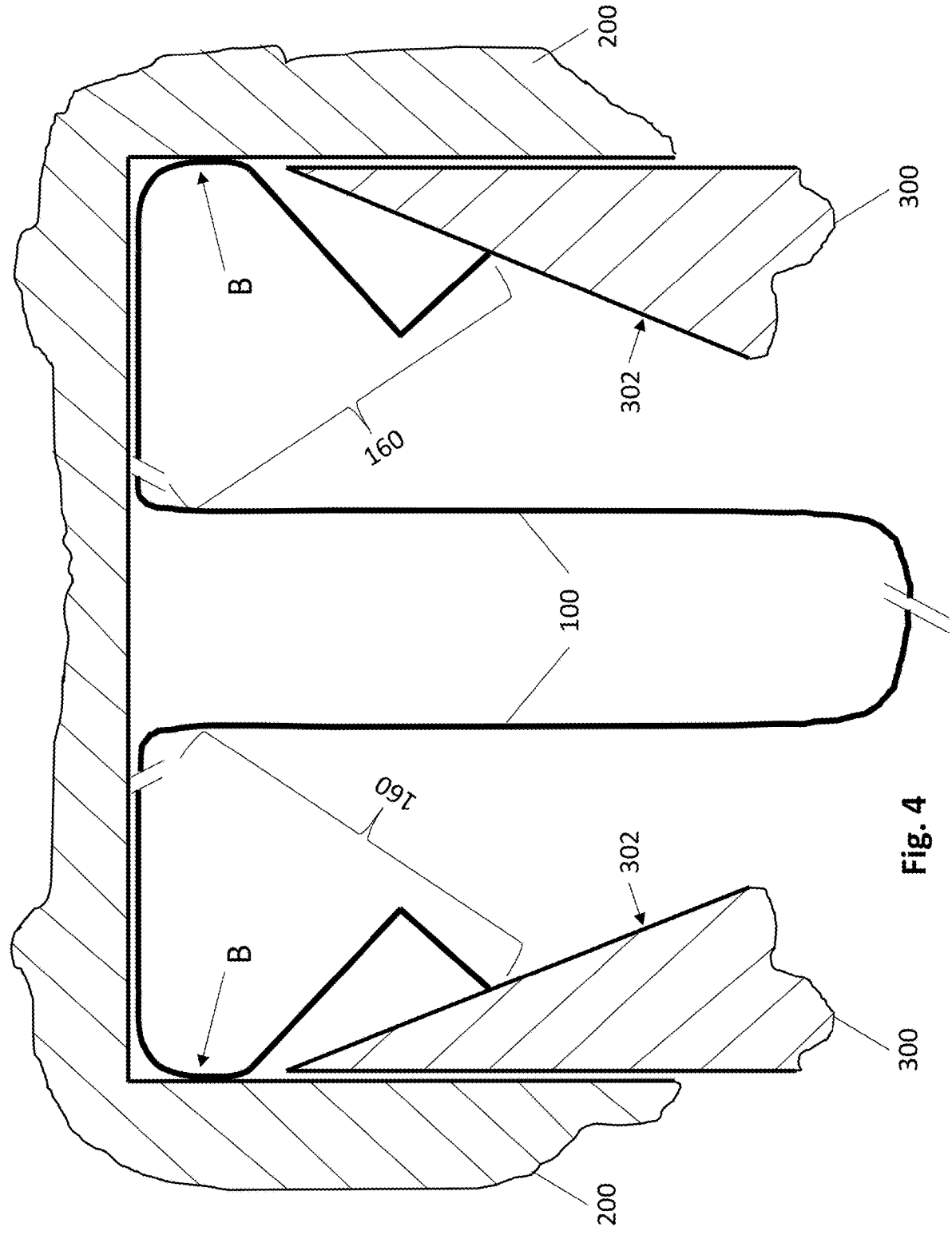
FIG. 4 illustrates a section taken through a storage container article 100 being formed using the methods described herein (parallel straight lines "//" indicate positions at which structures, dimensions, and proportions which can optionally be present are omitted for clarity). In the figure, the article 100 has a deflectable flange 160 formed on each of the sides of the container visible in the figure. A single upper body 200 extends across the entire container, including around the sides at which the deflectable flanges 160 are located. A single ram 300 (only two portions shown in the figure) has been inserted within the interior of the cavity in the upper body 200 behind the article 100. The peripheral edge 110 of the thermoplastic sheet from which article 100 is formed, infringes upon the upper face 302 of the ram 300 at each deflectable flange 160, causing the deflectable flange 160 to deflect inwardly toward the body of the article 100 by flexing at one or more portions B of the bend region 150 of each deflectable flange 160. Application of heat at B in an amount sufficient to soften the thermoplastic sheet causes the deflectable flanges 160 to retain approximately the conformation shown in this figure, with the peripheral edges 110 of the thermoplastic sheet positioned anti-peripherally (i.e., within the periphery of the article 100, which occurs at the positions indicated by B in this figure), yielding smooth peripheries to the formed container upon cooling of the softened portions.

The primary function of the ram 300 is to induce deflection in the deflectable flange. The ram can be used with or without a corresponding upper body 200, but such an upper body can serve to contain and control the article as it is contacted with the ram. The method and mechanism(s) used to impart relative motion between the article and the ram are not critical. When an upper body is employed, the ram is used to impinge upon and apply compressive force to the peripheral flange 120 of the deflectable flange 160 when the article is disposed in the upper body 200. This compressive force tends to drive the peripheral flange 120 upwardly toward the bend region 150 and the extension 50, if present, and anti-peripherally, thereby moving the potentially sharp peripheral edge 110 of the thermoplastic sheet away from the periphery of the article so formed. Accordingly, the design of the ram 300 is not particularly critical, so long as such compressive force is applied. As illustrated in FIGS. 1C and 4, a ram 300 having an angled upper face 302 will tend to direct the peripheral flange 120 in the direction along that angle as it compresses the peripheral flange 120. Thus, it can be beneficial to shape the upper face 302 of the ram 300 in a conformation that deflects or "pushes" the peripheral flange 120 and/or the peripheral edge 110 anti-peripherally as compression occurs.

Like the upper body 200, the materials from which the ram 300 is made are not critical. Metals, ceramics, stones, and polymeric materials capable of withstanding the temperatures and pressures of operation are suitable and readily selectable by a skilled artisan. If the ram 300 is able to conduct heat and is cooled, then heat that is present in the deflectable flange 160 during its shaping can flow to the ram 300, and this heat flow can serve to cool and thereby stiffen the deflectable flange 160 in its deflected position upon its compression between the upper body 200 and the ram 300, for example. Heat can likewise be provided by the ram 300 to one or more portions of the deflectable flange in conventional ways, such as by using a heated ram or incorporating a heating element into or onto the ram.

In an embodiment illustrated in FIG. 2, a single ram 300 can be constructed to impinge upon substantially all peripheral flanges 120 of an article simultaneously. The ram 300 depicted in FIG. 2, for example, is designed to impinge upon and apply compressive force to the single peripheral flange 120 that extends completely around the periphery of an article having the shape of a rectangular tray-type container having rounded corners.

In an alternative embodiment illustrated in FIG. 5, the deflectable flange 160 of an article is heated to softening and impacted against a ram 300 in the absence of an upper body 200 of the type described herein. The absence of an upper body 200 may lead to distortion or deflection of softened portions of the deflectable flange 160, at least if the other portions (e.g., the extension 50 or parts of the body 10 of the article 100 that are adjacent the deflectable flange 160 are insufficiently rigid to prevent such distortion or deflection. However, if such rigidity is present, or if such distortion or deflection is tolerable in the final product, the methods described herein can be used without an upper body 200.

Figure 5A:
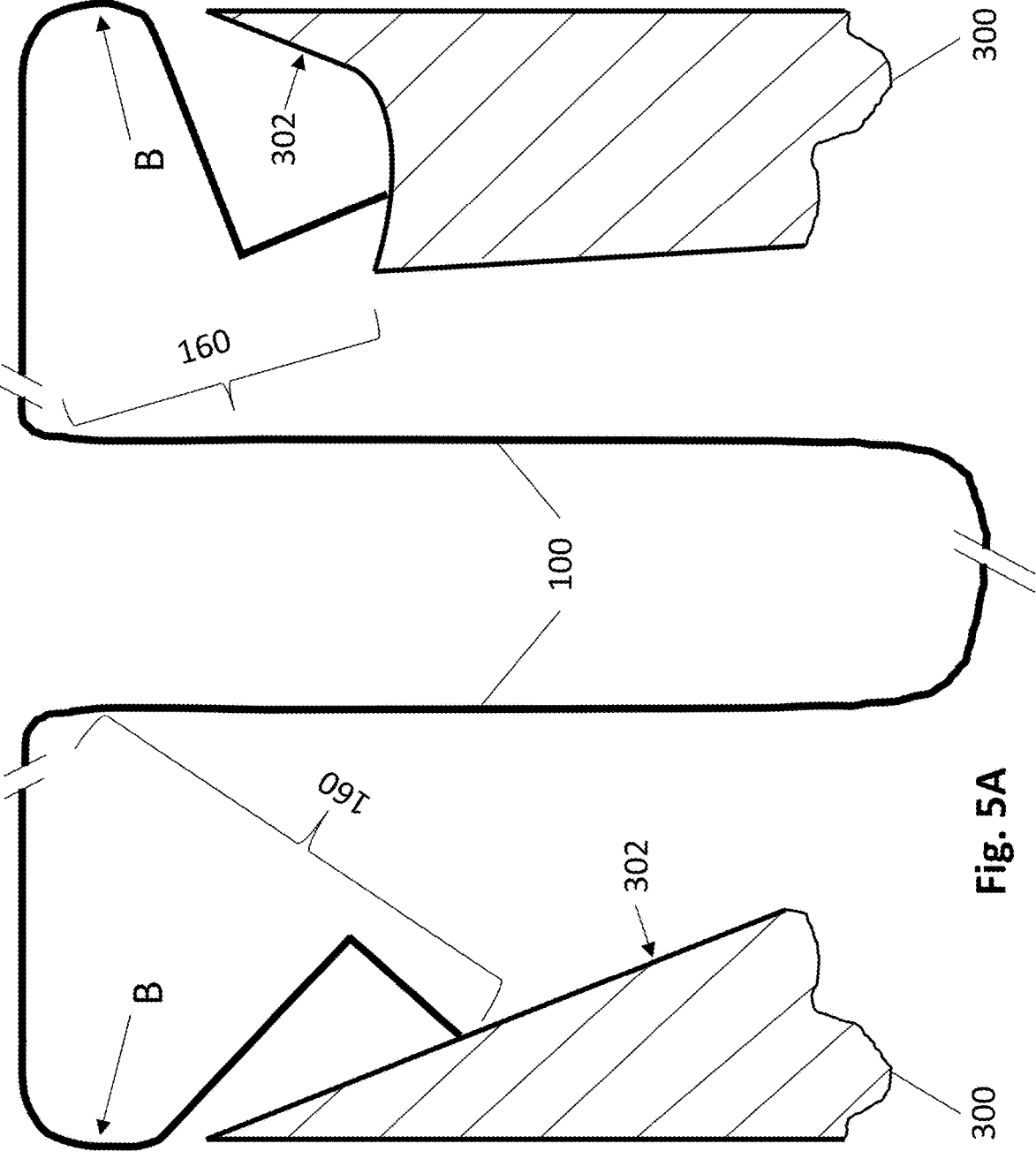
FIGS. 5A, 5B, and 5C differ in the distance between the elbow and the peripheral edge, this distance being greater in FIG. 5A than in FIG. 5B and being zero in FIG. 5C.
Figure 5B:
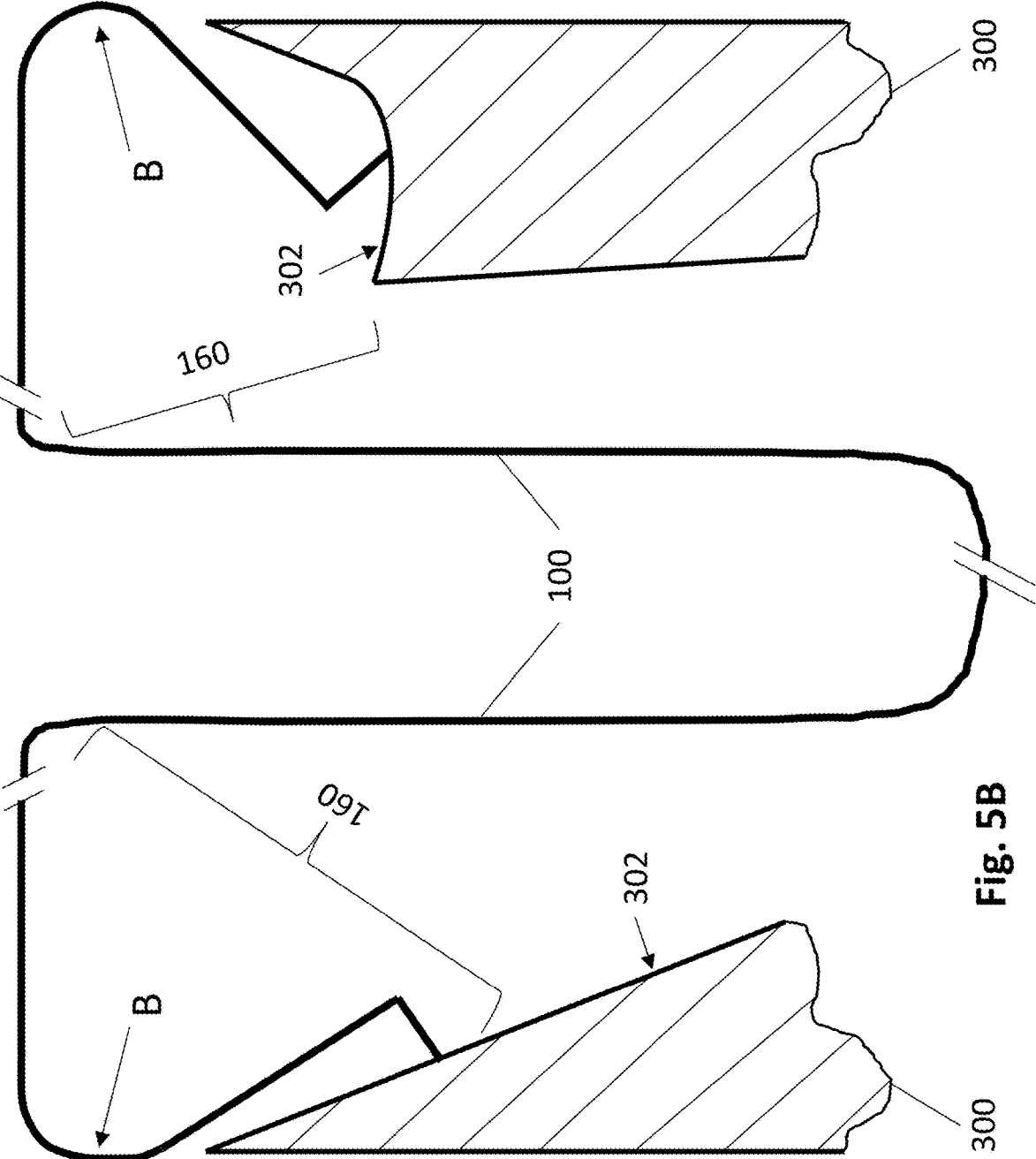
Figure 5C:
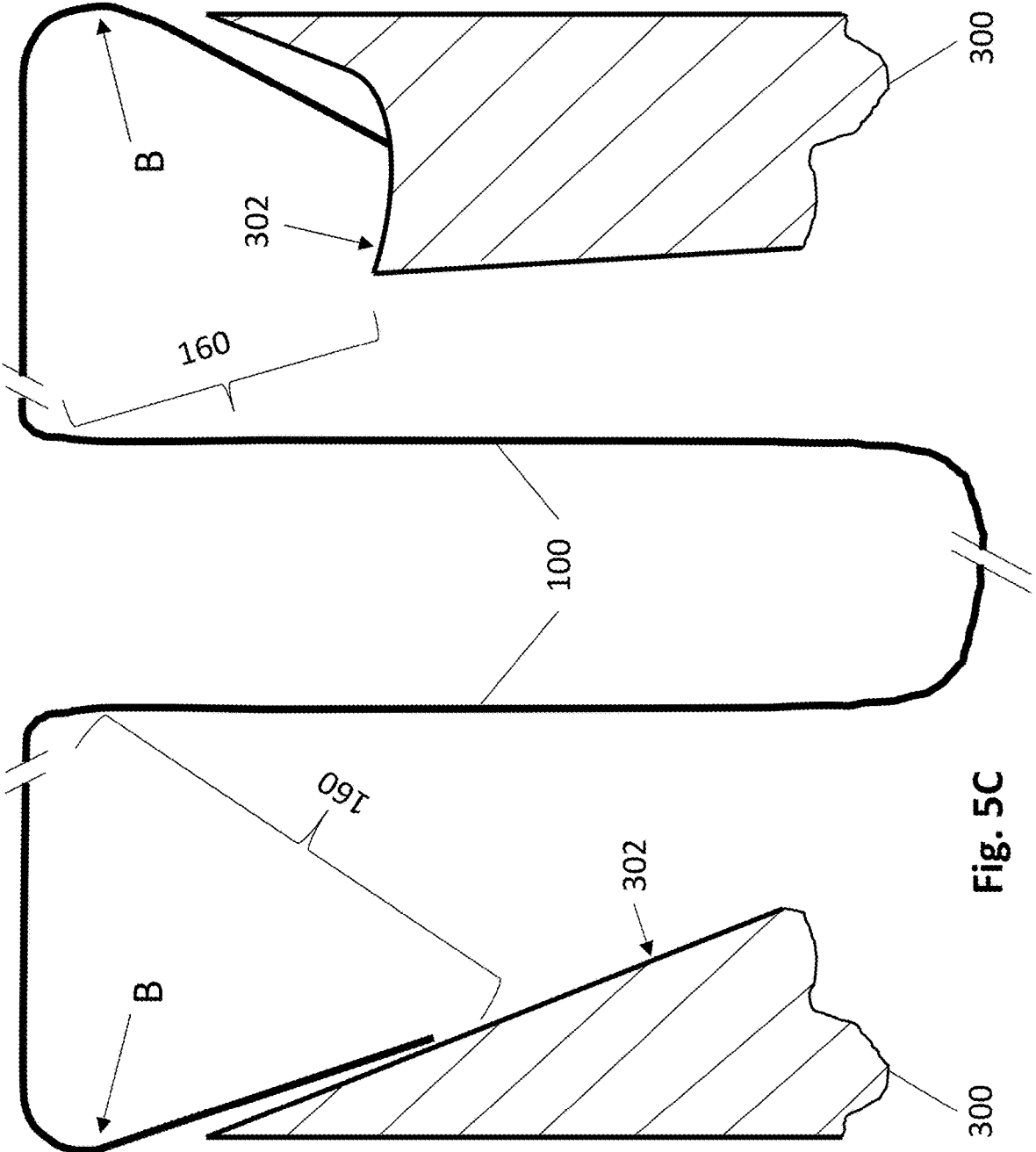

FIG. 5 also illustrates the significance of the length (measured from the elbow to the peripheral edge) of the peripheral flange. The peripheral edge contacts the ram. Force imparted upon the peripheral edge by the face 302 of the ram induces deflection of the deflectable flange 160 toward the body 10 of the article 100. When the deflectable flange 160 includes a peripheral flange 120 that is offset from the spacer portion 140 by a ninety-degree elbow 130, as shown in FIGS. 5A and 5B, the length of the peripheral flange will influence the degree of deflection of the deflectable flange. Comparing FIG. 5C (a deflectable flange in which the "length" of the peripheral flange is zero; i.e., a deflectable flange lacking a peripheral flange) with FIG. 5B, it can be seen that the presence of the peripheral flange induces greater deflection of the deflectable flange in the configuration shown. Moreover, looking to FIG. 5A, increasing the length of the peripheral flange increases the degree of deflection induced by the ram. Thus, although the elbow and peripheral flange are optionally not present, their presence enhances deflection and can enhance the "rolling" effect that can be achieved.

Figure 10A:
FIG. 10A is an image of a ram 300 having a shaped article 100 in the form of a rimmed, rounded rectangular tray borne thereby. In the lower right portion of the image can be seen the upper surface 302 in which a second article could be disposed, but which does not currently bear an article. In the article 100 borne by the ram 300 in the upper part of the figure, it can be seen that the extension 50 connects the spacer 140 and peripheral flange 120 portions of the deflectable flange to the body 10 of the article 100. The spacer 140 and peripheral flange 120 are carried by the upper surface of the ram 300 in the upper part of the figure, and that upper surface (analogous to upper surface 302 in the lower right portion of the figure) cannot therefore be seen directly. "10B" indicates a portion of the ram 300 shown (with the shaped article 100 removed) in FIG. 10B.

FIG. 10 depicts an embodiment of the ram 300 described herein for rolling over the edge of a shaped article having a deflectable flange 160. FIG. 10A depicts a ram 300 having at least two positions for accepting articles 100 having deflectable flanges as described herein. The upper portion of the figure shows a position that bears an article 100. Because it does not bear an article, the position partially shown in the lower right of the figure reveals the upper surface 302 upon which the article is borne when present. The position in which an article is borne in the figure has an identical upper surface 302, but it is obscured by the spacer 140 and peripheral flange 120 of the article 100 borne therein. This figure also illustrates how the extension 50 spaces the body 10 of the article away from the spacer and away from the ram, providing space (visible through the clear material that forms the extension) into which the spacer and peripheral flange can be deflected, bent, or curled.

Figure 10B:
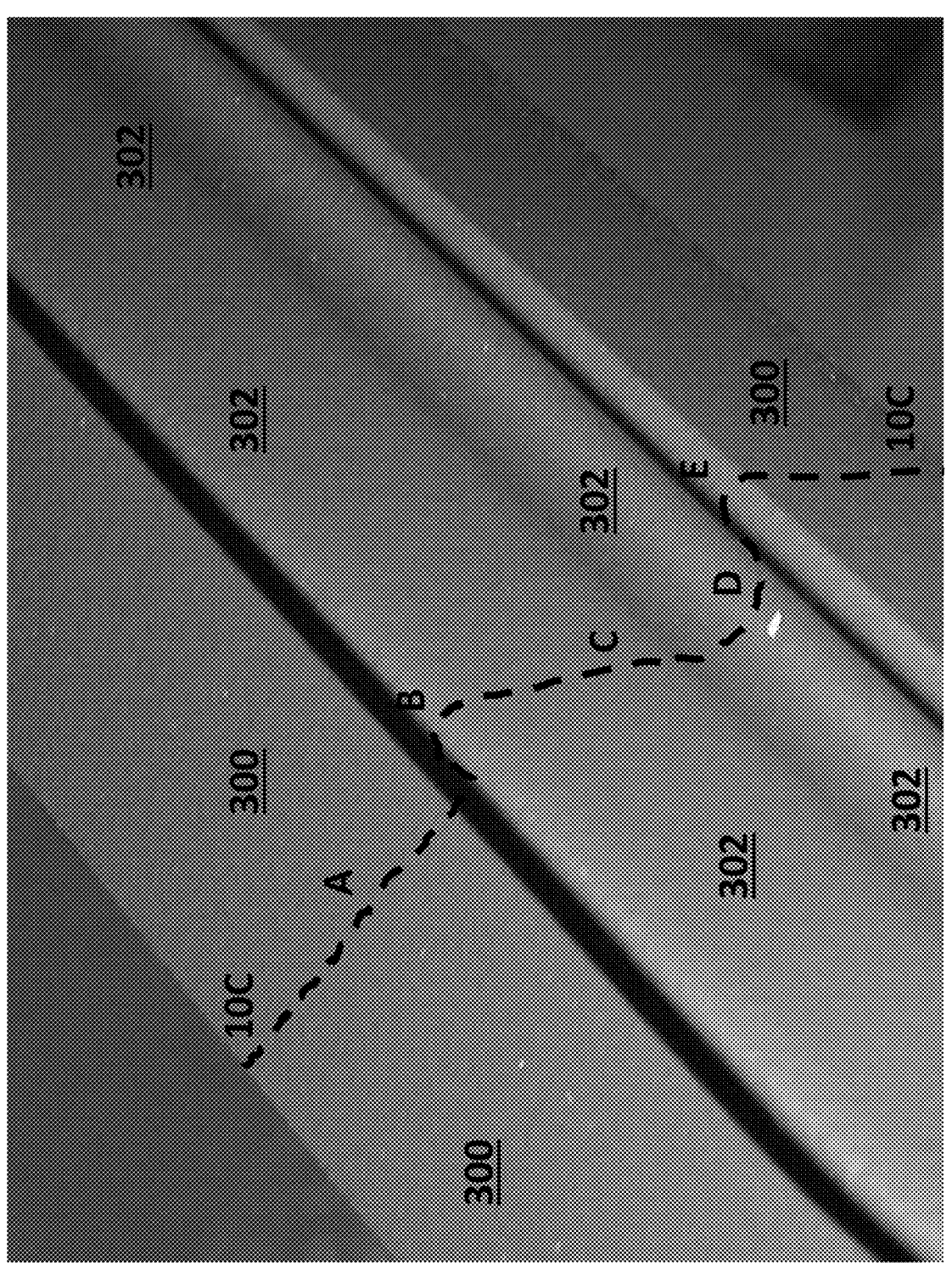
In FIG. 10B, portions of the upper surface 302 of the ram 300 can be seen. Dashed line 10C-10C in FIG. 10B indicates the approximate position of the cross-section depicted in FIG. 10C, and letters A-E are included as landmarks so that the surface configuration of the ram 300 can be better understood by comparing FIGS.
Figure 10C:
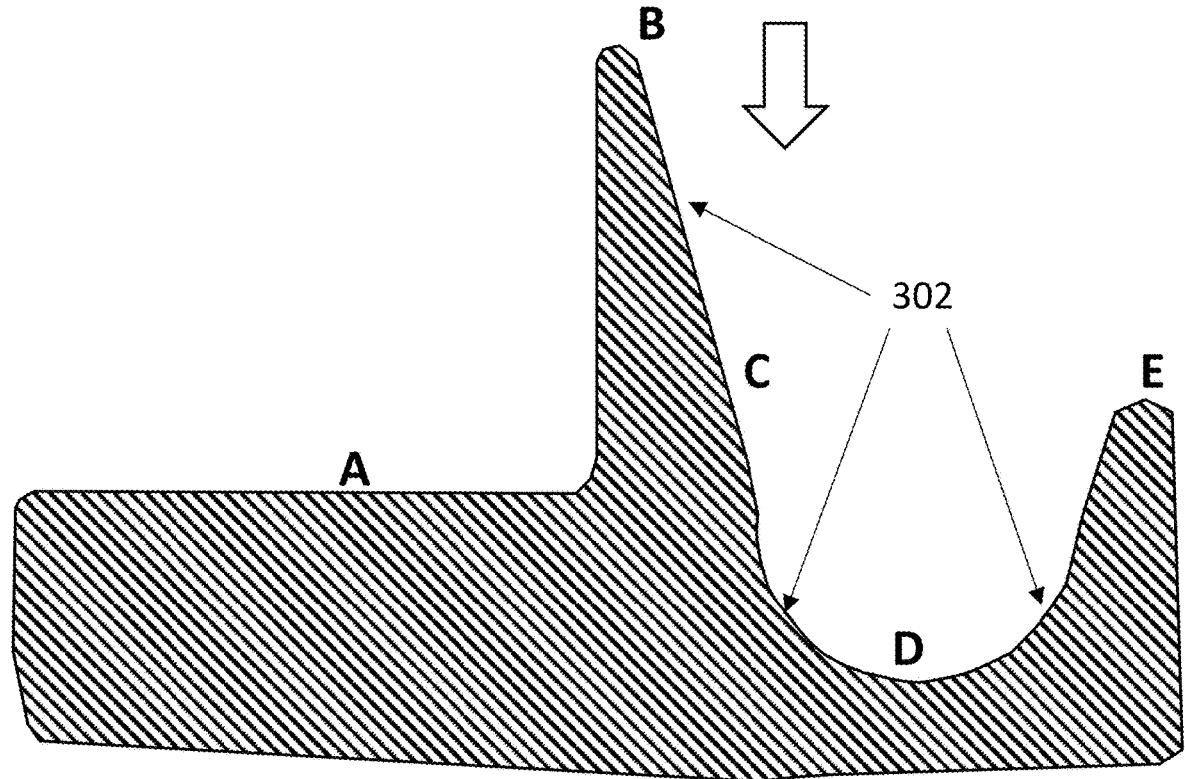
FIG. 10C is a diagrammatic cross-section of the ram 300 shown in FIG. 10B, including landmark letters A-E.

FIGS. 10B and 10C show details of the upper surface 302 of the ram 300, including a curved portion (at approximately D in FIG. 10C) which will deflect the peripheral edge 110 of the deflectable flange when urged against it at a softened temperature. FIG. 10B is a close-up image of the upper surface, and FIG. 10C is a cross-sectional diagram illustrating the approximate shape of that upper surface. In operation, the ram is used by impinging the peripheral edge 110 of the deflectable flange against the upper surface 302 (from the 'downward' direction indicated by the open arrow in FIG. 10C) at a position anywhere between positions B and D, and then applying further downward force to drive the peripheral portion of the deflectable flange further against the ram. This further force induces the peripheral edge to slide, scrape, or skip across the upper surface and induces the deflectable flange to deflect inwardly (i.e., toward the body of the article which, in this embodiment, is located closer to the E position than to any of A-D). When the deflectable flange is heated above its softening point (i.e., glass transition temperatures), this deflection will be non-elastic and will be reflected in the shape of the deflectable flange if it is thereafter cooled to a temperature below its softening point.

The curved portion of the upper surface 302 of the ram 300 between positions C and E in FIG. 10C induces the softened portion of the deflectable flange to roll or curve, and the degree of curvature induced is controlled by the extent to which the deflectable flange is impinged against the ram. Thus, for example, only the peripheral-most portion of the deflectable flange might be deflected if the deflectable flange is caused to impinge only slightly against the upper surface after softening, the peripheral edge will be pointed approximately toward the body if a softened portion of the deflectable flange is impinged to the extent of position D, and the peripheral edge of the deflectable flange will be effectively "rolled over" (i.e., the plane of the deflectable flange at its peripheral edge extends to intersect the underside 161 of the deflectable flange) if a softened portion of the deflectable flange is impingingly extended beyond position D (as shown in FIGS. 8G and 8K, for example). Depending on the material from which the deflectable flange is made, the deflectable flange can substantially retain its shape as it cools in the 'rolled over' configuration (e.g., PET and PVC materials tend not to slump or droop when acted upon by gravity in a softened state, while PE and PP materials can be bent substantially by gravity alone when softened). Even when this is not so, so long as the peripheral edge of a deflectable flange that droops or slumps does not expose the peripheral edge at the periphery of the article, such bending is acceptable (e.g., when the rolled-over edge is rolled over sufficiently that any drooping occurs in the interior space of the roll).

Sealing Films

An important advantage of articles having peripheries treated in the manner described herein is that such treatment renders the articles suitable for sealing with thin plastic films. Sealing articles with thin plastic films is a well-known process, and many suitable films are known (e.g., thin monolayer or multilayer sheets made of materials such as polyethylene or polyvinylidene chloride, optionally including polymer layers which inhibit passage of moisture or certain gases). Articles can be sealed with plastic films, for example, by completely enveloping the article in the film and sealing the film to itself. Alternatively, articles can be sealed by sealing a film about the periphery of a concavity, compartment, or other orifice defined by an article and, if desired, thereafter trimming the portion(s) of the film beyond that periphery. All technologies for sealing articles with thin plastic films are believed to involve at least intermittent contact between peripheral areas of the article and the film used for sealing.

It is therefore beneficial for an article to be sealed with a thin plastic film to be free, or at least substantially free, of sharp, pointed, rough, jagged, or abrasive structures, at least at areas of the article which contact the film. It is particularly important that such structures be absent from the surface of the article which will necessarily contact sealing films, and highly desirable that these structures are also absent from article surfaces which are likely to contact sealing films, whether during the sealing process, or whether during further packaging, shipping, unpackaging, or retail display of the film-sealed article. Still more preferably, articles to be wrapped with a thin film bear no such structures at surfaces at which there is a substantial likelihood of contact between the surface and the film during any of these processes. Ideally, the articles bear no such surface at any position at which a film used for sealing might reasonably be expected to contact the surface position during these processes.

A wide variety of thin plastic films are known to be useful for sealing containers, and substantially any of these films can be used to seal the shaped articles described herein (or compartments thereof). Selection of sealing films (and materials for making shaped articles compatible with such sealing films) is well known in the art, and substantially any known combination of materials can be adapted for use with the shaped articles described herein. By way of example, when a sealing film is to be removably sealed about a shaped article described herein (e.g., an overwrap film that is sealed to itself but not to the wrapped article), the materials used to make the shaped article should be selected such that it will not fuse with the film under the sealing conditions to be used. By contrast, when a sealing film is to be substantially permanently sealed to a shaped article (e.g., about the perimeter of a compartment defined by the article), the material(s) used to make the article should be selected to facilitate formation of a substantially permanent seal under practical processing conditions. Similarly, combinations of sealing and container materials and operating conditions that yield containers sealed with material that is peelable therefrom are known and can be used.

One highly desirable embodiment of the articles described herein is a tray-shaped article that is made by thermoforming (and that therefore possesses potentially sharp peripheral edges prior to the edge-rolling treatment described herein)

such that it possesses about its entire periphery the deflect-
able flange described herein and for which the peripheral
edge is deflected beneath the extension and behind the
spacer and bend region of the deflectable flange, about the
entire periphery of the tray, sufficiently that the peripheral
edge cannot be touched by a human fingertip that is swiped
along the gap between the deflected peripheral flange and
the body of the tray, even if that fingertip is swiped along this
gap around the entire periphery of the tray. Such a tray will
bear no sharp, pointed, rough, jagged, or abrasive edge at
any position that can reasonably be expected to contacted by
a sealing film, regardless of whether OW, VSP, or MAP
technology is used in the sealing process. A tray suitable for
use with all of these sealing technologies is highly desirable
and believed to be unavailable prior to the disclosure of the
subject matter described herein.

Many plastic films used for sealing of articles are flexible
and do not thermoset over the range of temperatures ordi-
narily employed during sealing and subsequent handling.
Flexible films that are sealed to surfaces are sometimes
difficult to remove in a single piece from the sealing surface.
For example, a flexible film that is sealed about the flat
periphery of a tray may tear or split when one portion of the
film is pulled away from the tray, potentially requiring a user
to remove the film in multiple passes or many strips or
pieces. Such difficulties may be particularly acute in situa-
tions in which the sealing surface is broad, such as in a
VSP-sealed package in which a sealing film may be adhered
to or fused with a relatively large area of a tray on which an
item has been sealed between the film and the tray. The
technology described herein can be used to reduce or
overcome this difficulty as follows.

The shaped articles described herein (e.g., a tray-shaped
article having a smooth periphery) can be sealed with a
thermosettable (i.e., thermoformable) film to yield an article
in which the thermoformable sealing film is heated above its
glass transition temperature to soften it and applied against
the smooth periphery of the shaped article. A thermoform-
able film that is heated above the glass transition tempera-
ture of the material of which it is made and thereafter cooled
below that temperature will retain whatever conformation
the film has (e.g., a conformation imposed upon it) when the
temperature falls below its glass transition temperature.
Thus, if a thermoplastic film is formed "around" (i.e.,
extending more than about 90 degrees about) the smooth
outer periphery of an article described herein, the film will
be held to the article not only by whatever attraction or
adhesion may exist between the film and the article surface,
but also by mechanical forces (i.e., the film's resistance to
deflection about the smooth outer periphery), forming a
structure analogous to a "snap off" lid.

Even though softened thin plastic films can be extremely
delicate (e.g., liable to be damaged by sharp, pointed, rough,
jagged, or abrasive surfaces), the smooth periphery of the
shaped articles described herein permits even such delicate
films to be applied thereto. In one example, a shaped article
in the form of a tray having a smooth periphery can be
VSP-sealed to encase an article between a softened thermo-
plastic sealing film and the tray, with little or no gas included
within the sealed portion. Furthermore, the smooth periph-
ery of the articles described herein permits a softened film to
be drawn, pressed, or formed around the smooth periph-
ery—that is, contacting not only the top portion of the
periphery (i.e., analogous to the extension 50 of the article
edge depicted in FIG. 9B), but around the bend region 150
of the deflectable flange, and along the spacer 140 and any
bent or rounded portions thereof (such as to or around the rounded underside 145 of the spacer depicted in FIG. 9B)
and thereafter set by reducing the temperature of the sealing
film below its glass transition temperature. Such a seal will
form a relatively rigid "lid" and, even if the film is not
adhered or fused to the shaped article where the film
intersects the article, frictional forces or the shape of the
"lid" (e.g., turned about the rounded underside 145 of the
spacer depicted in FIG. 9B, such that the "lid" must be
stretched or expanded to disengage it from the rolled over
peripheral flange 160) can hold the sealing film in place on
the article. Furthermore, because softened thermosettable
film can be substantially thicker, therefore stronger, and/or
more rigid than thin flexible sealing films, a thermosettable
sealing film can form a seal or "lid" that can tend to be more
likely removable in a single piece.

In one embodiment of the shaped articles described
herein, for example, the article is a tray having a food item
placed thereon, with a thermosettable film draped across the
food item and the periphery of the tray while the film is in
a softened state; gas between the film and the tray is
withdrawn to form a VSP-type seal (with the film closely
opposed against the food item and the tray surface upon
which the food item rests); and the film is draped around
(from the top, to or around, the bottom of the periphery),
optionally sealed or fused to the tray, trimmed about the
bottom of the tray periphery, and cooled. In the finished tray,
the "lid" formed upon cooling of the film must be "snapped
off" the tray by stretching the edge of the lid around the
periphery of the tray, but once this operation is performed,
the entire lid can be removed from the tray in a single piece.

In another embodiment, a shaped article described herein
is sealed (after its smooth outer periphery has been formed)
using a thermoformable plastic film that is extended across
a compartment defined by the article and at least about 90
degrees about opposed smooth peripheral sides of the article
(i.e., opposite ends of a rounded rectangular tray). The film
is heated above its glass transition temperature and cooled
below that temperature while extended about the opposed
smooth peripheral sides. If desired, a vacuum or modified
atmosphere can be applied to the compartment during such
sealing. The resulting article has a thermoset film cover that
must be stretched (or "snapped") around at least one periph-
eral side of the article in order to remove the film from the
article (in addition to any other seal that may exist between
the film and the article).

The shaped article described herein can be used in ways
which are believed to be not possible using previously-
known trays. Typically, others have used containers espe-
cially designed and made for each of the various sealing
technologies described herein (e.g., OW, VSP, and MAP
technologies) for sealing containers with thin plastic films.
That is, food trays designed for OW-sealing have been
generally considered unsuitable for VSP- and MAP-wrap-
ping (e.g., owing to the lack of surfaces suitable for sealing
in VSP- and/or MAP-technologies). Similarly, the sharp
edges of many containers designed for use with VSP- and
MAP-sealing technologies render those containers unsuit-
able for overwrapping with fragile polymer films. The
shaped articles described herein can be used to make shaped
articles that can suitably be used as containers for sealing by
any of OW, VSP and MAP technologies. Because the shaped
articles are thermoformed, container surfaces suitable for
VSP- and/or MAP-sealing can be included in the shape of
the articles. Using the methods described herein, any edges
of a shaped article which might provide a risk of tearing
sealing films (or, alternatively, all edges of the shaped
article) can be made to have a smooth conformation, such as by forming a rolled-over edge or by smoothing the shape of the mold used for thermoforming the precursor article. Thus, unlike previously-known trays, the shaped articles described herein can be used with substantially any film-sealing technology.

Other advantageous uses of the shaped articles described herein relate to the smoothness of their edges. The articles can be used in substantially any environment in which it is desirable or necessary that a solid object exhibit smooth edges. By way of example, instruments used in surgical procedures are typically packaged in openable containers (to permit reuse and sterilization between uses) that are opened by personnel wearing easily-torn surgical gloves during medical surgery procedures. Thermoformed articles (e.g., so-called "clam-shell" type snap-open packages of known design) can be made as described herein, with those articles being initially made having a deflectable flange wherever they are cut from the web of thermoformed material, and thereafter rolling over that deflectable flange to yield the smooth edge described herein. Articles made in this manner will present smooth edges to users, reducing the likelihood that surgical gloves will be torn by opening such packages during surgery procedures. Similarly, thermoformed packages of known design that are employed to facilitate handling, to inhibit theft, or to achieve other ends can be adapted (e.g., by including a deflectable flange in their design and rolling it over) to take advantage of the edge-smoothing technology described herein.

System for Forming Articles

As described above, precursors of the shaped articles described herein can be formed by standard thermoforming methods, using standard thermoforming equipment. To do so, a thermoforming mold is used to make a precursor article by imposing upon a thermoplastic sheet the desired conformation of the finished article, except that the deflectable flange described herein is included at the peripheral edge(s) at which the smooth periphery is to be formed. Upon cutting the precursor article from the web of thermoplastic sheet, the edge-smoothing operations described herein can be performed by impinging the deflectable flange upon the ram (optionally with the aid of an upper body).

Newly-thermoformed precursor articles will tend to emerge from the thermoformer at a temperature close to (but below) the glass transition temperature of the thermoplastic. Impinging the deflectable flange and the ram shortly after removing the precursor article from the thermoformer can reduce the quantity of heat energy which must be supplied to one or more portions of the deflectable flange in order to achieve the desired deflection (or "rolled over" edge effect) of the deflectable flange described herein. For this reason, it can be desirable to combine the thermoformer, the ram, and an impingement mechanism into a single system or a single piece of equipment. Such a system or piece of equipment should include i) a thermoformer module capable of forming the precursor article; ii) a cutter for cutting the precursor article from a thermoplastic sheet or roll from which it was formed; iii) the ram; and iv) a mechanism for positioning the precursor article against the ram (i.e., so that the deflectable flange portions line up with the corresponding ram portions) and impinging the precursor article and the ram together. The heat required during the deflectable flange-deflection operations described herein can be provided by the ram, by the cutter (e.g., using a heated cutting blade to heat the peripheral edge and an adjacent peripheral portion of the deflectable flange above the softening temperature of the thermoplastic), by a separate heater (e.g., a radiant heating element disposed in close opposition to the ram when it is engaged against the deflectable flange), or by a combination of these. The precise selection, orientation, order, and construction of these pieces of equipment are not critical and can be selected by a skilled artisan in light of the requirements and processing steps described herein. The system or equipment can also include the plug described herein for insertion within a void in the precursor article prior to impingement of the deflectable flange against the ram.

EXAMPLE

The subject matter of this disclosure is now described with reference to the following Examples. These Examples are provided for the purpose of illustration only, and the subject matter is not limited to these Examples, but rather encompasses all variations which are evident as a result of the teaching provided herein.

Example 1

Figure 3A:
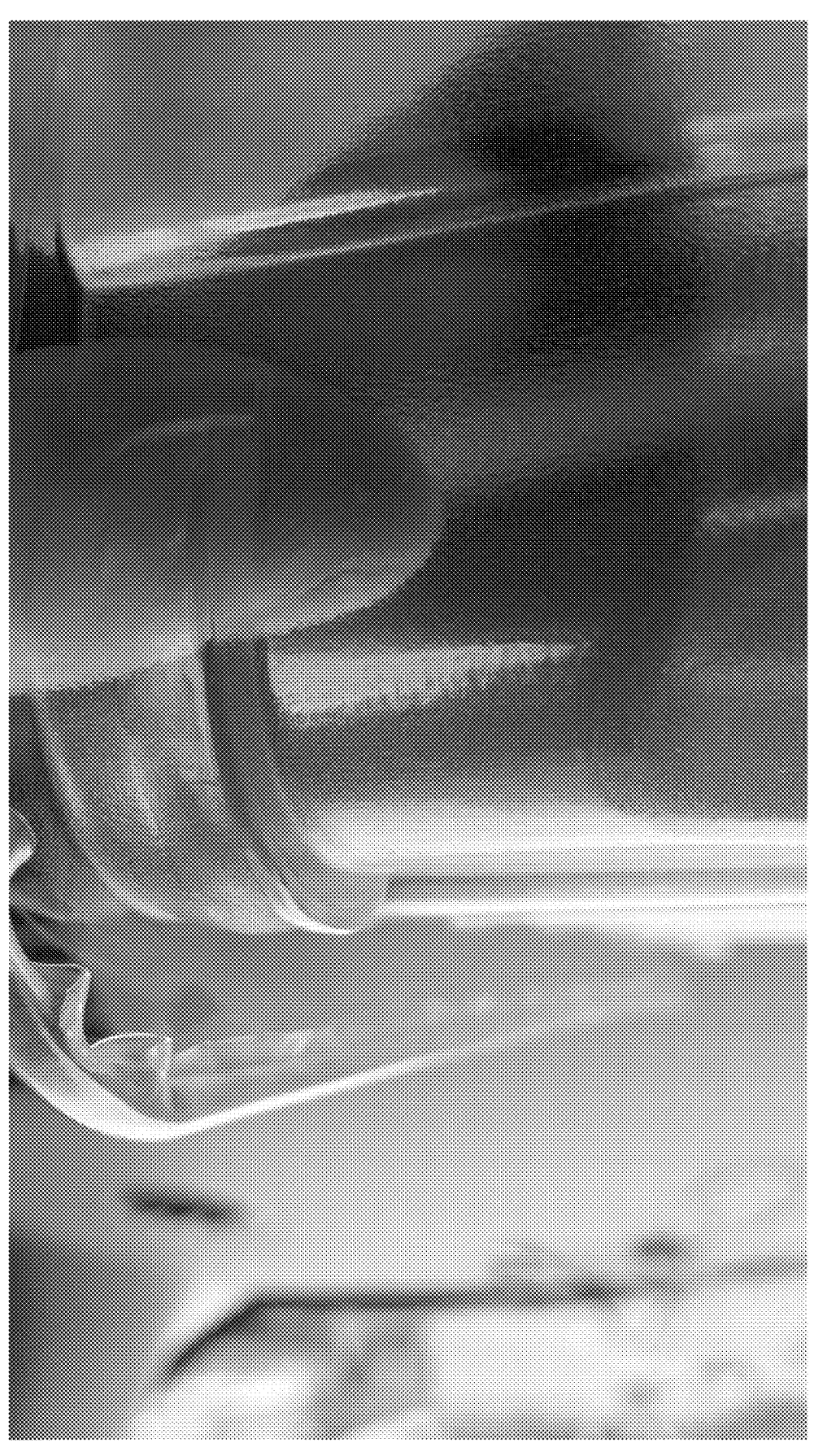
In FIG. 3A, a finger is visible within the interior of the tray, and the smoothed corner is visible to the left of the finger. Also visible at the portion where the finger is located is a stacking lug, which is a portion of the corner of the tray which extends peripherally to a greater extent than the portion of the corner below the finger. Extending (downwardly in the figure) from the smoothed corner is a smoothed straight sidewall of the tray. Wrinkling of the peripheral flange is visible beneath the smoothed corner, and deflection of the peripheral flange under the smoothed straight edge can be seen behind the corner on the left side of the figure.
Figure 3B:
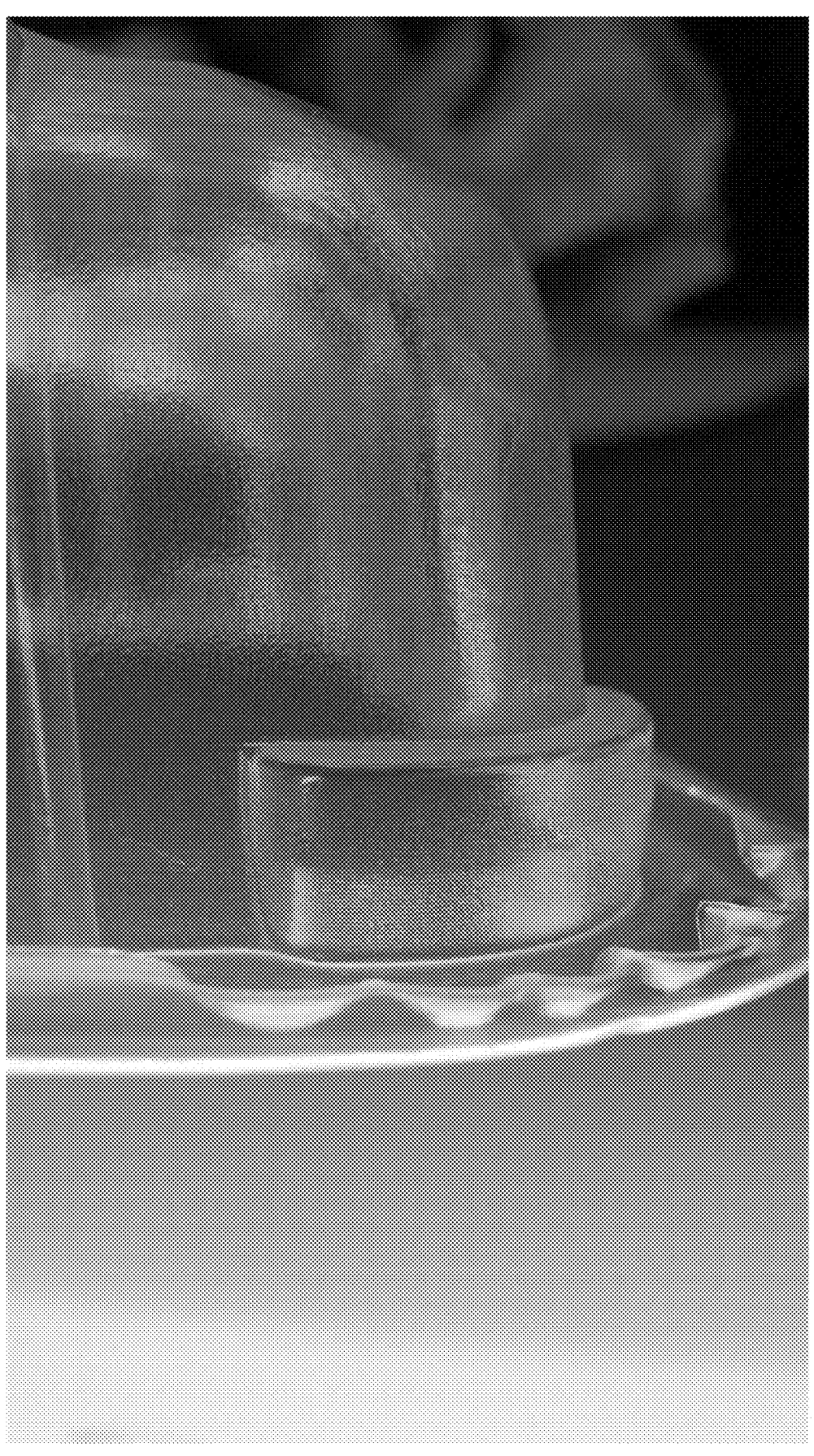
FIG. 3B is another view of a smoothed corner of a similarly-made tray, also seen from below the rim of the tray. The prominent extension at the corner just below the rim is a stacking lug.
Figure 3C:
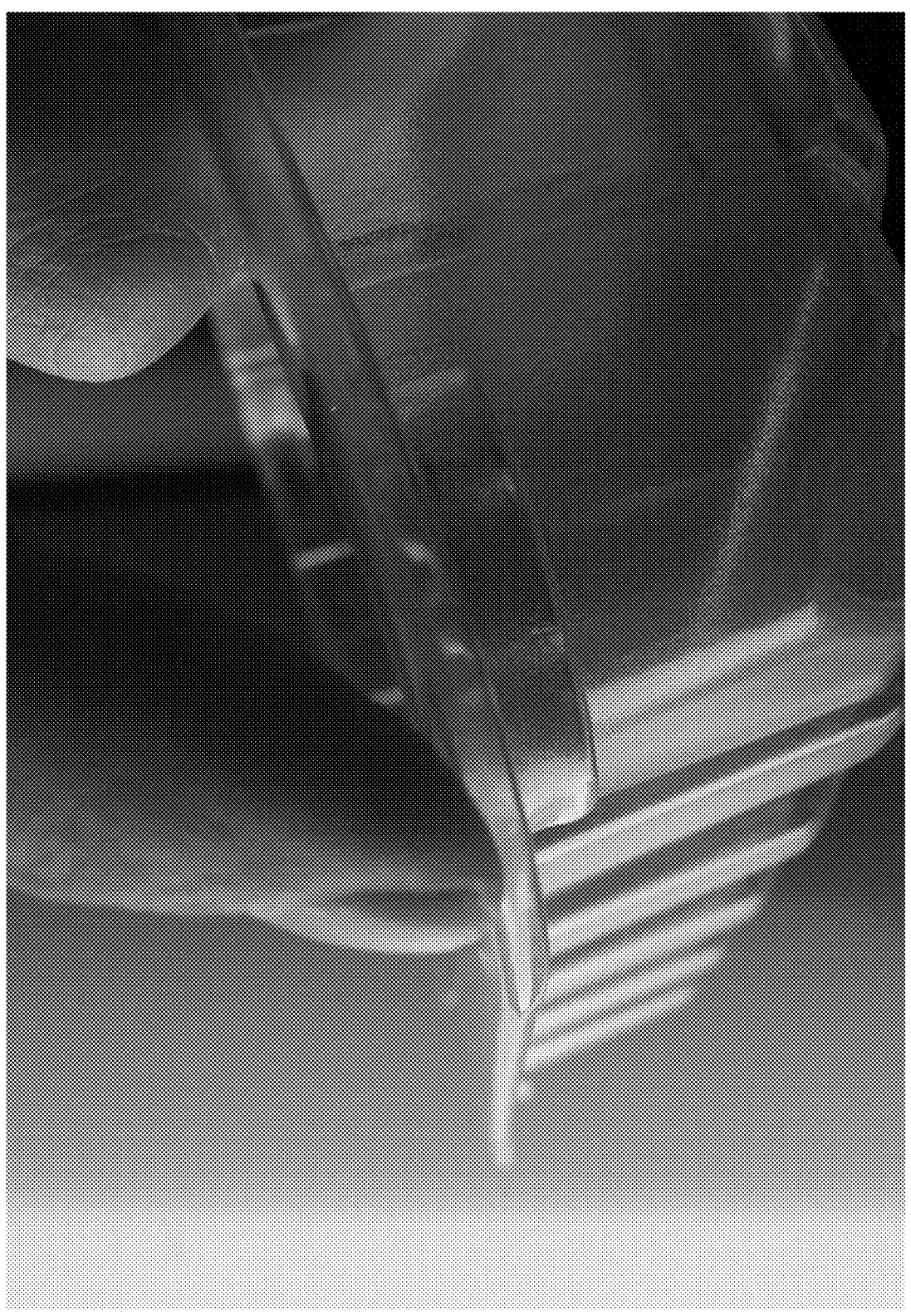
FIG. 3C is a view of the smoothed corner, with a finger pointing to a smooth region formed by bending, softening, bending, and cooling of the bend region of the deflectable flange. This smooth region can, for example, be urged against a thin plastic film without tearing it easily, since the relatively sharp edge of the thermoplastic material from which the tray is formed is bent under the corner, as shown in FIGS. 3A and 3B.
Figure 6A:
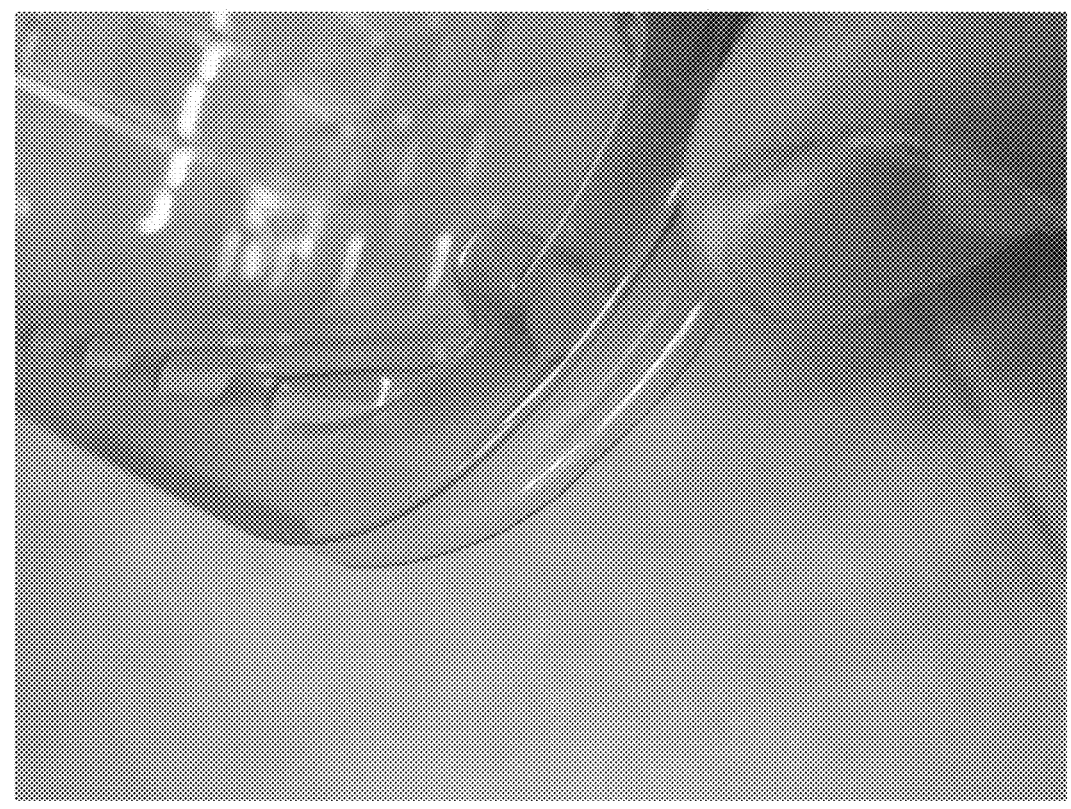
FIGS. 6A, 6B, 6C, 6D, and 6E illustrate deflectable flanges formed in tray-shaped articles thermoformed from a sheet of thermoplastic material. In each of FIGS. 6A and 6B, a finger touches the sharp edge (i.e., the peripheral edge 110 at the periphery of peripheral flange 120) where the tray has been cut from the sheet. In these figures, the deflectable flange has not yet been softened, deflected, and cooled, so the sharp edge remains positioned about the periphery of the tray. By comparison, the sharp edge has been deflected inwardly and away from the periphery of the trays shown in FIG. 3 and in the tray shown in the lower portion of FIG. 6C. The tray shown in the upper portion of FIG. 6C is the same as that shown in the lower portion, differing in that the tray in the upper portion has not had its deflectable flange "rolled over" as the tray in the lower portion has.
Figure 6B:
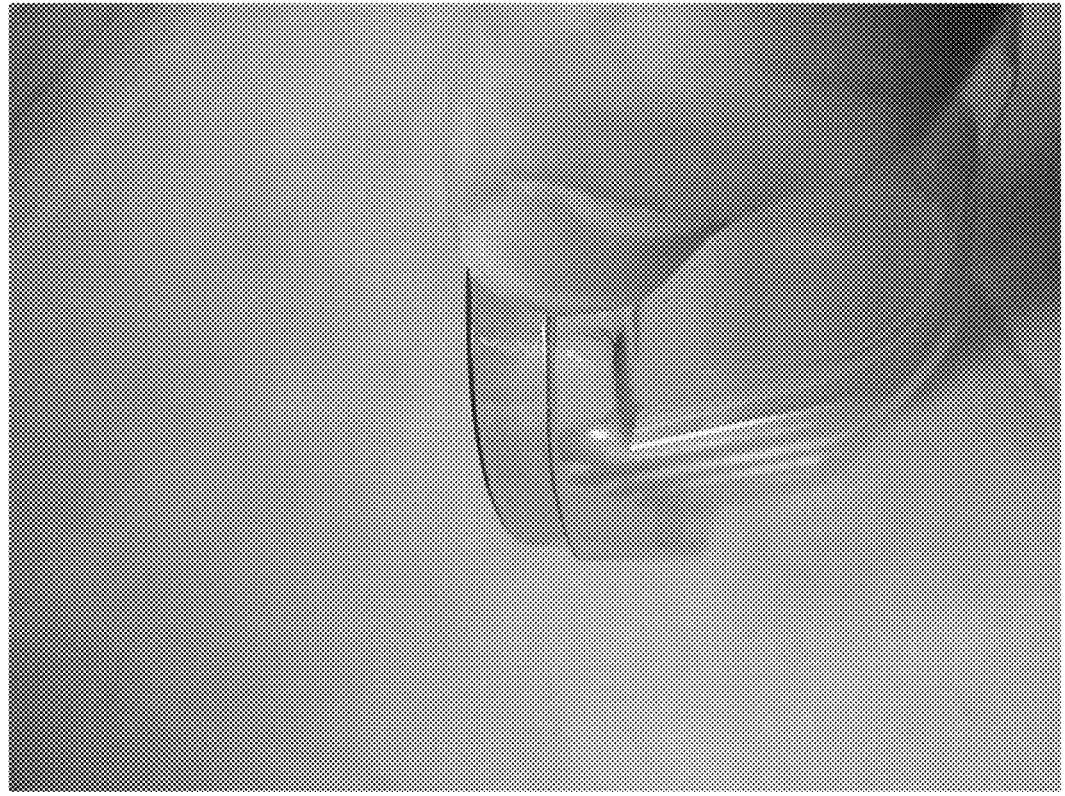
Figure 6C:
Figure 6D:
Figure 6E:
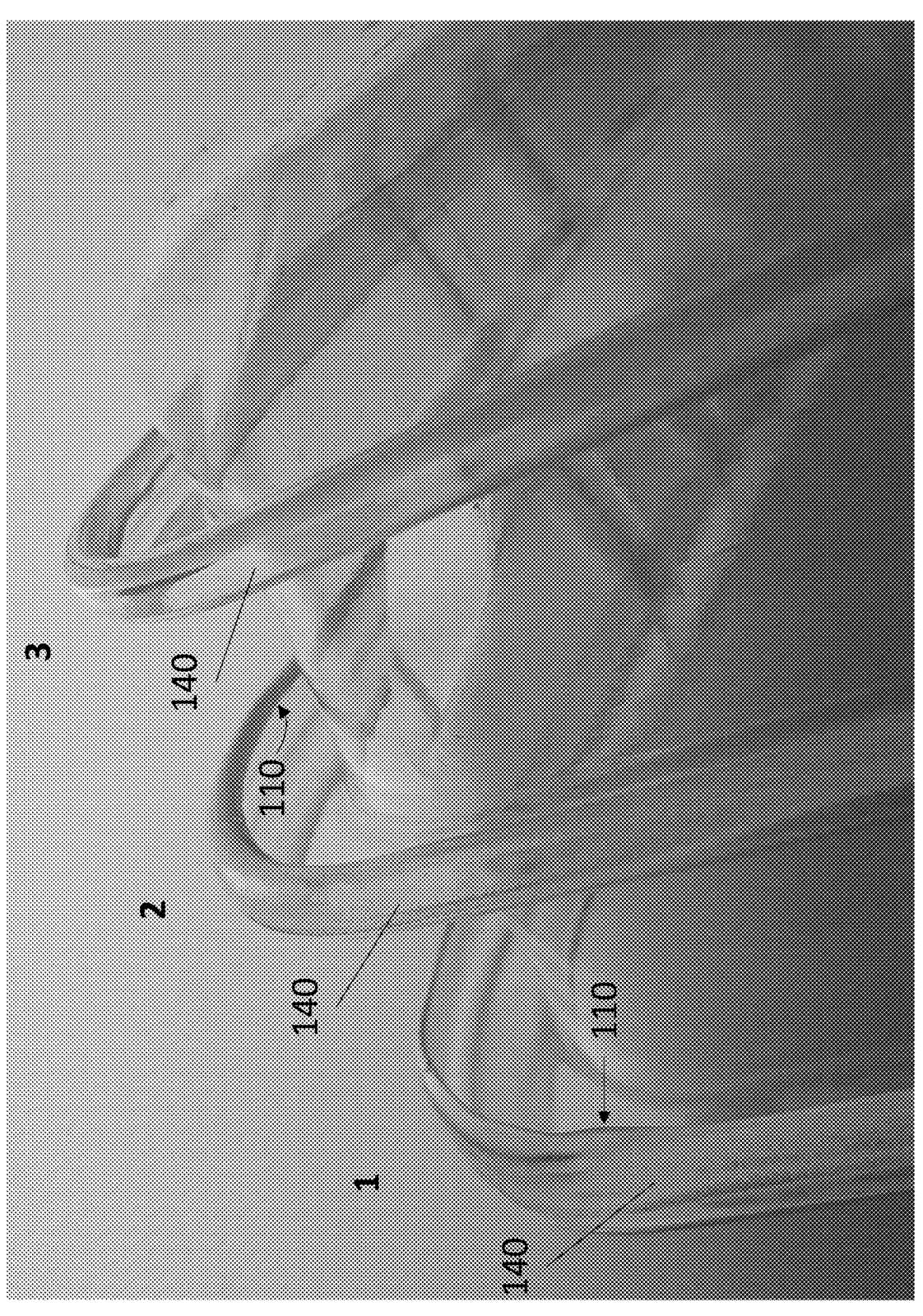
Figure 7A:
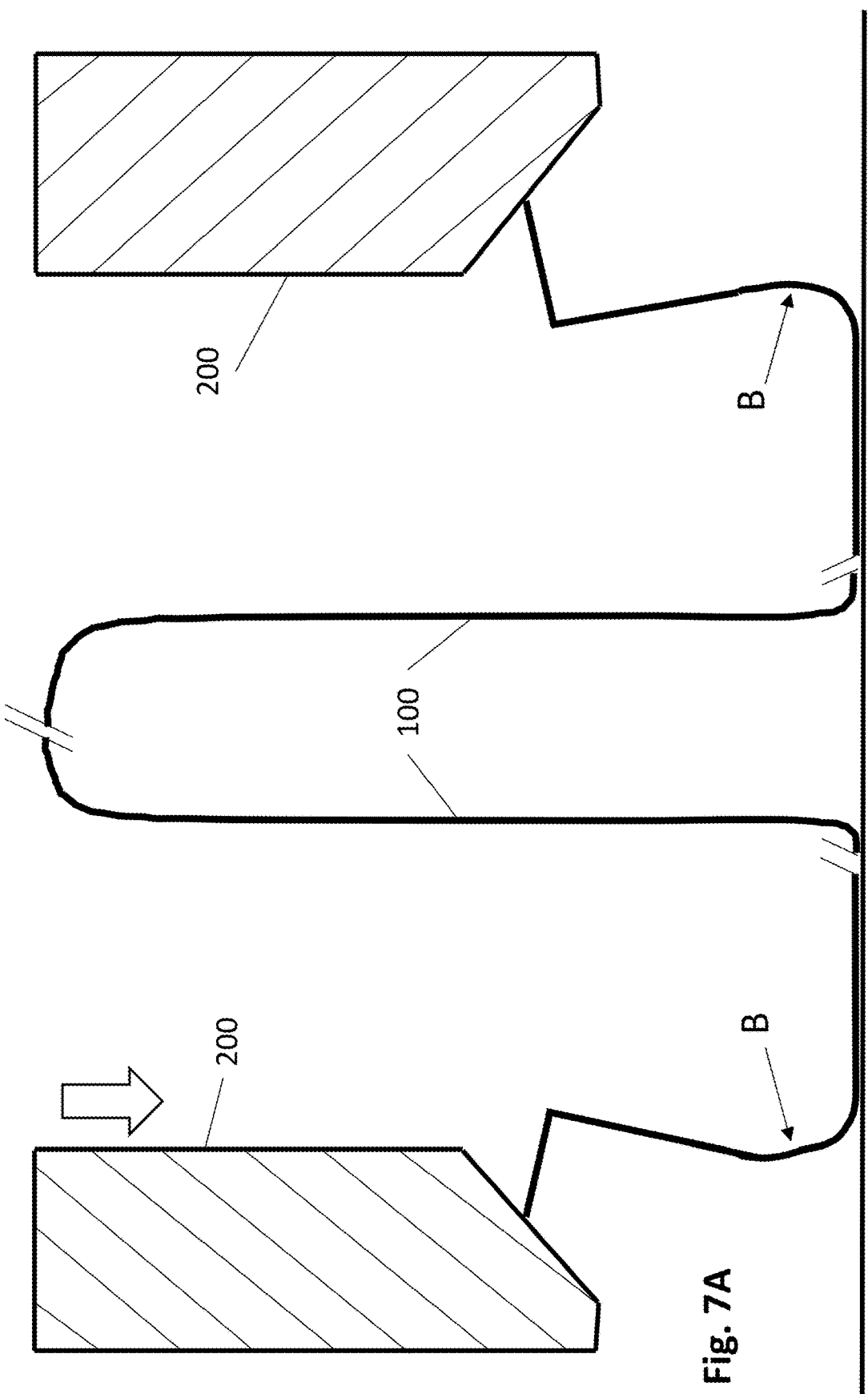
In FIG. 7A, outwardly-flared portions of the upper body 200 have just contacted the peripheral flanges 120 of the article 100 as the upper body 200 is lowered onto the article toward the horizontal surface; the deflectable flanges are beginning to deflect at the areas marked "B.
Figure 7B:
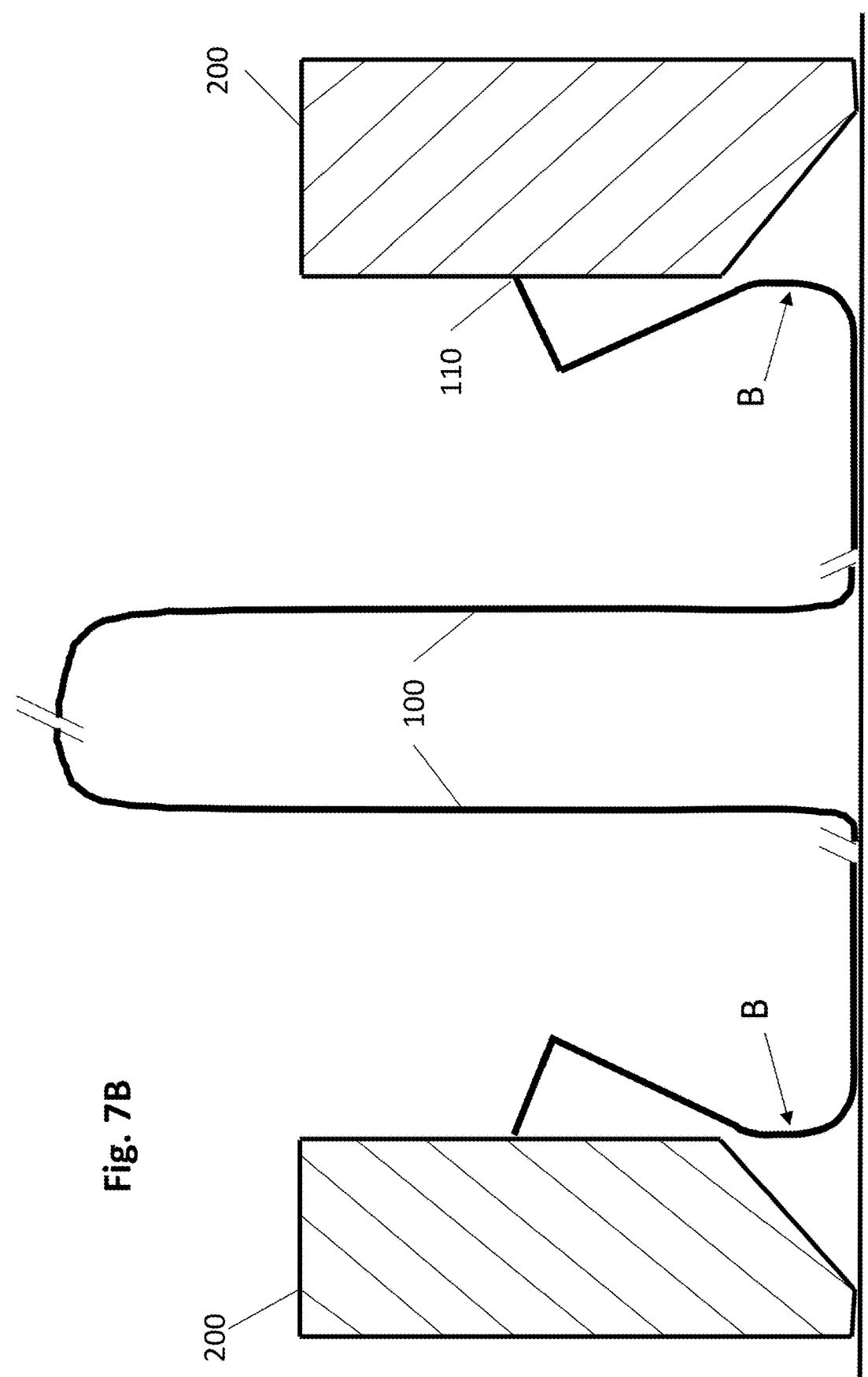
" In FIG. 7B, the the upper body 200 has been lowered onto the horizontal surface, and the peripheral edges 110 and the Peripheral flanges 120 of the article 100 are partially deflected inwardly toward the body 10 of the article 100.
Figure 7C:
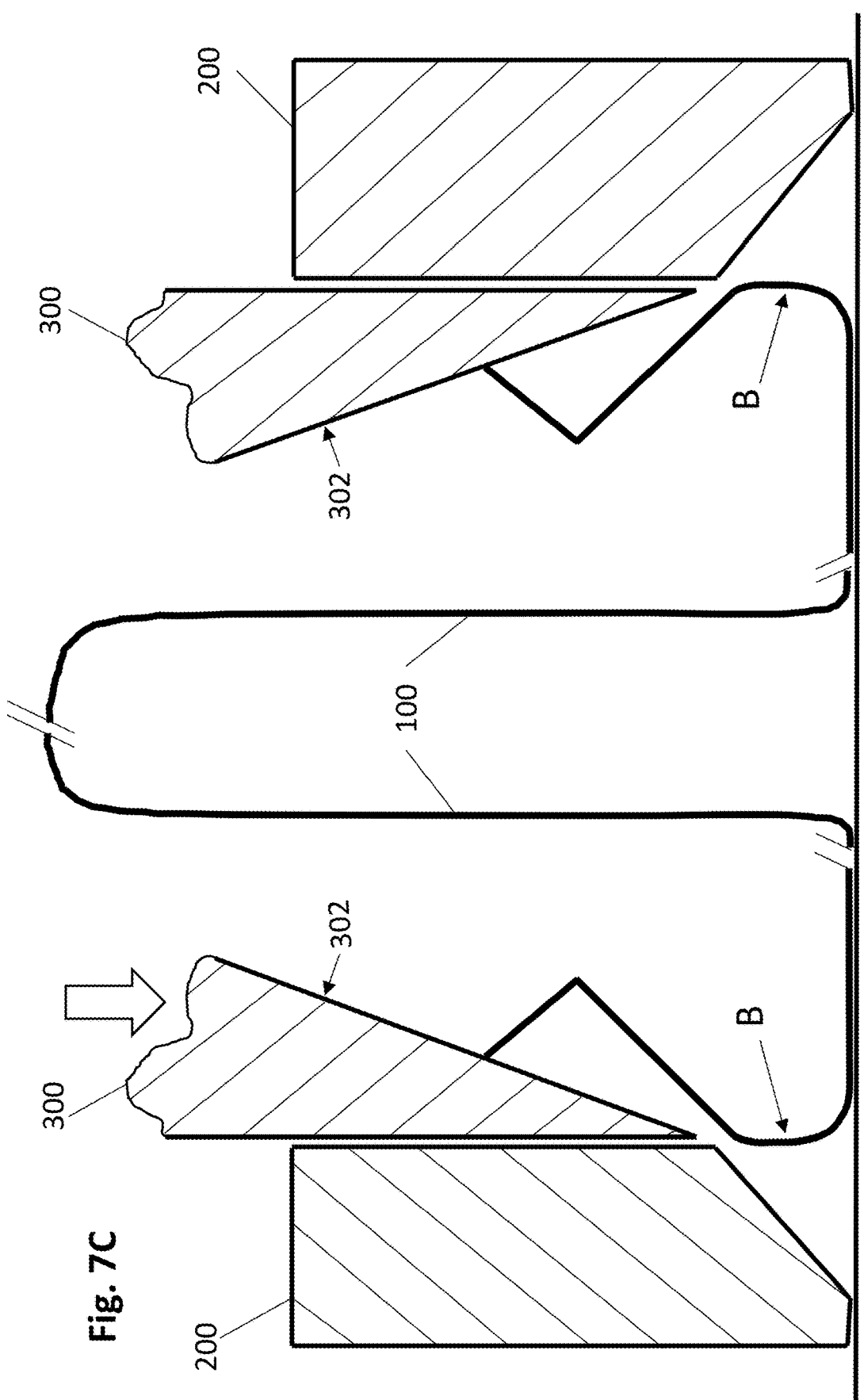
In FIG. 7C, the ram 300 has been inserted, in the direction indicated by the open arrow, into a cavity in the upper body 200 behind the article 100 and further deflects the peripheral flanges 120 (and, with them, the deflectable flanges 160) through bending of the thermoplastic sheet of which the article is formed at the areas marked "B."

FIGS. 6A and 6B illustrate a thermoplastic tray which was thermoformed from a flat sheet of thermoplastic material and then cut from the sheet. The sharp edge formed by the cutting process is shown in each of these figures, with a finger touching the sharp edge. After the smoothing process described herein was performed on these trays, the appearance of the trays was approximately that shown in FIG. 3, in which the sharp edge has been "rolled over" such that it faces the body of the tray and a smooth portion, formed by flexing at least the bend region of the deflectable flange and heating and cooling it to yield a smooth outer periphery to the tray which will not impact either upon a thin plastic film attached to the rim of the tray or upon a thin plastic film which is snugly wrapped about the entirety of the tray.

Example 2

This example is provided for the sake of explaining formation and sealing of a shaped article as described herein. In this example, formation, filling, and sealing of a container containing a cut of fresh fish is described.

A shaped article for receiving the fish is formed by traditional thermoforming methods. A thermoformable material (e.g., PET) in sheet form is heated above its glass transition temperature and urged against a mold using traditional thermoforming techniques (using either a male or female mold, with or without the application of positive and/or negative pressure to urge portions of the sheet against portions of the mold). Such thermoforming yields a tray-shaped container having a rounded rectangular shape overall and including a concave interior portion for receiving the cut of fish. The rounded rectangular overall shape of the container is defined by a deflectable flange that surrounds the interior portion about the entire perimeter of that interior portion. The deflectable flange has the configuration shown in FIG. 1A, and the tray has the approximate shape of the tray shown in FIG. 6D upon cutting the thermoformed tray from the sheet at peripheral edge 110 of the deflectable flange 160. The die used to cut the tray from the sheet is heated so that the peripheral edge of the tray is at or near its glass transition temperature.

A plug having a shape that substantially fills the interior portion of the tray at the portions adjacent the extension 50 of the deflectable flange 160 is inserted into the interior portion (approximately as shown in FIG. 8Dii). The plug-filled tray is then inserted into a ram 300 (approximately as shown in the upper position in FIG. 10A, except that no plug is present in FIG. 10A), so that the peripheral edge 110, the spacer 140, or both contact the upper surface 302 of the ram 300 at substantially all portions of the deflectable flange. Downward pressure (referring to FIG. 10A, the force being applied downwardly from the top of the image) is applied to the extension 50 of the deflectable flange 160 about the entire periphery of the interior, driving the spacer 140 and/or peripheral edge 110 portions of the deflectable flange 160 against the ram. The deflectable flange is driven against the ram to a position analogous to that shown in cross-section in FIG. 8H, and the parts are held in this position for a period of time sufficient for at least the portion of the deflectable flange indicated by "B" in FIG. 8 J to attain a temperature above its glass transition temperature by virtue of heat conducted or radiated thereto from the ram. The deflectable flange is thereafter urged (by the force applied to the extension 50) further against the ram so that the peripheral edge 110 slides, scrapes, or skips across the inner surface 302 of the ram 300 and the deflectable flange advances to approximately the position shown in FIG. 8J. If desired, the deflectable flange can be further advanced to the position shown in FIG. 8K, optionally upon pausing to permit additional portions of the deflectable flange to achieve a temperature above its glass transition point. Also, if desired, a coolant such as ambient air can be injected (e.g. at the position occupied by element 120 in FIG. 8K) to reduce the temperature of the deflectable flange at the injection point, in order to prevent further irreversible deflection of such portion. The deflectable flange is urged against the ram sufficiently that the peripheral edge is not readily accessible to films or other materials present at the periphery of the tray.

The force urging the deflectable flange against the ram is discontinued, and the article is removed from contact with the ram, whereby the material of the deflectable flange cools below its glass transition temperature and retains its shape in the absence of applied force. At this point, a shaped article in the shape of the desired tray has been formed, the tray having a smooth periphery. The tray can be used immediately for packaging the cut of fish or, more typically, it can be stacked with other such trays and shipped to a fish processor.

Whether the tray is used immediately after formation or retrieved by de-nesting the tray from a stack of trays, the cut of fish can now be deposited within the interior compartment of the tray, together with any other materials (e.g., sauce, an absorbent pad, vegetable, or seasonings) to be packaged therewith in preparation for sealing. Any of a number of known sealing technologies can be used to seal the container and the fish.

The tray can simply be over-wrapped with a thin plastic film (the film extending across the opening of the compartment between extensions 50 on opposite sides of the compartment, around smoothly-bent bend region 150 and/or spacer 140 of the deflectable flange 160), and the terminus of the film can be sealed to a portion of the film overlaying the tray, for example by application of a heated pad against the terminus and the portion, followed by heat-shrinking of the film to yield a visually pleasing taut film surface. Because the tray has no sharp or rough edges at its periphery, the overwrapped film is not torn during sealing, nor do such edges tear, snag, or abrade other sealed packages during shipping. The over-wrapped, fish-containing container can be packaged (e.g., in a box with other such containers or in a plastic bag containing both a selected gas or liquid phase and other such containers), and shipped to a wholesaler, retailer, or customer.

Rather than sealing the package using an over-wrap that is sealed to itself, the container can be sealed after filling with a film that does not envelop the tray, but instead seals the compartment at the extension 50 about the periphery of the compartment. Such a seal can be generated by simply sealing a film (using any one or combination of heat, pressure, and an adhesive) to the extension 50 and, preferably, trimming the film about the periphery of the seal (e.g., by trimming the film at approximately the peripheral extent of the container). If desired, any free ends of the film seal can be shrunk using heat. Prior to sealing, a vacuum can be applied to withdraw gases from the interior of the compartment and to draw the film against the contents of the compartment, and a selected gas or gas mixture can optionally be injected prior to sealing.

The disclosure of every patent, patent application, and publication cited herein is hereby incorporated herein by reference in its entirety.

While this subject matter has been disclosed with reference to specific embodiments, it is apparent that other embodiments and variations can be devised by others skilled in the art without departing from the true spirit and scope of the subject matter described herein. The appended claims include all such embodiments and equivalent variations.

What is claimed is:

1. A tray for containing a food, the tray
being formed from a sheet of thermoformable plastic
    having a peripheral edge and
having a shape that includes
    a concave, rounded rectangular tray-shaped body and
    a rim connected to the body about its entire periphery,
      the rim including an extension interposed between
      the body and a smooth, rolled-over edge wherein the
      peripheral edge of the sheet is disposed away from
      the periphery of the tray, the rolled-over edge including a stacking extension at each corner of the rim,
    wherein a plurality of the tray are stackable in a nested
      conformation such that when a first tray is nested
      within a second tray, the rolled-over edge of the first
      tray contacts the rim of the second tray only at one or
      more of the stacking extensions.

2. The tray of claim 1, wherein the extension includes a substantially planar sealing surface about the entire periphery of the body.

3. The tray of claim 2, wherein when the first, upper tray is nested with the second, lower tray, the rolled-over edge of the first tray contacts the substantially planar sealing surface of the second tray only at one or more of the stacking extensions.

4. The tray of claim 1, wherein the rolled-over edge comprises a smoothly-curved bend region adjoining the extension and connecting thereto a spacer which carries the peripheral edge of the sheet.

5. The tray of claim 4, wherein the peripheral edge of the sheet is contained within the rolled-over edge.

6. The tray of claim 4, wherein the rolled-over edge is rolled sufficiently that the peripheral edge of the sheet points toward the body of the tray.

7. The tray of claim 4, wherein the rolled-over edge is rolled sufficiently that the peripheral edge of the sheet points toward the underside of the rim.

8. The tray of claim 4, wherein the peripheral edge of the sheet is part of a peripheral flange that is connected to the spacer by an elbow.

9. The tray of claim 8, wherein the peripheral edge of the sheet is contained within the rolled-over edge.

10. The tray of claim 8, wherein the rolled-over edge is rolled sufficiently that the peripheral edge of the sheet points toward the body of the tray.

11. The tray of claim 8, wherein the rolled-over edge is rolled sufficiently that the peripheral edge of the sheet points toward the underside of the rim.

12. The tray of claim 4, wherein the rolled edge includes a bent portion disposed between the spacer and the peripheral edge of the sheet.

13. The tray of claim 12, wherein the peripheral edge of the sheet is contained within the rolled-over edge.

14. The tray of claim 12, wherein the rolled-over edge is rolled sufficiently that the peripheral edge of the sheet points toward the body of the tray.

15. The tray of claim 12, wherein the rolled-over edge is rolled sufficiently that the peripheral edge of the sheet points toward the underside of the rim.

16. The tray of claim 4, wherein the extension includes a substantially planar sealing surface, the spacer is substantially flat, and the bend region connects the sealing surface and the spacer at an angle not less than 75 nor more than 105 degrees.

17. The tray of claim 16, wherein the bend region connects the sealing surface and the spacer at an angle not less than 87 nor more than 93 degrees.

18. The tray of claim 16, wherein the peripheral edge of the sheet is contained within the rolled-over edge.

19. The tray of claim 16, wherein the rolled-over edge is rolled sufficiently that the peripheral edge of the sheet points toward the body of the tray.

20. The tray of claim 16, wherein the rolled-over edge is rolled sufficiently that the peripheral edge of the sheet points toward the underside of the rim.

* * * * *